US009852512B2

(12) United States Patent
Gonzalez-Banos et al.

(10) Patent No.: US 9,852,512 B2
(45) Date of Patent: *Dec. 26, 2017

(54) REDUCED HOMOGRAPHY BASED ON STRUCTURAL REDUNDANCY OF CONDITIONED MOTION

(71) Applicant: Electronic Scripting Products, Inc., Palo Alto, CA (US)

(72) Inventors: Hector H. Gonzalez-Banos, Mountain View, CA (US); Marek Alboszta, Montara, CA (US); Michael J. Mandella, Palo Alto, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/926,435

(22) Filed: Oct. 29, 2015

(65) Prior Publication Data

US 2016/0063706 A1 Mar. 3, 2016

Related U.S. Application Data

(63) Continuation-in-part of application No. 14/633,350, filed on Feb. 27, 2015, now Pat. No. 9,189,856, which
(Continued)

(51) Int. Cl.
*G06T 7/20* (2017.01)
*H04N 5/232* (2006.01)
*G06T 7/73* (2017.01)

(52) U.S. Cl.
CPC ............ *G06T 7/20* (2013.01); *G06T 7/73* (2017.01); *H04N 5/23229* (2013.01); *G06T 2207/10028* (2013.01); *G06T 2207/30244* (2013.01)

(58) Field of Classification Search
CPC ... G06T 7/20; G06T 7/73; G06T 2207/10028; G06T 2207/30244; H04N 5/23229
See application file for complete search history.

(56) References Cited

U.S. PATENT DOCUMENTS 6,148,528 A 11/2000 Jackson
6,411,915 B1 6/2002 Nguyen et al.
(Continued)

OTHER PUBLICATIONS

Birchfield, Stan, An Introduction to Projective Geometry (for computer vision), Mar. 12, 1998, pp. 1-22, Stanford CS Department.
(Continued)

*Primary Examiner* — Sath V Perungavoor
*Assistant Examiner* — Howard D Brown, Jr.
(74) *Attorney, Agent, or Firm* — Asif Ghias

(57) ABSTRACT

Efficient techniques of recovering the pose of an optical apparatus exploiting structural redundancies due the conditioned motion of an apparatus are disclosed. The techniques are based on determining a reduced homography consonant to the conditioned motion of the optical apparatus. The optical apparatus comprises an optical sensor on which space points are imaged as measured image points. The reduced homography is based on a reduced representation of the space points, obtained by exploiting the structural redundancy in the measured image points due to the conditioned motion. The reduced representation consonant with the conditioned motion is defined by rays in homogeneous coordinates and contained in a projective plane of the optical sensor.

21 Claims, 32 Drawing Sheets

Related U.S. Application Data is a continuation of application No. 13/802,686, filed on Mar. 13, 2013, now Pat. No. 8,970,709.

(56) References Cited

U.S. PATENT DOCUMENTS

| | | | |
|---|---|---|---|
| 6,621,921 B1* | 9/2003 | Matsugu | G06T 7/55 382/154 |
| 6,748,112 B1 | 6/2004 | Nguyen et al. | |
| 7,023,536 B2 | 4/2006 | Zhang et al. | |
| 7,110,100 B2 | 9/2006 | Buermann et al. | |
| 8,675,911 B2 | 3/2014 | Barbier et al. | |
| 2003/0044048 A1 | 3/2003 | Zhang et al. | |
| 2003/0076980 A1 | 4/2003 | Zhang et al. | |
| 2005/0074162 A1 | 4/2005 | Tu et al. | |
| 2007/0080967 A1 | 4/2007 | Miller | |
| 2007/0211239 A1 | 9/2007 | Mandella et al. | |
| 2008/0080791 A1 | 4/2008 | Carl et al. | |
| 2008/0225127 A1 | 9/2008 | Ming | |
| 2008/0267453 A1 | 10/2008 | Avrahami | |
| 2008/0279423 A1 | 11/2008 | Zhang et al. | |
| 2008/0285801 A1 | 11/2008 | Heinzmann | |
| 2009/0009513 A1 | 1/2009 | Van Den Hengel et al. | |
| 2010/0001998 A1* | 1/2010 | Mandella | G01B 11/002 345/419 |
| 2011/0194731 A1 | 8/2011 | BenHimane et al. | |
| 2011/0254950 A1 | 10/2011 | Bibby et al. | |
| 2011/0286631 A1* | 11/2011 | Wagner | G06K 9/32 382/103 |
| 2012/0038549 A1 | 2/2012 | Mandella et al. | |
| 2012/0063638 A1 | 3/2012 | Lim et al. | |
| 2012/0230570 A1* | 9/2012 | Zheng | G06T 17/20 382/131 |
| 2013/0051626 A1 | 2/2013 | Abadpour et al. | |
| 2014/0098242 A1 | 4/2014 | Sharma et al. | |
| 2014/0119593 A1 | 5/2014 | Filler | |
| 2014/0206443 A1* | 7/2014 | Sharp | G06T 7/0075 463/31 |

OTHER PUBLICATIONS

Chen et al., Adaptive Homography-Based Visual Servo Tracking, 1Department of Electrical and Computer Engineering, Clemson University,, 2003, Oct. 2003, pp. 1-7, IEEE International Conference on Intelligent Robots and Systems IROS, Oak Ridge, TN, USA.

Dubrofsky, Elan, Homography Estimation, Master's Essay Carleton University, 2009, pp. 1-32, The University of British Columbia, Vancouver, Canada.

Gibbons, Jeremy, Metamorphisms: Streaming Representation-Changers, Computing Laboratory, University of Oxford, Jan. 2005, pp. 1-51, http://www.cs.ox.ac.uk/publications/publication380-abstract.html, United Kingdom.

Imran et al., Robust L Nomography Estimation Using Reduced Image Feature Covariances from an RGB Image, Journal of Electronic Imaging 21(4), Oct.-Dec. 2012, pp. 1-10, SPIEDigitalLibrary.org/jei.

Kang et al., A Multibaseline Stereo System with Active Illumination and Real-time Image Acquisition, Cambridge Research Lab, 1995, pp. 1-6 Digital Equipment Corp, Cambridge, MA, USA.

Lopez-Nicolas et al., Shortest Path Homography-Based Visual Control for Differential Drive Robots, Universidad de Zaragoza, pp. 1-15, Source: Vision Systems: Applications, ISBN 978-3-902613-01-1, Jun. 2007, Edited by: Goro Obinata and Ashish Dutta, pp. 608, I-Tech, www.i-technonline.com, Vienna, Austria.

Malis et al., Deeper Understanding of the Homography Decomposition for Vision-Based Control, INRIA Institut national deRecherche en Informatique et an Automatique, Sep. 2007, pp. 1-93, INRIA Sophia Antipolis.

Marquez-Neila et al., Speeding-Up Homography Estimation in Mobile Devices, Journal of Real-Time Image Processing, 2013, pp. 1-4, PCR: Perception for Computer and Robots, http://www.dia.fi.upm.es/~/fast_homography.html.

Montijano et al., Fast Pose Estimation for Visual Navigation Using Homographies, 2009 IEEE/RSJ International Conference on Intelligent Robots and Systems, Oct. 2009, pp. 1-6, St. Louis, MO, USA.

Pirchheim et al., Homography-Based Planar Mapping and Tracking for Mobile Phones, Grax University of Technology, Oct. 2011, pp. 1, Mixed and Augmented Reality (ISMAR) 2011 10th IEEE International Symposium . . . , Basel.

Sanchez et al., Plane-Based Camera Calibration Without Direct Optimization Algorithms, Jan. 2006, pp. 1-6, Centro de Investigación en Informática para Ingeniería, Univ. Tecnológica Nacional, Facultad Regional Córdoba, Argentina.

Sharp et al., A Vision System for Landing an Unmanned Aerial Vehicle, Department of Electrical Engineering & Computer Science, 2001 IEEE Intl. Conference on Robotics and Automation held in Seoul, Korea, May 21-26, 2001, pp. 1-8, University of California Berkeley, Berkeley, CA, USA.

Sternig et al., Multi-camera Multi-object Tracking by Robust Hough-based Nomography Projections, Institute for Computer Graphics and Vision, Nov. 2011, pp. 1-8, Graz University of Technology, Austria.

Tan et al., Recovery of Intrinsic and Extrinsic Camera Parameters Using Perspective Views of Rectangles, Department of Computer Science, 1995, pp. 1-10, The University of Reading, Berkshire RG6 6AY, UK.

Thirthala et al., Multi-view geometry of 1D radial cameras and its application to omnidirectional camera calibration, Department of Computer Science, Oct. 2005, pp. 1-8, UNC Chapel Hill, North Carolina, US.

Thirthala et al., The Radical Trifocal Tensor: A Tool for Calibrating the Radial Distortion of Wide-Angle Cameras, submitted to Computer Vision and Pattern Recognition, 2005, pp. 1-8, UNC Chapel Hill, North Carolina, US.

Yang et al., Symmetry-Based 3-D Reconstruction from Perspective Images, Computer Vision and Image Understanding 99 (2005) 210-240, pp. 1-31, Science Direct, www.elsevier.com/locate/cviu.

\* cited by examiner

REDUCED HOMOGRAPHY BASED ON STRUCTURAL REDUNDANCY OF CONDITIONED MOTION

RELATED APPLICATIONS

This application is a continuation-in-part of U.S. patent application Ser. No. 14/633,350, filed on Feb. 27, 2015 now allowed and to be granted under U.S. Pat. No. 9,189,856 on Nov. 17, 2015, which is a continuation of U.S. patent application Ser. No. 13/802,686, filed on Mar. 13, 2013, now U.S. Pat. No. 8,970,709. Each of the above two enumerated applications is hereby incorporated by reference in its entirety.

FIELD OF THE INVENTION

The present invention relates generally to determining pose parameters (position and orientation parameters) of an optical apparatus in a stable frame, the pose parameters of the optical apparatus being recovered from image data collected by the optical apparatus and being imbued with an uncertainty or redundancy that allows deployment of a reduced homography.

BACKGROUND OF THE INVENTION

When an item moves without any constraints (freely) in a three-dimensional environment with respect to stationary objects, knowledge of the item's distance and inclination to one or more of such stationary objects can be used to derive a variety of the item's parameters of motion, as well as its complete pose. The latter includes the item's three position parameters, usually expressed by three coordinates (x, y, z), and its three orientation parameters, usually expressed by three angles ($\alpha$, $\beta$, $\gamma$) in any suitably chosen rotation convention (e.g., Euler angles ($\psi$, $\theta$, $\phi$) or quaternions). Particularly useful stationary objects for pose recovery purposes include ground planes, fixed points, lines, reference surfaces and other known features such as landmarks, fiducials and beacons.

Many mobile electronics items are now equipped with advanced optical apparatus such as on-board cameras with photo-sensors, including high-resolution CMOS arrays. These devices typically also possess significant on-board processing resources (e.g., CPUs and GPUs) as well as network connectivity (e.g., connection to the Internet, Cloud services and/or a link to a Local Area Network (LAN)). These resources enable many techniques from the fields of robotics and computer vision to be practiced with the optical apparatus on-board such virtually ubiquitous devices. Most importantly, vision algorithms for recovering the camera's extrinsic parameters, namely its position and orientation, also frequently referred to as its pose, can now be applied in many practical situations.

An on-board camera's extrinsic parameters in the three dimensional environment are typically recovered by viewing a sufficient number of non-collinear optical features belonging to the known stationary object or objects. In other words, the on-board camera first records on its photo-sensor (which may be a pixelated device or even a position sensing device (PSD) having one or just a few "pixels") the images of space points, space lines and space planes belonging to one or more of these known stationary objects. A computer vision algorithm to recover the camera's extrinsic parameters is then applied to the imaged features of the actual stationary object(s). The imaged features usually include points, lines and planes of the actual stationary object(s) that yield a good optical signal. In other words, the features are chosen such that their images exhibit a high degree of contrast and are easy to isolate in the image taken by the photo-sensor. Of course, the imaged features are recorded in a two-dimensional (2D) projective plane associated with the camera's photo-sensor, while the real or space features of the one or more stationary objects are found in the three-dimensional (3D) environment.

Certain 3D information is necessarily lost when projecting an image of actual 3D stationary objects onto the 2D image plane. The mapping between the 3D Euclidean space of the three-dimensional environment and the 2D projective plane of the camera is not one-to-one. Many assumptions of Euclidean geometry are lost during such mapping (sometimes also referred to as projectivity). Notably, lengths, angles and parallelism are not preserved. Euclidean geometry is therefore insufficient to describe the imaging process. Instead, projective geometry, and specifically perspective projection is deployed to recover the camera's pose from images collected by the photo-sensor residing in the camera's 2D image plane.

Fortunately, projective transformations do preserve certain properties. These properties include type (that is, points remain points and lines remain lines), incidence (that is, when a point lies on a line it remains on the line), as well as an invariant measure known as the cross ratio. For a review of projective geometry the reader is referred to H. X. M. Coexter, *Projective Geometry*, Toronto: University of Toronto, $2^{nd}$ Edition, 1974; O. Faugeras, *Three-Dimensional Computer Vision*, Cambridge, Mass.: MIT Press, 1993; L. Guibas, "Lecture Notes for CSS4Sa: Computer Graphics—Mathematical Foundations", Stanford University, Autumn 1996; Q.-T. Luong and O. D. Faugeras, "Fundamental Matrix: Theory, algorithms and stability analysis", International Journal of Computer Vision, 17(1): 43-75, 1996; J. L. Mundy and A. Zisserman, *Geometric Invariance in Computer Vision*, Cambridge, Mass.: MIT Press, 1992 as well as Z. Zhang and G. Xu, *Epipolar Geometry in Stereo, Motion and Object Recognition: A Unified Approach*. Kluwer Academic Publishers, 1996.

At first, many practitioners deployed concepts from perspective geometry directly to pose recovery. In other words, they would compute vanishing points, horizon lines, cross ratios and apply Desargues theorem directly. Although mathematically simple on their face, in many practical situations such approaches end up in tedious trigonometric computations. Furthermore, experience teaches that such computations are not sufficiently compact and robust in practice. This is due to many real-life factors including, among other, limited computation resources, restricted bandwidth and various sources of noise.

Modern computer vision has thus turned to more computationally efficient and robust approaches to camera pose recovery. An excellent overall review of this subject is found in Kenichi Kanatani, *Geometric Computation for Machine Vision*, Clarendon Press, Oxford University Press, New York, 1993. A number of important foundational aspects of computational geometry relevant to pose recovery via machine vision are reviewed below to the benefit of those skilled in the art and in order to better contextualize the present invention.

To this end, we will now review several relevant concepts in reference to FIG. 1-3. FIG. 1 shows a stable three-dimensional environment 10 that is embodied by a room with a wall 12 in this example. A stationary object 14, in this case a television, is mounted on wall 12. Television 14 has certain non-collinear optical features 16A, 16B, 16C and 16D that in this example are the corners of its screen 18. Corners 16A, 16B, 16C and 16D are used by a camera 20 for recovery of extrinsic parameters (up to complete pose recovery when given a sufficient number and type of non-collinear features). Note that the edges of screen 18 or even the entire screen 18 and/or anything displayed on it (i.e., its pixels) are suitable non-collinear optical features for these purposes. Of course, other stationary objects in room 10 besides television 14 can be used as well.

Camera 20 has an imaging lens 22 and a photo-sensor 24 with a number of photosensitive pixels 26 arranged in an array. A common choice for photo-sensor 24 in today's consumer electronics devices are CMOS arrays, although other technologies can also be used depending on application (e.g., CCD, PIN photodiode, position sensing device (PSD) or still other photo-sensing technology). Imaging lens 22 has a viewpoint O and a certain focal length f. Viewpoint O lies on an optical axis OA. Photo-sensor 24 is situated in an image plane at focal length f behind viewpoint O along optical axis OA.

Camera 20 typically works with electromagnetic (EM) radiation 30 that is in the optical or infrared (IR) wavelength range (note that deeper sensor wells are required in cameras working with IR and far-IR wavelengths). Radiation 30 emanates or is reflected (e.g., reflected ambient EM radiation) from non-collinear optical features such as screen corners 16A, 16B, 16C and 16D. Lens 22 images EM radiation 30 on photo-sensor 24. Imaged points or corner images 16A', 16B', 16C', 16D' thus imaged on photo-sensor 24 by lens 22 are usually inverted when using a simple refractive lens. Meanwhile, certain more compound lens designs, including designs with refractive and reflective elements (catadioptrics) can yield non-inverted images.

A projective plane 28 conventionally used in computational geometry is located at focal length f away from viewpoint O along optical axis OA but in front of viewpoint O rather than behind it. Note that a virtual image of corners 16A, 16B, 16C and 16D is also present in projective plane 28 through which the rays of electromagnetic radiation 30 pass. Because any rays in projective plane 28 have not yet passed through lens 22, the points representing corners 16A, 16B, 16C and 16D are not inverted. The methods of modern machine vision are normally applied to points in projective plane 28, while taking into account the properties of lens 22.

An ideal lens is a pinhole and the most basic approaches of machine vision make that an assumption. Practical lens 22, however, introduces distortions and aberrations (including barrel distortion, pincushion distortion, spherical aberration, coma, astigmatism, chromatic aberration, etc.). Such distortions and aberrations, as well as methods for their correction or removal are understood by those skilled in the art.

In the simple case shown in FIG. 1, image inversion between projective plane 28 and image plane on the surface of photo-sensor 24 is rectified by a corresponding matrix (e.g., a reflection and/or rotation matrix). Furthermore, any offset between a center CC of camera 20 where optical axis OA passes through the image plane on the surface of photo-sensor 24 and the origin of the 2D array of pixels 26, which is usually parameterized by orthogonal sensor axes $(X_s, Y_s)$, involves a shift.

Persons skilled in the art are familiar with camera calibration techniques. These include finding offsets, computing the effective focal length $f_{eff}$ (or the related parameter k) and ascertaining distortion parameters (usually denoted by α's). Collectively, these parameters are called intrinsic and they can be calibrated in accordance with any suitable method. For teachings on camera calibration the reader is referred to the textbook entitled "Multiple View Geometry in Computer Vision" (Second Edition) by R. Hartley and Andrew Zisserman. Another useful reference is provided by Robert Haralick, "Using Perspective Transformations in Scene Analysis", Computer Graphics and Image Processing 13, pp. 191-221 (1980). For still further information the reader is referred to Carlo Tomasi and John Zhang, "How to Rotate a Camera", Computer Science Department Publication, Stanford University and Berthold K. P. Horn, "Tsai's Camera Calibration Method Revisited", which are herein incorporated by reference.

Additionally, image processing is required to discover corner images 16A', 16B', 16C', 16D' on sensor 24 of camera 20. Briefly, image processing includes image filtering, smoothing, segmentation and feature extraction (e.g., edge/line or corner detection). Corresponding steps are usually performed by segmentation and the application of mask filters such as Guassian/Laplacian/Laplacian-of-Gaussian (LoG)/Marr and/or other convolutions with suitable kernels to achieve desired effects (averaging, sharpening, blurring, etc.). Most common feature extraction image processing libraries include Canny edge detectors as well as Hough/Radon transforms and many others. Once again, all the relevant techniques are well known to those skilled in the art. A good review of image processing is afforded by "Digital Image Processing", Rafael C. Gonzalez and Richard E. Woods, Prentice Hall, $3^{rd}$ Edition, Aug. 31 2007; "Computer Vision: Algorithms and Applications", Richard Szeliski, Springer, Edition 2011, Nov. 24, 2010; Tinne Tuytelaars and Krystian Mikolajczyk, "Local Invariant Feature Detectors: A Survey", Journal of Foundations and Trends in Computer Graphics and Vision, Vol. 3, Issue 3, January 2008, pp. 177-280. Furthermore, a person skilled in the art will find all the required modules in standard image processing libraries such as OpenCV (Open Source Computer Vision), a library of programming functions for real time computer vision. For more information on OpenCV the reader is referred to G. R. Bradski and A. Kaehler, "Learning OpenCV: Computer Vision with the OpenCV Library", O'Reilly, 2008.

In FIG. 1 camera 20 is shown in a canonical pose. World coordinate axes $(X_w, Y_w, Z_w)$ define the stable 3D environment with the aid of stationary object 14 (the television) and more precisely its screen 18. World coordinates are right-handed with their origin in the middle of screen 18 and $Z_w$-axis pointing away from camera 20. Meanwhile, projective plane 28 is parameterized by camera coordinates with axes $(X_c, Y_c, Z_c)$. Camera coordinates are also right-handed with their origin at viewpoint O. In the canonical pose $Z_n$-axis extends along optical axis OA away from the image plane found on the surface of image sensor 24. Note that camera $Z_n$-axis intersects projective plane 28 at a distance equal to focal length f away from viewpoint O at point o', which is the center (origin) of projective plane 28. In the canonical pose, the axes of camera coordinates and world coordinates are thus aligned. Hence, optical axis OA that always extends along the camera $Z_n$-axis is also along the world $Z_w$-axis and intersects screen 18 of television 14 at its center (which is also the origin of world coordinates). In the application shown in FIG. 1, a marker or pointer 32 is positioned at the intersection of optical axis OA of camera 20 and screen 18.

In the canonical pose, the rectangle defined by space points representing screen corners 16A, 16B, 16C and 16D maps to an inverted rectangle of corner images 16A', 16B', 16C', 16D' in the image plane on the surface of image sensor 24. Also, space points defined by screen corners 16A, 16B, 16C and 16D map to a non-inverted rectangle in projective plane 28. Therefore, in the canonical pose, the only apparent transformation, other than the inversion of the image in the image plane as explained earlier, performed by lens 22 of camera 20 is a scaling (de-magnification) of the image with respect to the actual object. Of course, mostly correctable distortions and aberrations are also present in the case of practical lens 22, as remarked above.

Recovery of poses (positions and orientations) assumed by camera 20 in environment 10 from a sequence of corresponding projections of space points representing screen corners 16A, 16B, 16C and 16D is possible because the absolute geometry of television 14 and in particular of its screen 18 and possibly other 3D structures providing optical features in environment 10 are known and can be used as reference. In other words, after calibrating lens 22 and observing the image of screen corners 16A, 16B, 16C, 16D and any other optical features from the canonical pose, the challenge of recovering parameters of absolute pose of camera 20 in three-dimensional environment 10 is solvable. Still more precisely put, as camera 20 changes its position and orientation and its viewpoint O travels along a trajectory 34 (a.k.a. extrinsic parameters) in world coordinates parameterized by axes $(X_w, Y_w, Z_w)$, only the knowledge of corner images 16A', 16B', 16C', 16D' in camera coordinates parameterized by axes $(X_c, Y_c, Z_c)$ can be used to recover the changes in pose or extrinsic parameters of camera 20. This exciting problem in computer and robotic vision has been explored for decades.

Referring to FIG. 2, we now review a typical prior art approach to camera pose recovery in world coordinates (a.k.a. absolute pose, since world coordinates defined by television 14 sitting in room 10 are presumed stable for the purposes of this task). In this example, camera 20 is mounted on-board item 36, which is a mobile device and more specifically a tablet computer with a display screen 38. The individual parts of camera 20 are not shown explicitly in FIG. 2, but non-inverted image 18' of screen 18 as found in projective plane 28 is illustrated on display screen 38 of tablet computer 36 to aid in the explanation. The practitioner is cautioned here, that although the same reference numbers refer to image points in the image plane on sensor 24 (see FIG. 1) and in projective plane 28 to limit notational complexity, a coordinate transformation exists between image points in the actual image plane and projective plane 28. As remarked above, this transformation typically involves a reflection/rotation matrix and an offset between camera center CC and the actual center of sensor 24 discovered during the camera calibration procedure (also see FIG. 1).

A prior location of camera viewpoint O along trajectory 34 and an orientation of camera 20 at time $t=t_{-i}$ are indicated by camera coordinates using camera axes $(X_c, Y_c, Z_c)$ whose origin coincides with viewpoint O. Clearly, at time $t=t_{-i}$ camera 20 on-board tablet 36 is not in the canonical pose. The canonical pose, as shown in FIG. 1, obtains at time $t=t_o$. Given unconstrained motion of viewpoint O along trajectory 34 and including rotations in three-dimensional environment 10, all extrinsic parameters of camera 20 and correspondingly the position and orientation (pose) of tablet 36 change between time $t=t_{-i}$ and $t=t_o$. Still differently put, all six degrees of freedom (6 DOFs or the three translational and the three rotational degrees of freedom inherently available to rigid bodies in three-dimensional environment 10) change along trajectory 34.

Now, at time $t=t_1$ tablet 36 has moved further along trajectory 34 from its canonical pose at time $t=t_o$ to an unknown pose where camera 20 records corner images 16A', 16B', 16C', 16D' at the locations displayed on screen 38 in projective plane 28. Of course, camera 20 actually records corner images 16A', 16B', 16C', 16D' with pixels 26 of its sensor 24 located in the image plane defined by lens 22 (see FIG. 1). As indicated above, a known transformation exists (based on camera calibration of intrinsic parameters, as mentioned above) between the image plane of sensor 24 and projective plane 28 that is being shown in FIG. 2.

In the unknown camera pose at time $t=t_1$ a television image 14' and, more precisely screen image 18' based on corner images 16A', 16B', 16C', 16D' exhibits a certain perspective distortion. By comparing this perspective distortion of the image at time $t=t_1$ to the image obtained in the canonical pose (at time $t=t_o$ or during camera calibration procedure) one finds the extrinsic parameters of camera 20 and, by extension, the pose of tablet 36. By performing this operation with a sufficient frequency, the entire rigid body motion of tablet 36 along trajectory 34 of viewpoint O can be digitized.

The corresponding computation is traditionally performed in projective plane 28 by using homogeneous coordinates and the rules of perspective projection as taught in the references cited above. For a representative prior art approach to pose recovery with respect to rectangles, such as presented by screen 18 and its corners 16A, 16B, 16C and 16D the reader is referred to T. N. Tan et al., "Recovery of Intrinsic and Extrinsic Camera Parameters Using Perspective Views of Rectangles", Dept. of Computer Science, The University of Reading, Berkshire RG6 6AY, UK, 1996, pp. 177-186 and the references cited by that paper. Before proceeding, it should be stressed that although in the example chosen we are looking at rectangular screen 18 that can be analyzed by defining vanishing points and/or angle constraints on corners formed by its edges, pose recovery does not need to be based on corners of rectangles or structures that have parallel and orthogonal edges. In fact, the use of vanishing points is just the elementary way to recover pose. There are more robust and practical prior art methods that can be deployed in the presence of noise and when tracking more than four reference features (sometimes also referred to as fiducials) that do not need to form a rectangle or even a planar shape in real space. Indeed, the general approach applies to any set of fiducials defining an arbitrary 3D shape, as long as that shape is known.

For ease of explanation, however, FIG. 3 highlights the main steps of an elementary prior art approach to the recovery of extrinsic parameters of camera 20 based on the rectangle defined by screen 18 in world coordinates parameterizing room 10 (also see FIG. 2). Recovery is performed with respect to the canonical pose shown in FIG. 1. The solution is a rotation expressed by a rotation matrix R and a translation expressed by a translation vector $\bar{h}$, or $\{R, \bar{h}\}$. In other words, the application of inverse rotation matrix $R^{-1}$ and subtraction of translation vector $\bar{h}$ return camera 20 from the unknown recovered pose to its canonical pose. The canonical pose at $t=t_o$ is marked and the unknown pose at $t=t_1$ is to be recovered from image 18' found in projective plane 28 (see FIG. 2), as shown on display screen 38. In solving the problem we need to find vectors $p_A$, $p_B$, $p_C$ and $p_D$ from viewpoint O to space points 16A, 16B, 16C and 16D through corner images 16A', 16B', 16C' and 16D'. Then, information contained in computed conjugate vanishing points 40A, 40B can be used for the recovery. In cases where the projection is almost orthographic (little or no perspective distortion in screen image 18') and vanishing points 40A, 40B become unreliable, angle constraints demanding that the angles between adjoining edges of candidate recovered screen 18 be 90° can be used, as taught by T. N. Tan et al., op. cit.

FIG. 3 shows that without explicit information about the size of screen 18, the length of one of its edges (or other scale information) only relative lengths of vectors $p_A$, $p_B$, $p_C$ and $p_D$ can be found. In other words, when vectors $p_A$, $p_B$, $p_C$ and $p_D$ are expressed by corresponding unit vectors $\hat{n}_A$, $\hat{n}_B$, $\hat{n}_C$, $\hat{n}_D$ times scale constants $\lambda_A$, $\lambda_B$, $\lambda_C$, $\lambda_D$ such that $p_A = \hat{n}_A \lambda_A$, $p_B = \hat{n}_B \lambda_B$, $p_C = \hat{n}_C \lambda_C$ and $p_D = \hat{n}_D \lambda_D$, then only relative values of scale constants $\lambda_A$, $\lambda_B$, $\lambda_C$, $\lambda_D$ can be obtained. This is clear from looking at a small dashed candidate for screen 18* with corner points 16A*, 16B*, 16C*, 16D*. These present the correct shape for screen 18* and lie along vectors $p_A$, $p_B$, $p_C$ and $p_D$, but they are not the correctly scaled solution.

Also, if space points 16A, 16B, 16C and 16D are not identified with image points 16A', 16B', 16C' and 16D' then the in-plane orientation of screen 18 cannot be determined. This labeling or correspondence problem is clear from examining a candidate for recovered screen 18*. Its recovered corner points 16A*, 16B*, 16C* and 16D* do not correspond to the correct ones of actual screen 18 that we want to find. The correspondence problem can be solved by providing information that uniquely identifies at least some of points 16A, 16B, 16C and 16D. Alternatively, additional space points that provide more optical features at known locations in room 10 can be used to break the symmetry of the problem. Otherwise, the space points can be encoded by any suitable methods and/or means. Of course, space points that present intrinsically asymmetric space patterns could be used as well.

Another problem is illustrated by candidate for recovered screen 18, where candidate points 16A, 16B, 16C, 16D do lie along vectors $p_A$, $p_B$, $p_C$ and $p_D$ but are not coplanar. This structural defect is typically resolved by realizing from algebraic geometry that dot products of vectors that are used to represent the edges of candidate screen 18 not only need to be zero (to ensure orthogonal corners) but also that the triple product of these vectors needs to be zero. That is true, since the triple product of edge vectors is zero for a rectangle. Still another way to remove the structural defect involves the use of cross ratios.

In addition to the above problems, there is noise. Thus, the practical challenge is not only in finding the right candidate based on structural constraints, but also distinguishing between possible candidates and choosing the best one in the presence of noise. In other words, the real-life problem of pose recovery is a problem of finding the best estimate for the transformation encoded by $\{R, \bar{h}\}$ from the available measurements. To tackle this problem, it is customary to work with the homography or collineation matrix A that expresses $\{R, \bar{h}\}$. In this form, the well-known methods of linear algebra can be brought to bear on the problem of estimating A. Once again, the reader should remember that these tools can be applied for any set of optical features (fiducials) and not just rectangles as formed by screen 18 used for explanatory purposes in this case. In fact, any set of fiducials defining any 3D shape in room 10 can be used, as long as that 3D shape is known. Additionally, such 3D shape should have a geometry that produces a sufficiently large image from all vantage points (see definition of convex hull).

FIGS. 4A & 4B illustrate realistic situations in which estimates of collineation matrices A are computed in the presence of noise for our simple example. FIG. 4A shows on the left a full field of view 42 (F.O.V.) of lens 22 centered on camera center CC while camera 20 is in the canonical pose (also see FIG. 1). Field of view 42 is parameterized by sensor coordinates of photo-sensor 24 using sensor axes $(X_s, Y_s)$. Note that pixelated sensors like sensor 24 usually take the origin of array of pixels 26 to be in the upper corner. Also note that camera center CC has an offset $(x_{sc}, y_{sc})$ from the origin. In fact, $(x_{sc}, y_{sc})$ is the location of viewpoint O and origin o' of projective plane 28 in sensor coordinates (previously shown in camera coordinates $(X_c, Y_c, Z_c)$—see FIG. 1). Working in sensor coordinates is initially convenient because screen image 18' is first recorded along with noise by pixels 26 of sensor 24 in the image plane that is parameterized by sensor coordinates. Note the inversion of real screen image 18' on sensor 24 in comparison to virtual screen image 18' in projective plane 28 (again see FIG. 1).

On the right, FIG. 4A illustrates screen image 18' after viewpoint O has moved along trajectory 34 and camera 20 assumed a pose corresponding to an unknown collineation $A_1$ with respect to the canonical pose shown on the left. Collineation $A_1$ consists of an unknown rotation and an unknown translation $\{R, \bar{h}\}$. Due to noise, there are a number of measured image points $\hat{p}_i = (\hat{x}_i, \hat{y}_i)$, indicated by crosses, for corner images 16A', 16B', 16C' and 16D'. (Here the "hat" denotes measured values not unit vectors.) The best estimate of collineation $A_1$, also referred to as $\Theta$ (estimation matrix), yields the best estimate of the locations of corner images 16A', 16B', 16C' and 16D' in the image plane. The value of estimation matrix $\Theta$ is usually found by minimizing a performance criterion through mathematical optimization. Suitable methods include the application of least squares, weighted average or other suitable techniques to process measured image points $\hat{p}_i = (\hat{x}_i, \hat{y}_i)$. Note that many prior art methods also include outlier rejection of certain measured image points $\hat{p}_i = (\hat{x}_i, \hat{y}_i)$ that could "skew" the average. Various voting algorithms including RANSAC can be deployed to solve the outlier problem prior to averaging.

FIG. 4B shows screen image 18' as recorded in another pose of camera 20. This one corresponds to a different collineation $A_2$ with respect to the canonical pose. Notice that the composition of collineations behaves as follows: collineation $A_1$ followed by collineation $A_2$ is equivalent to composition $A_1 A_2$. Once again, measured image points $\hat{p}_i = (\hat{x}_i, \hat{y}_i)$ for the estimate computation are indicated.

The distribution of measured image points $\hat{p}_i = (\hat{x}_i, \hat{y}_i)$ normally obeys a standard noise statistic dictated by environmental conditions. When using high-quality camera 20, that distribution is thermalized based mostly on the illumination conditions in room 10, the brightness of screen 18 and edge/corner contrast (see FIG. 2). This is indicated in FIG. 4B by a dashed outline indicating a normal error region or typical deviation 44 that contains most possible measured image points $\hat{p}_i = (\hat{x}_i, \hat{y}_i)$ excluding outliers. An example outlier 46 is indicated well outside typical deviation 44.

In some situations, however, the distribution of points $\hat{p}_i = (\hat{x}_i, \hat{y}_i)$ does not fall within typical error region 44 accompanied by a few outliers 46. In fact, some cameras introduce persistent or even inherent structural uncertainty into the distribution of points $\hat{p}_i = (\hat{x}_i, \hat{y}_i)$ found in the image plane on top of typical deviation 44 and outliers 46.

One commonplace example of such a situation occurs when the optical system of a camera introduces multiple reflections of bright light sources (which are prime candidates for space points to track and are sometimes even purposefully placed to serve the role of beacons) onto the sensor. This may be due to the many optical surfaces that are typically used in the imaging lenses of camera systems. In many cases, these multiple reflections can cause a number of ghost images along radial lines extending from the center of the sensor or camera center CC as shown in FIG. 1 to the point where the optical axis OA of the lens intersects with the sensor. This condition results in a large inaccuracy when using the image to measure the radial distance of the primary image of a light source. The prior art teaches no suitable formulation of a reduced homography to nonetheless recover parameters of camera pose under such conditions of uncertainty—referred to as structural uncertainty in this disclosure.

Conversely, the motion of the optical apparatus is deliberately confined in various ways according to specific applications. In other words, we find that due to our elective restraints on camera motion, as normally conformant to various practical applications, optical information of measured image points in certain directions is redundant in the image plane. The prior art teaches no suitable formulation of a reduced homography to nonetheless recover parameters of camera pose under such conditions of redundancy of information—referred to as structural redundancy in this disclosure.

OBJECTS AND ADVANTAGES

In view of the shortcomings of the prior art, it is an object of the present invention to provide for recovering parameters of pose or extrinsic parameters of an optical apparatus up to and including complete pose recovery (all six parameters or degrees of freedom) in the presence of structural uncertainty that is introduced into the image data. The optical apparatus may itself be responsible for introducing the structural uncertainty and it can be embodied by a CMOS camera, a CCD sensor, a PIN diode sensor, a position sensing device (PSD), or still some other optical apparatus. In fact, the optical apparatus should be able to deploy any suitable optical sensor and associated imaging optics.

It is further an object of the present invention to provide for recovering parameters of pose or extrinsic parameters of an optical apparatus up to and including complete pose recovery in the presence of structural redundancy that is introduced into the image data as a result of a conditions or constraints placed on the motion of the optical apparatus.

It is another object of the invention to support estimation of a homography representing the pose of an item that has the optical apparatus installed on-board. The approach should enable selection of an appropriate reduced representation of the image data (e.g., measured image points) based on the specific structural uncertainty. The reduced representation should support deployment of a reduced homography that permits the use of low quality cameras, including low-quality sensors and/or low-quality optics, to recover desired parameters of pose or even full pose of the item with the on-board optical apparatus despite the presence of structural uncertainty.

The approach should also enable selection of an appropriate reduced representation of the image data (e.g., measured image points) based on the specific structural redundancy due to the constraints placed on the motion of the item with the optical apparatus installed. The reduced representation should further support deployment of the reduced homography to recover desired parameters of pose or even full pose of the item.

Yet another object of the invention is to provide for complementary data fusion with on-board inertial apparatus to allow for further reduction in quality or acquisition rate of optical data necessary to recover the pose of the optical apparatus or of the item with the on-board optical apparatus.

Still other objects and advantages of the invention will become apparent upon reading the detailed specification and reviewing the accompanying drawing figures.

SUMMARY OF THE INVENTION

The objects and advantages of the invention are provided for by a method of tracking a conditioned motion with an optical sensor that images a plurality of space points $P_i$. The method may include a) recording electromagnetic radiation from the space points $P_i$ on the optical sensor at measured image coordinates $\hat{x}_i, \hat{y}_i$ of measured image points $\hat{p}_i = (\hat{x}_i, \hat{y}_i)$, b) determining a structural redundancy in the measured image points $\hat{p}_i = (\hat{x}_i, \hat{y}_i)$ due to the conditioned motion, and c) employing a reduced representation of the measured image points $\hat{p}_i = (\hat{x}_i, \hat{y}_i)$ by a plurality of rays $\hat{r}_i$ defined in homogeneous coordinates and contained in a projective plane of the optical sensor consonant with the conditioned motion for the tracking.

The objects and advantages of the invention may also be provided for by a method and an optical apparatus for recovering pose parameters from imaged space points $P_i$ using an optical sensor. The electromagnetic radiation from the space points $P_i$ is recorded on the optical sensor at measured image coordinates $\hat{x}_i, \hat{y}_i$ that define the locations of measured image points $\hat{p}_i = (\hat{x}_i, \hat{y}_i)$ in the image plane. A structural redundancy introduced in the measured image points $\hat{p}_i = (\hat{x}_i, \hat{y}_i)$ is determined. A reduced representation of the measured image points $\hat{p}_i = (\hat{x}_i, \hat{y}_i)$ is selected based on the type of structural redundancy. The reduced representation includes rays $\hat{r}_i$ defined in homogeneous coordinates and contained in a projective plane of the optical apparatus. At least one pose parameter of the optical apparatus is then estimated with respect to a canonical pose of the optical apparatus by applying a reduced homography that uses the rays $\hat{r}_i$ of the reduced representation.

When using the reduced representation resulting in reduced homography it is important to set a condition on the motion of the optical apparatus based on the reduced representation. For example, the condition can be strict and enforced by a mechanism constraining the motion, including a mechanical constraint. In particular, the condition is satisfied by substantially bounding the motion to a reference plane. In practice, the condition does not have to be kept the same at all times. In fact, the condition can be adjusted based on one or more of the pose parameters of the optical apparatus. In most cases, the most useful pose parameters involve a linear pose parameter, i.e., a distance from a known point or plane in the environment.

Depending on the embodiment, the type of optical apparatus and on the condition placed on the motion of the optical apparatus, the structural redundancy will differ. In some embodiments, the structural redundancy will be substantially radial, meaning that the redundancy of information in measured image points $\hat{p}_i = (\hat{x}_i, \hat{y}_i)$ is redundant along a radial direction from the center of the optical sensor or from the point of view O established by the optics of the optical apparatus. In other cases, the structural redundancy will be substantially linear (e.g., along vertical or horizontal lines). Still in other cases, the structural redundancy will be perpendicular to any arbitrary plane to which the motion of the optical apparatus is confined. The condition or constraint on the motion of the optical apparatus can be within certain bounds/levels of acceptable tolerance.

The invention teaches closed-form solutions for the orthogonal base cases (radial, vertical and horizontal). A generalized solution for computing the reduced homography when the motion of the optical apparatus is confined to any arbitrary plane is disclosed. Permutation matrices and other mathematical transformations for converting to and from the various cases of conditioned motion are also disclosed. In accordance with the invention, a measurement bias can be computed in the determination of translational pose parameters, when the motion confinement is outside of acceptable tolerance bounds/levels. This measurement bias can be determined by comparing the translational pose parameters determined using the reduced homography, and comparing them to the translational pose determined by an auxiliary sensor or measurement. The bias can be used to tune the optical apparatus, and to perform filtering (Quality Assurance) on the results computed using reduced homography.

The present invention, including preferred embodiments, will now be described in detail in the below detailed description with reference to the attached drawing figures.

BRIEF DESCRIPTION OF THE DRAWING FIGURES

Figure 1:
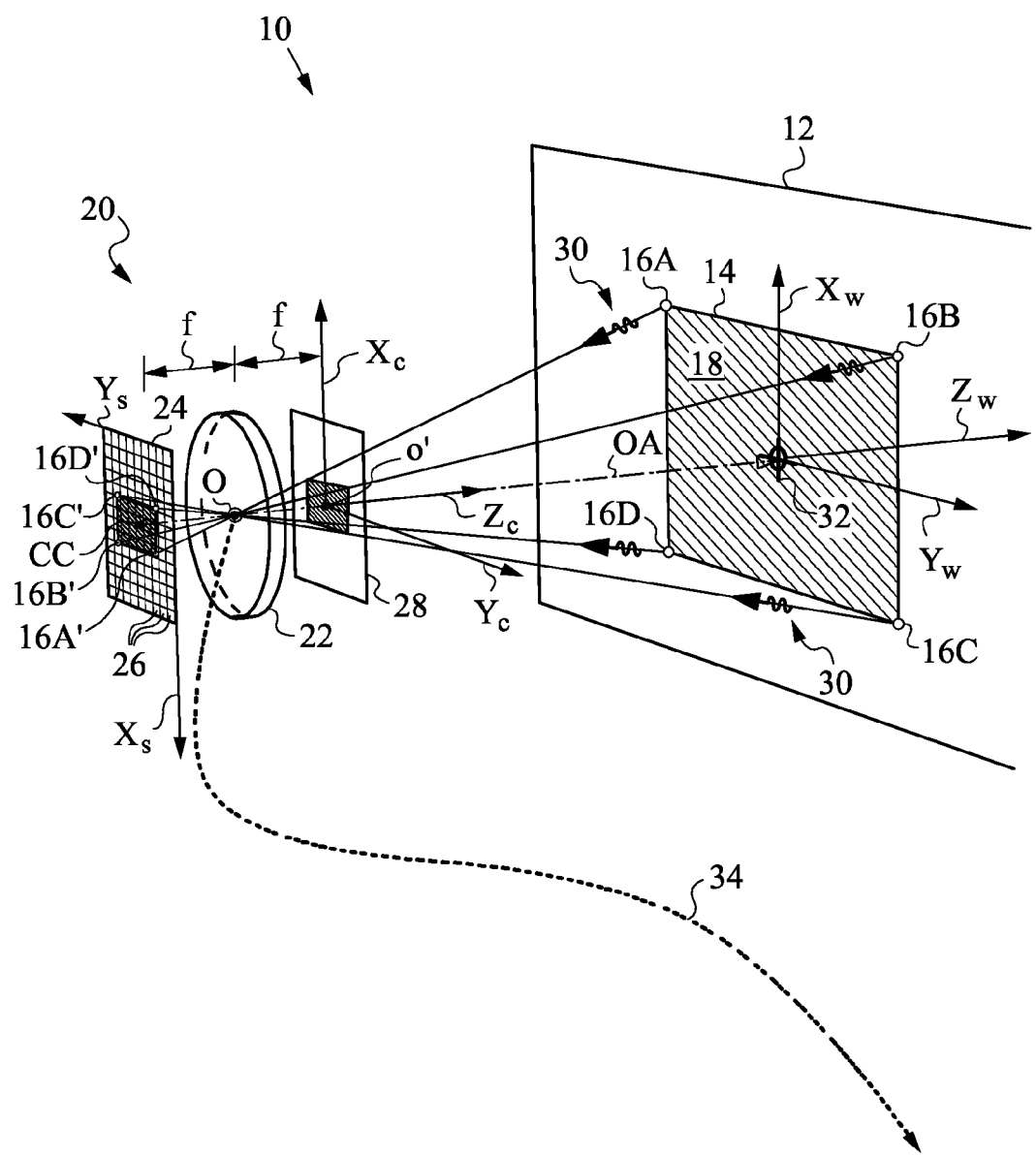
FIG. 1 (Prior Art) is perspective view of a camera viewing a stationary object in a three-dimensional environment.
Figure 2:
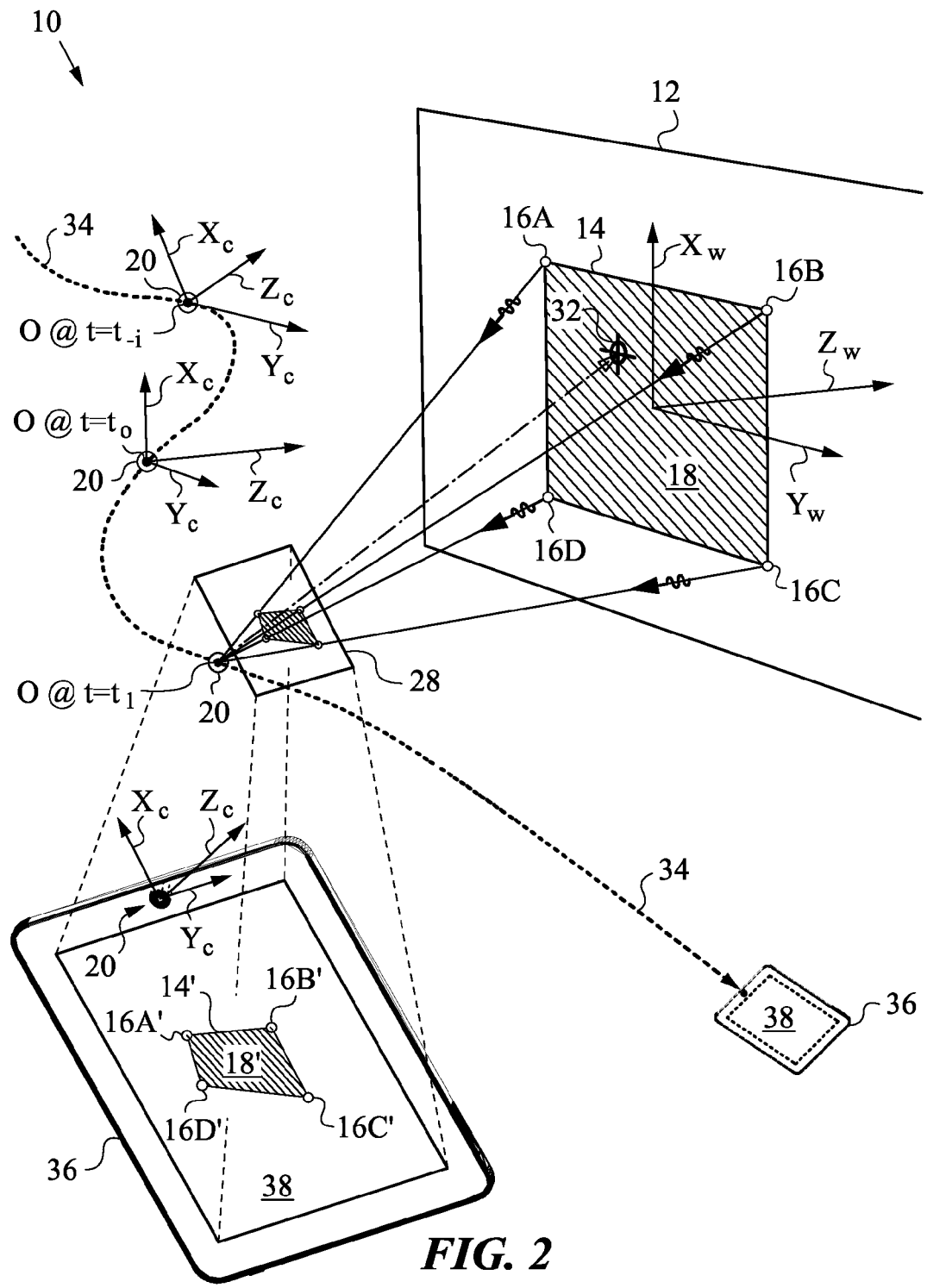
FIG. 2 (Prior Art) is a perspective view of the camera of FIG. 1 mounted on-board an item and deployed in a standard pose recovery approach using the stationary object as ground truth reference.
Figure 3:
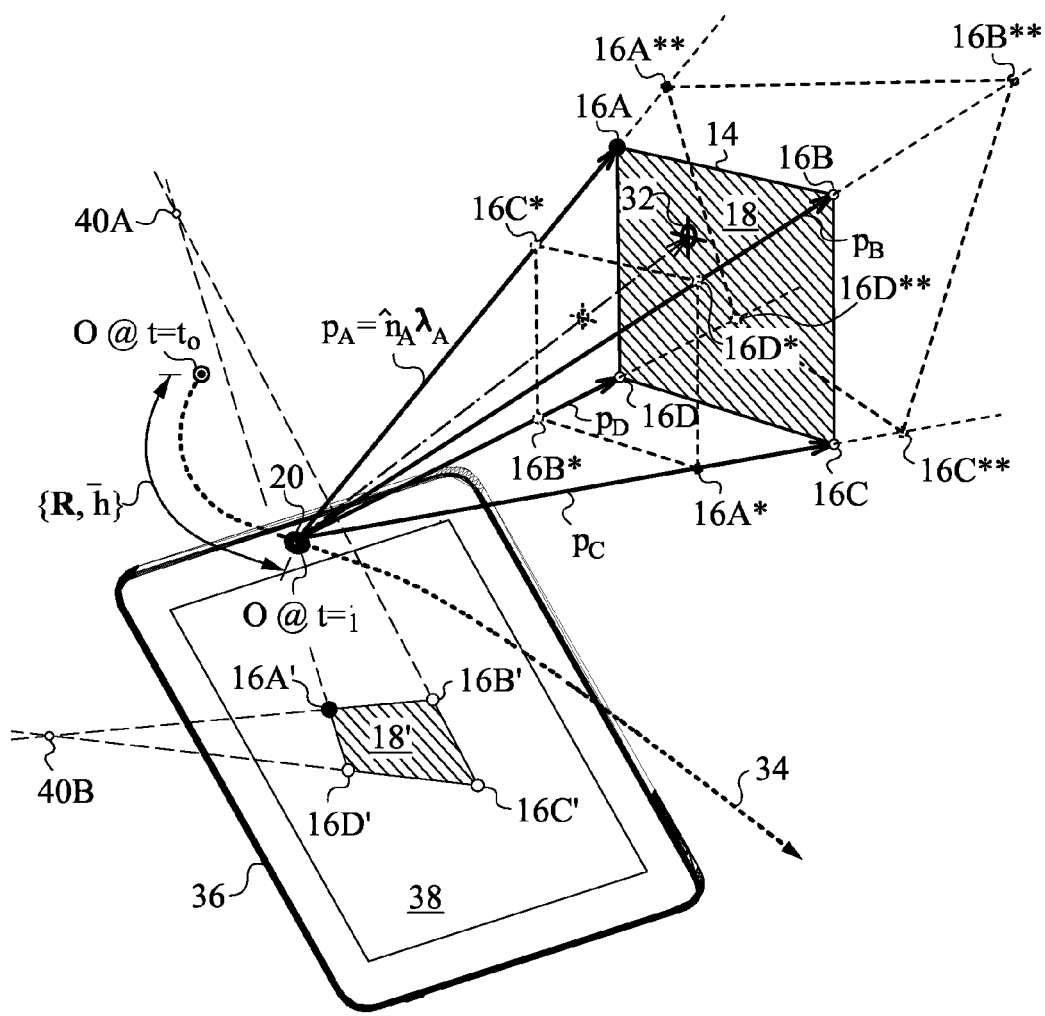
FIG. 3 (Prior Art) is a perspective diagram illustrating in more detail the standard approach to pose recovery (recovery of the camera's extrinsic parameters) of FIG. 2.
Figure 4A:
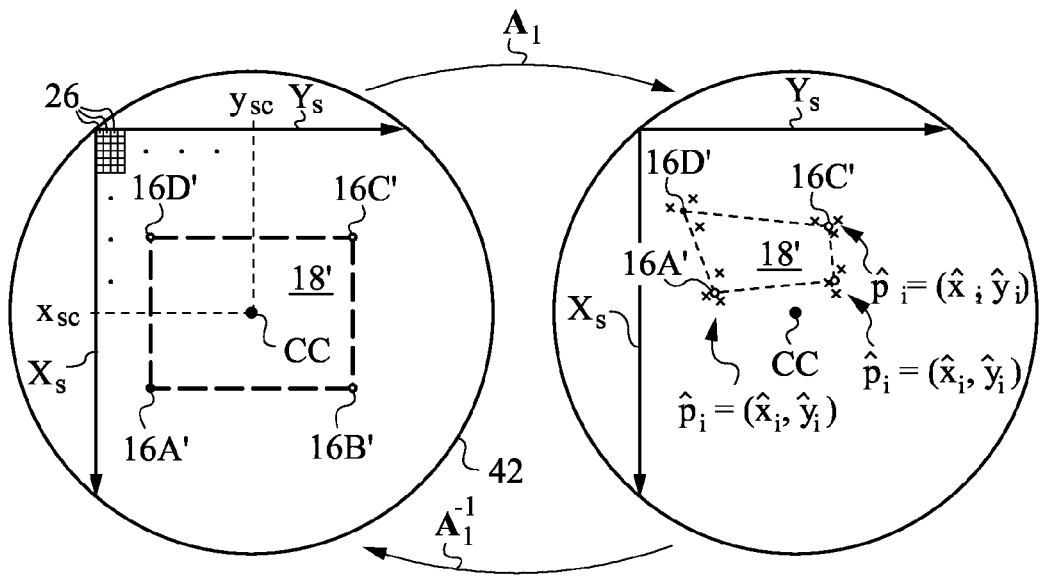
Figure 4B:
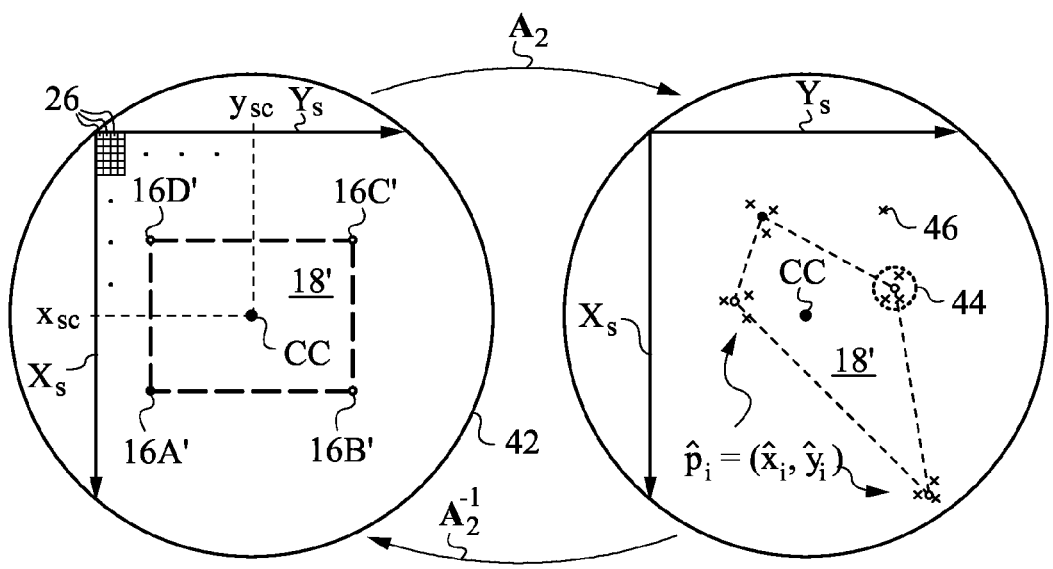

FIG. 4A-B (Prior Art) are diagrams that illustrate pose recovery by the on-board camera of FIG. 1 based on images of the stationary object in realistic situations involving the computation of collineation matrices A (also referred to as homography matrices) in the presence of normal noise.

Figure 5A:
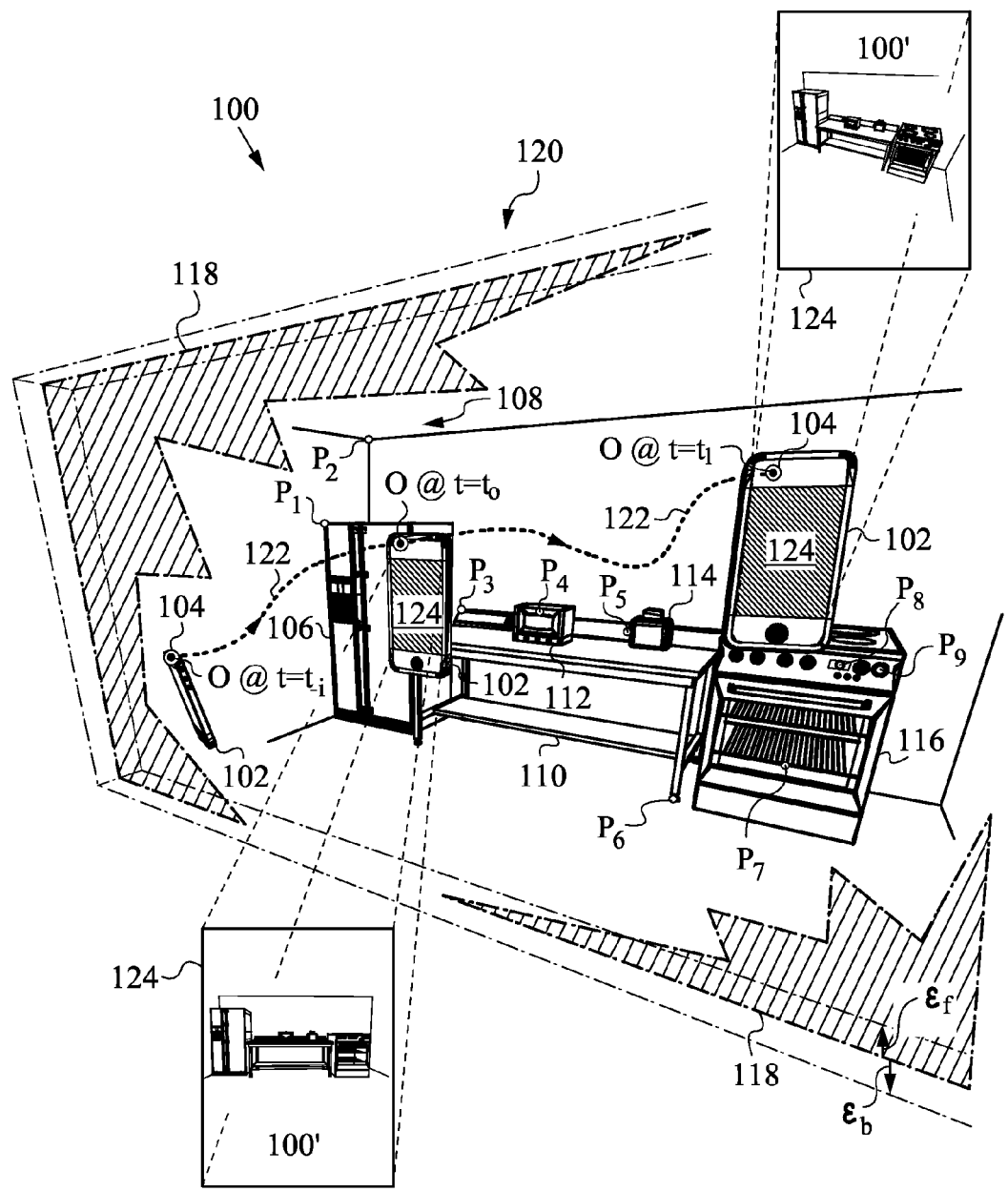

FIG. 5A is a perspective view of an environment and an item with an on-board optical apparatus for practicing a reduced homography H according to an embodiment of the invention.

Figure 5B:
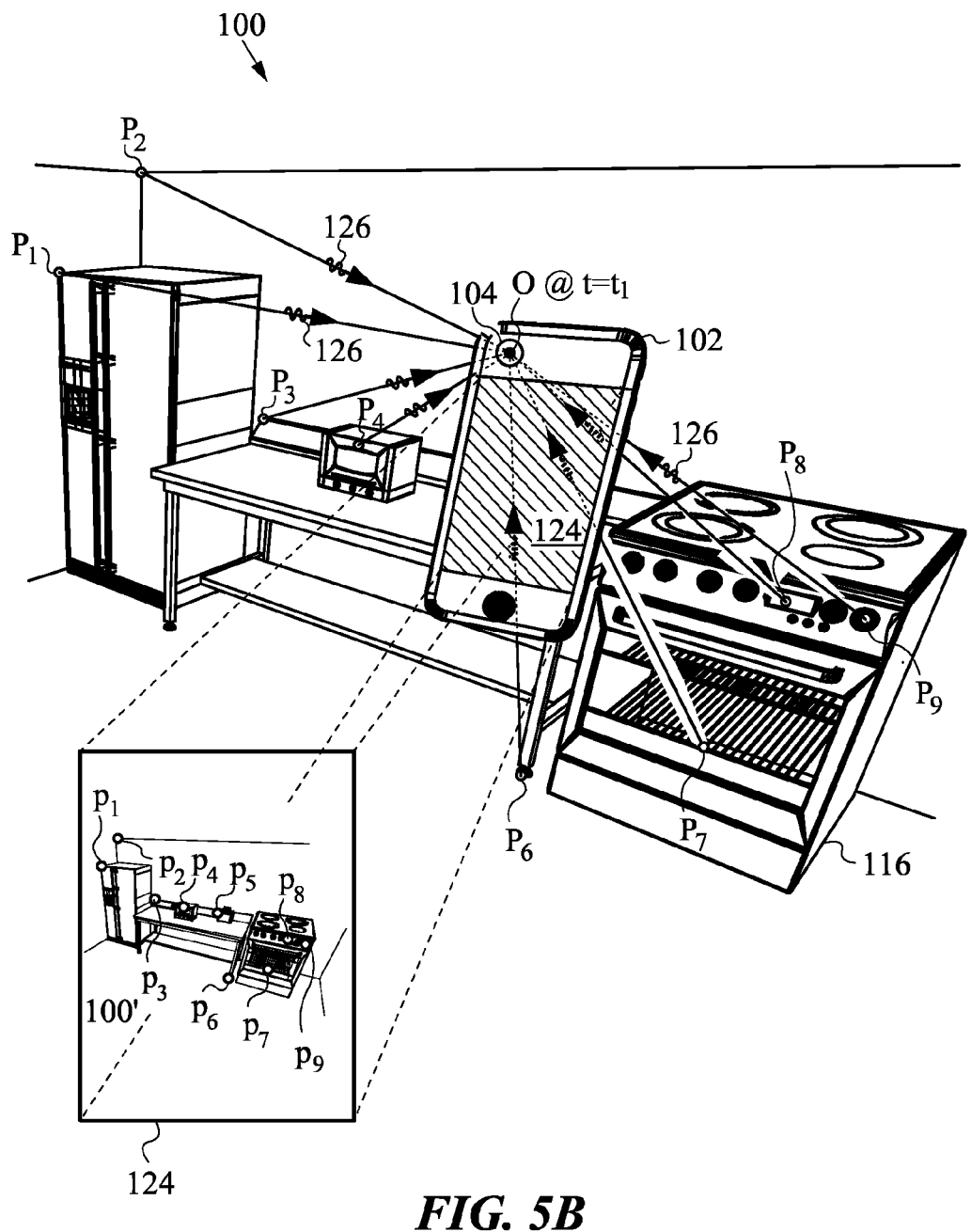

FIG. 5B is a more detailed perspective view of the environment shown in FIG. 5A and a more detailed image of the environment obtained by the on-board optical apparatus.

Figure 5C:
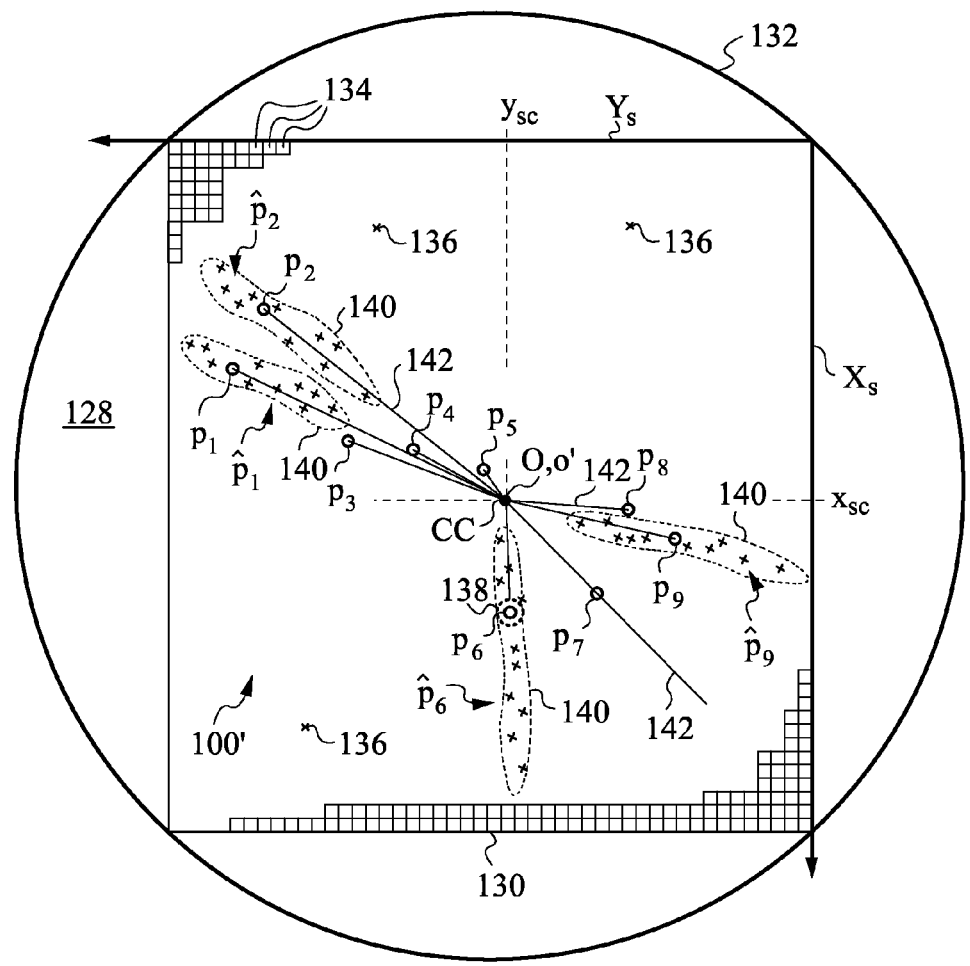

FIG. 5C is a diagram illustrating the image plane of the on-board optical apparatus where measured image points $\hat{p}_i$ corresponding to the projections of space points $P_i$ representing known optical features in the environment of FIG. 5A are found.

Figure 5D:
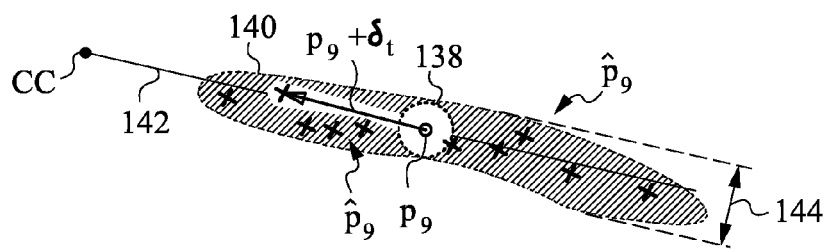

FIG. 5D is a diagram illustrating the difference between normal noise and structural uncertainty in measured image points $\hat{p}_i$.

Figure 5E:
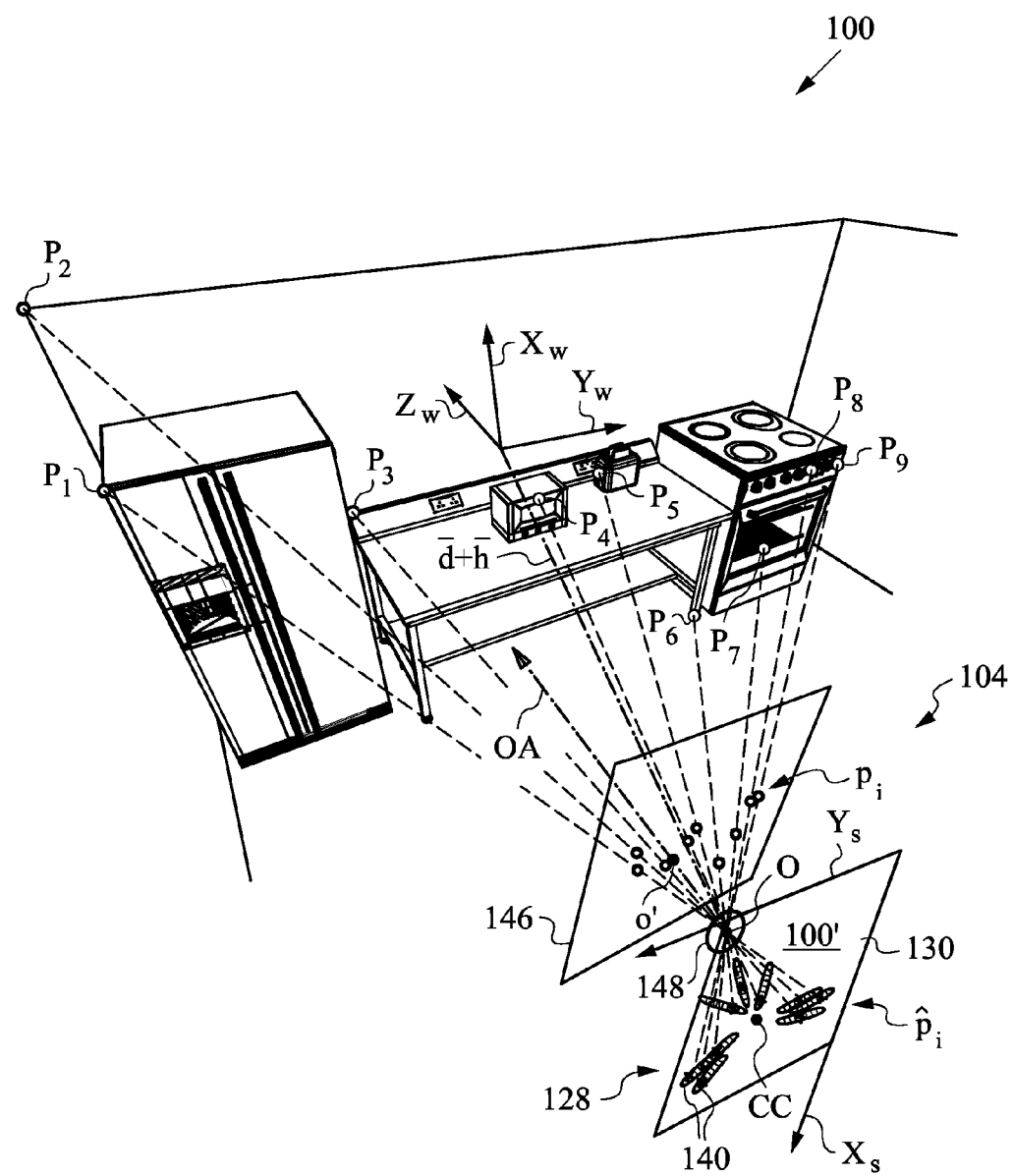

FIG. 5E is another perspective view of the environment of FIG. 5A illustrating the ideal projections of space points $P_i$ to ideal image points $p_i$ shown in the projective plane and measured image points $\hat{p}_i$ exhibiting structural uncertainty shown in the image plane.

FIG. 6A-D are isometric views of a gimbal-type mechanism that aids in the visualization of 3D rotations used to describe the orientation of items in any 3D environment.

Figure 6A:
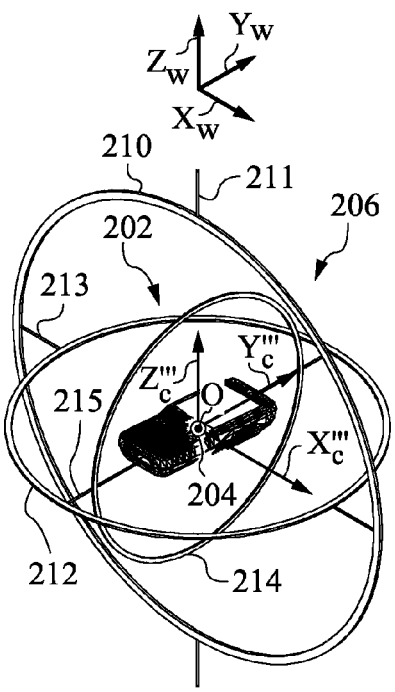
Figure 6B:
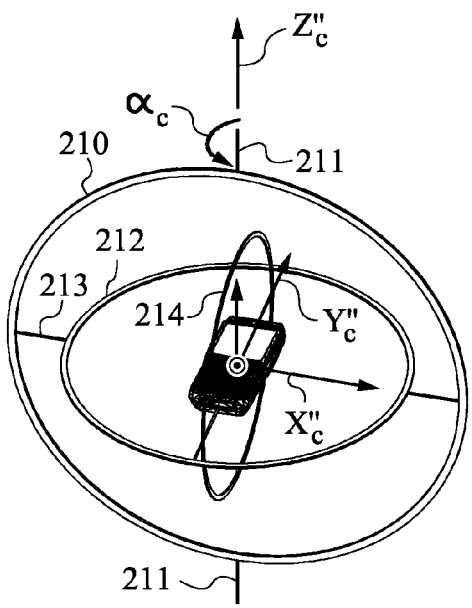
Figure 6C:
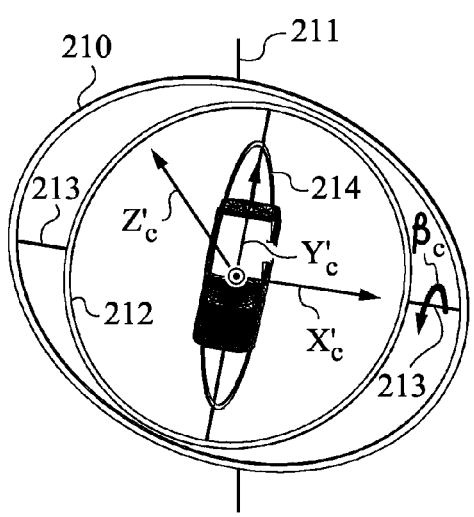
Figure 6D:
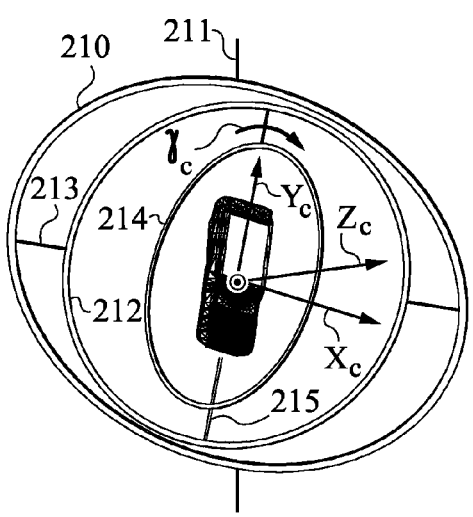
Figure 6E:
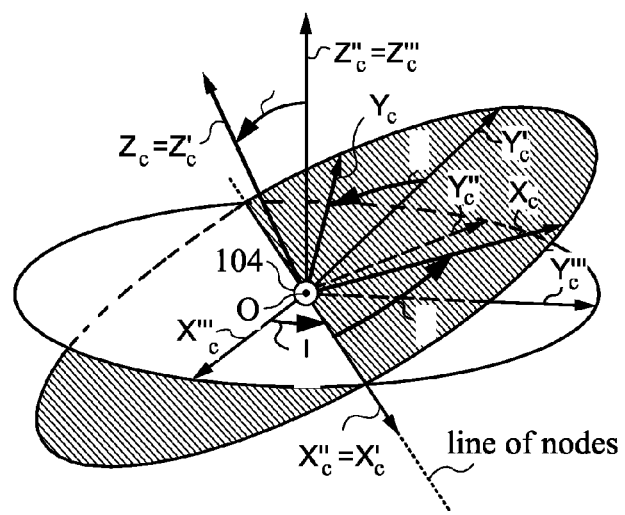

FIG. 6E is an isometric diagram illustrating the Euler rotation convention used in describing the orientation portion of the pose of the on-board optical apparatus of FIG. 5A.

Figure 7:
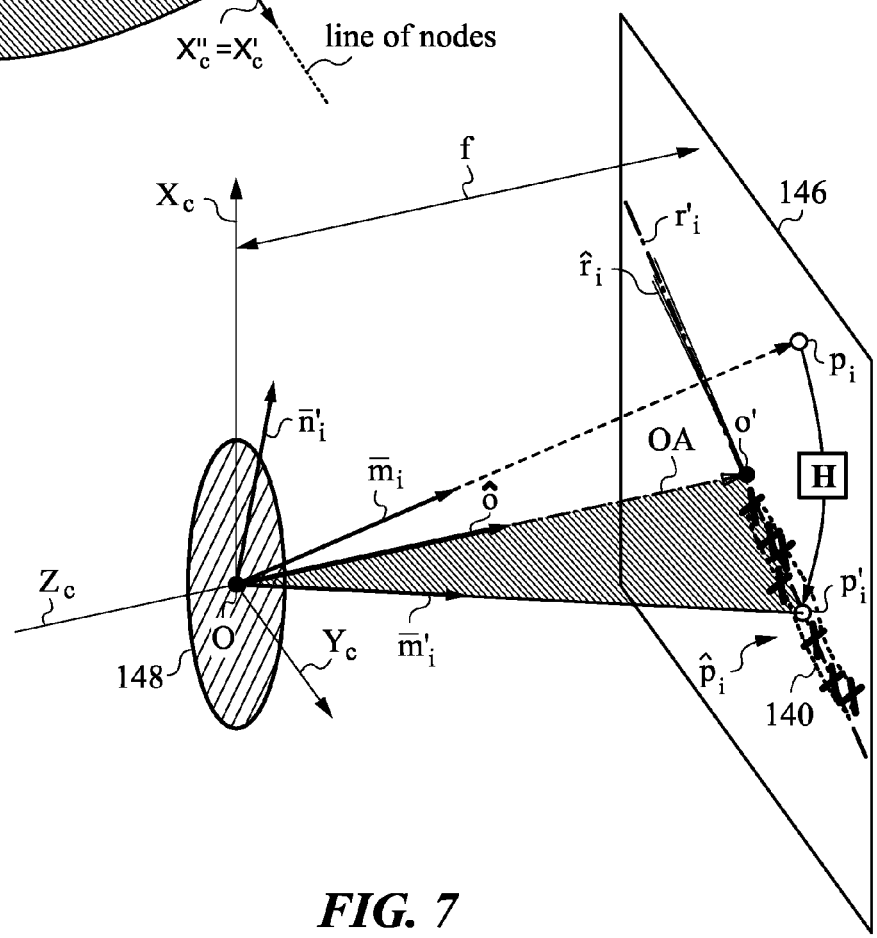

FIG. 7 is a three-dimensional diagram illustrating a reduced representation of measured image points $\hat{p}_i$ with rays $\hat{r}_i$ in accordance with an embodiment of the invention.

Figure 8:
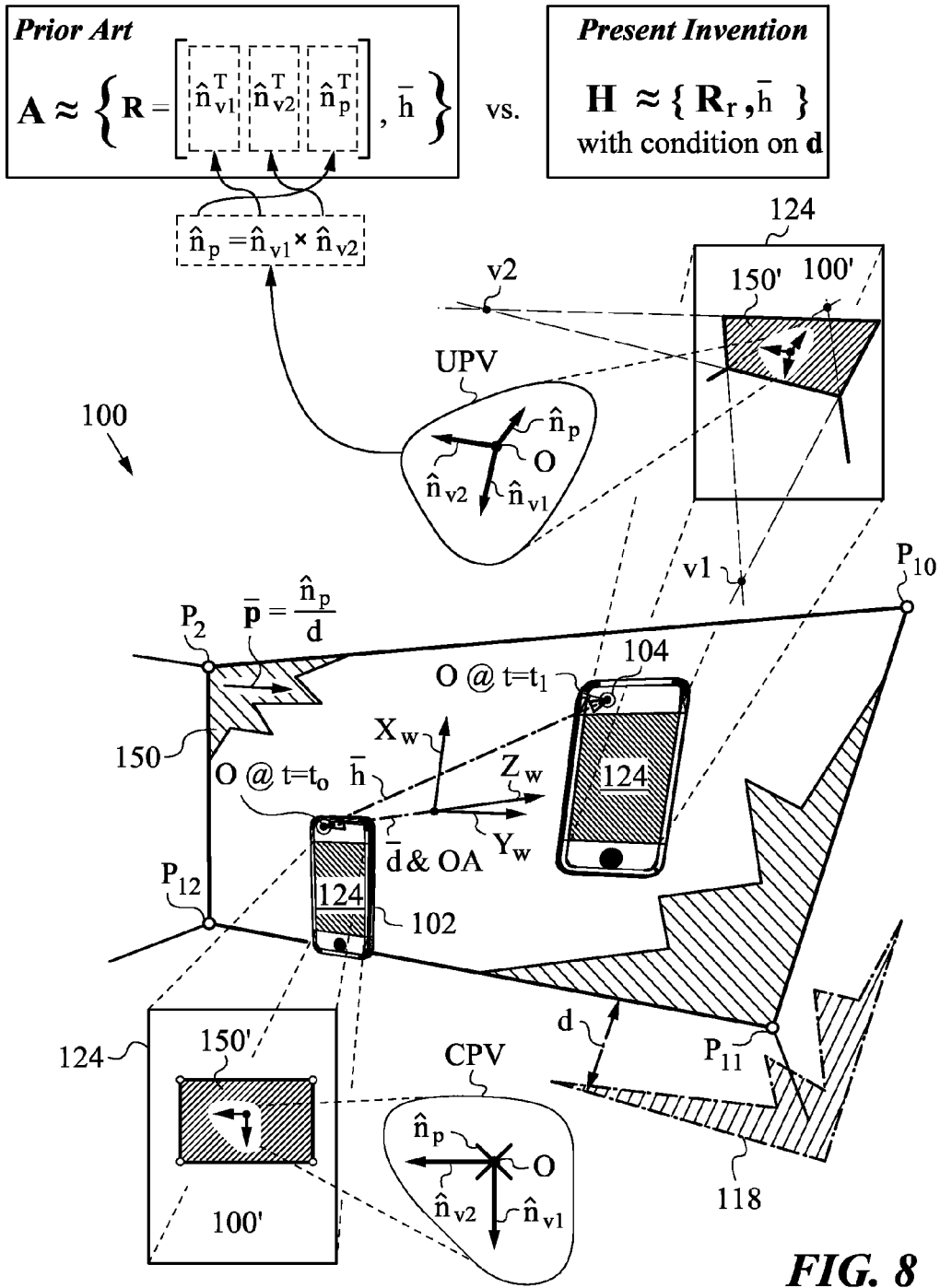

FIG. 8 is a perspective view of the environment of FIG. 5A with all stationary objects removed and with the item equipped with the on-board apparatus being shown at times $t=t_o$ (canonical pose) and at time $t=t_1$ (unknown pose).

Figure 9A:
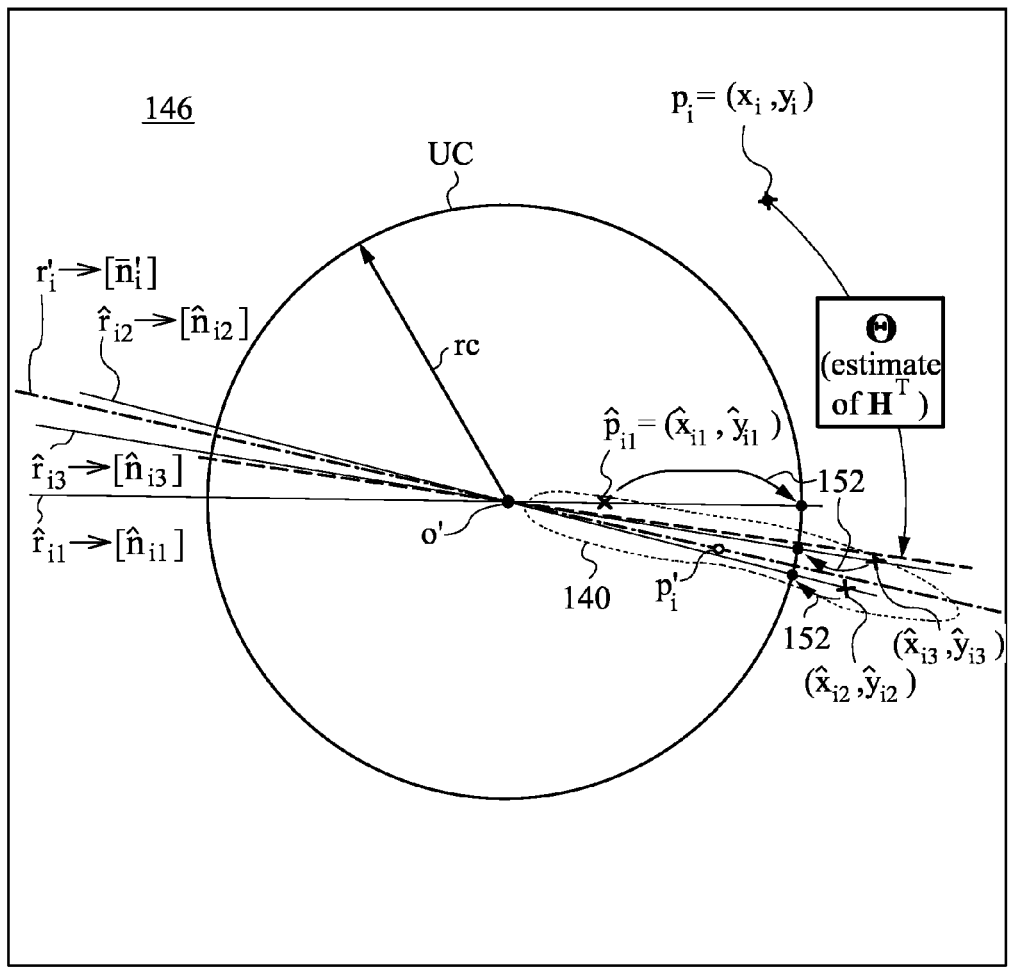

FIG. 9A is a plan view diagram of the projective plane illustrating pose estimation based on a number of measured image points $\hat{p}_i$ obtained in the same unknown pose and using the reduced representation according to an embodiment of the invention.

Figure 9B:
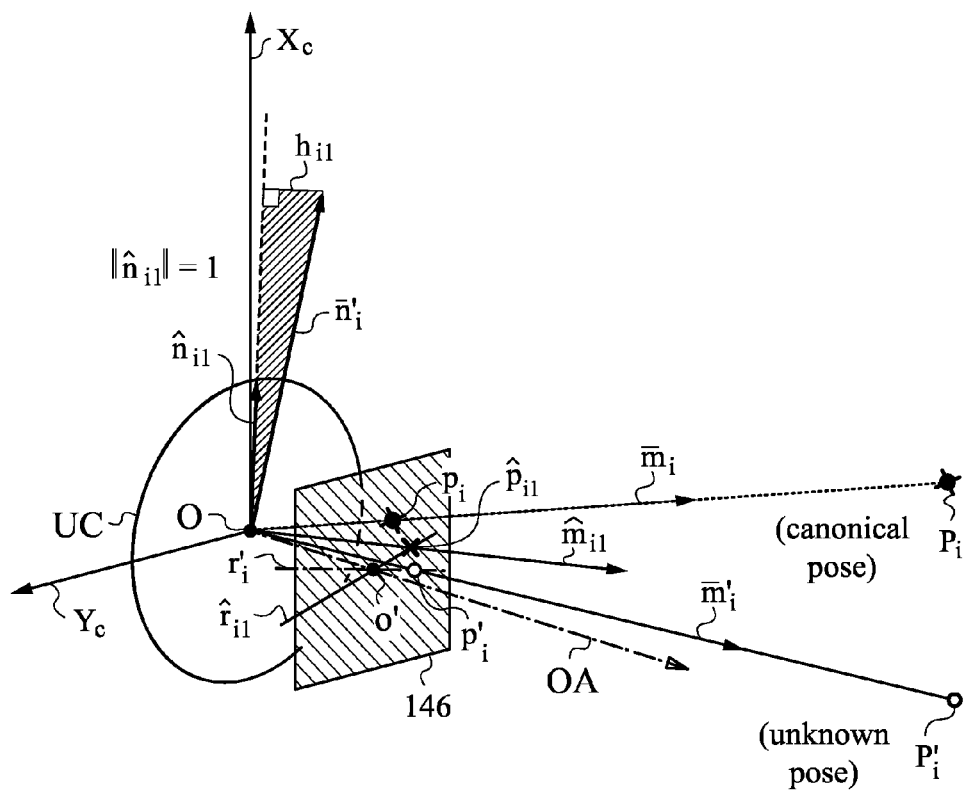

FIG. 9B is a diagram illustrating the disparity $h_{i1}$ between vector $\bar{n}_i'$ representing space point $P_i$ in the unknown pose and normalized n-vector $\hat{n}_{i1}$ derived from first measurement point $\hat{p}_i=(\hat{x}_i,\hat{y}_i)$ of FIG. 9A and corresponding to space point $P_i$ as seen in the unknown pose.

Figure 10A:
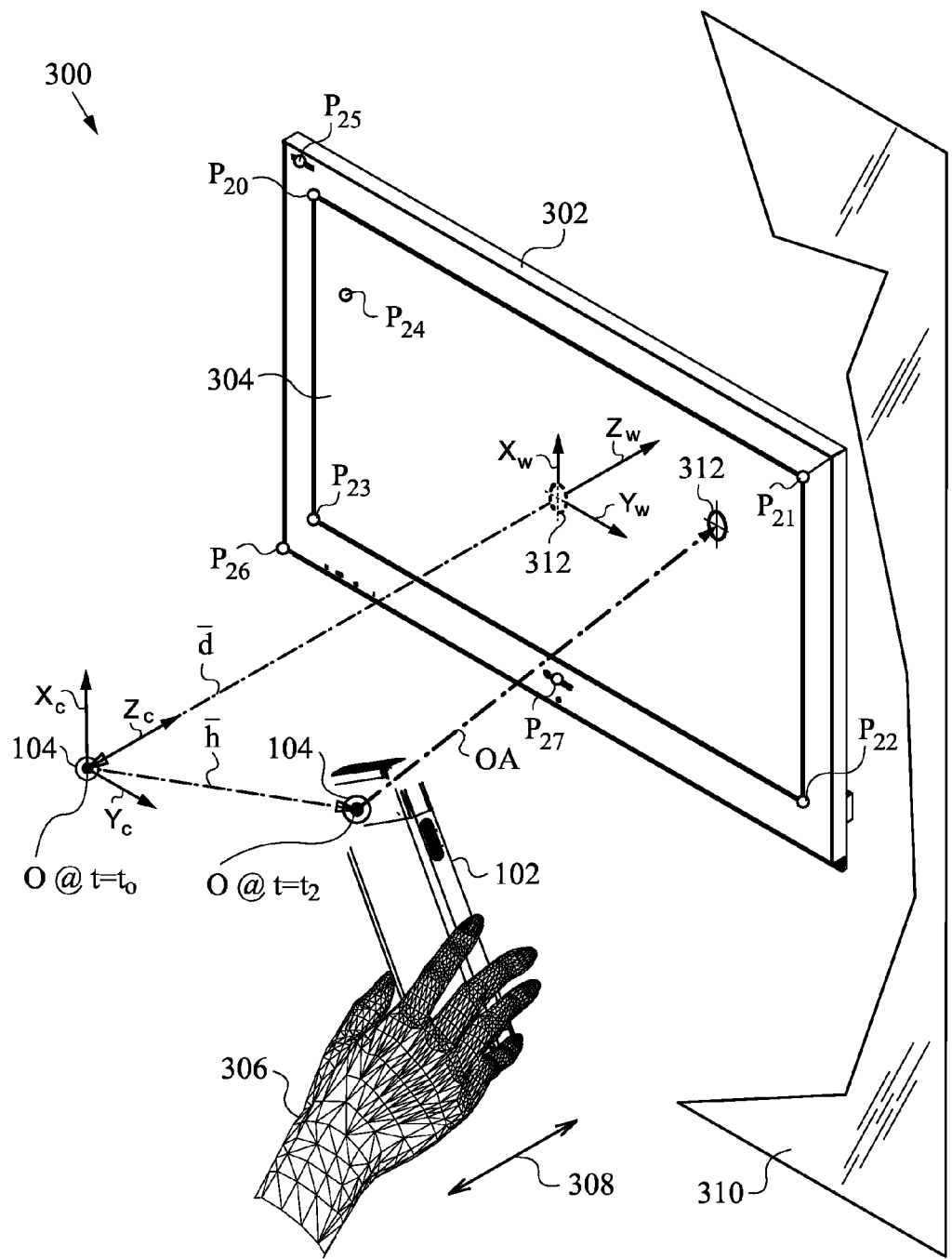

FIG. 10A is an isometric view illustrating recovery of pose parameters of the item with on-board camera in another environment using a television as the stationary object.

Figure 10B:
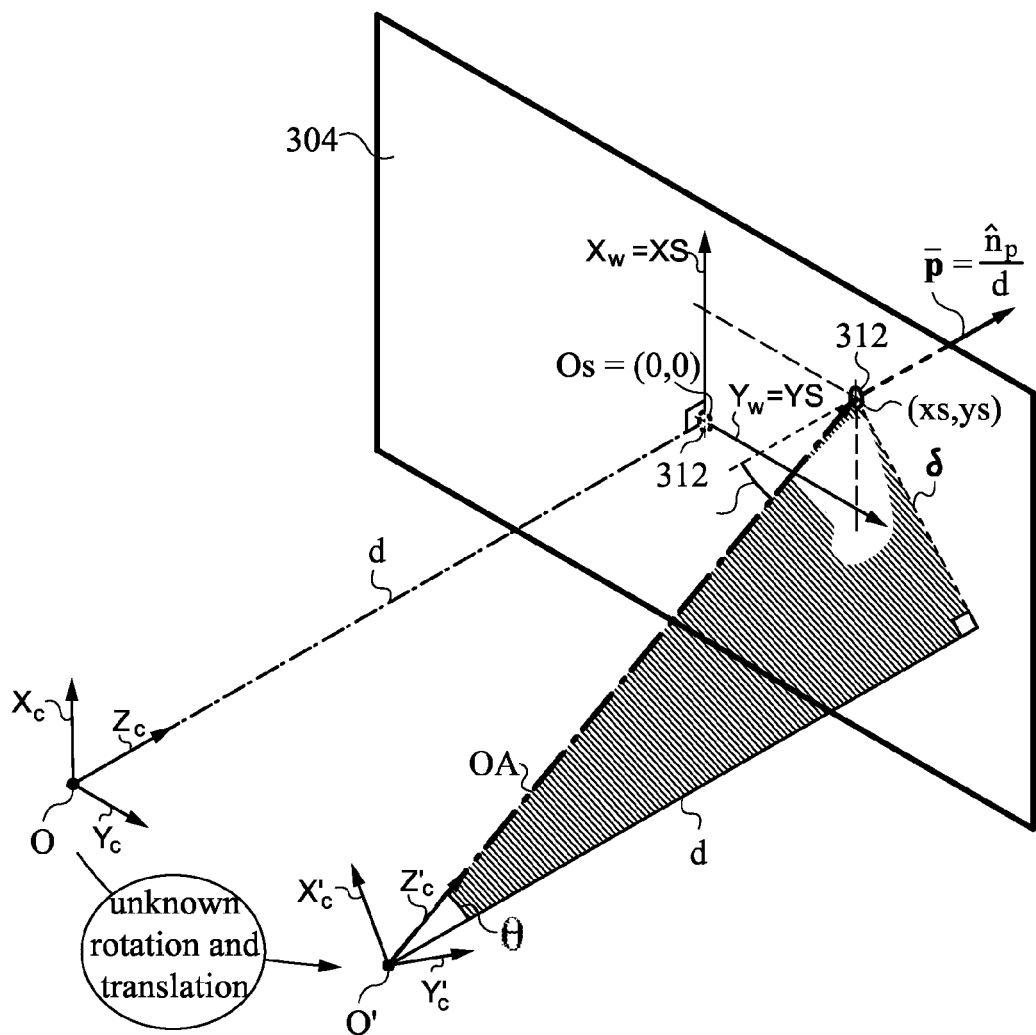

FIG. 10B is an isometric view showing the details of recovery of pose parameters of the item with on-board camera in the environment of FIG. 10A.

Figure 10C:
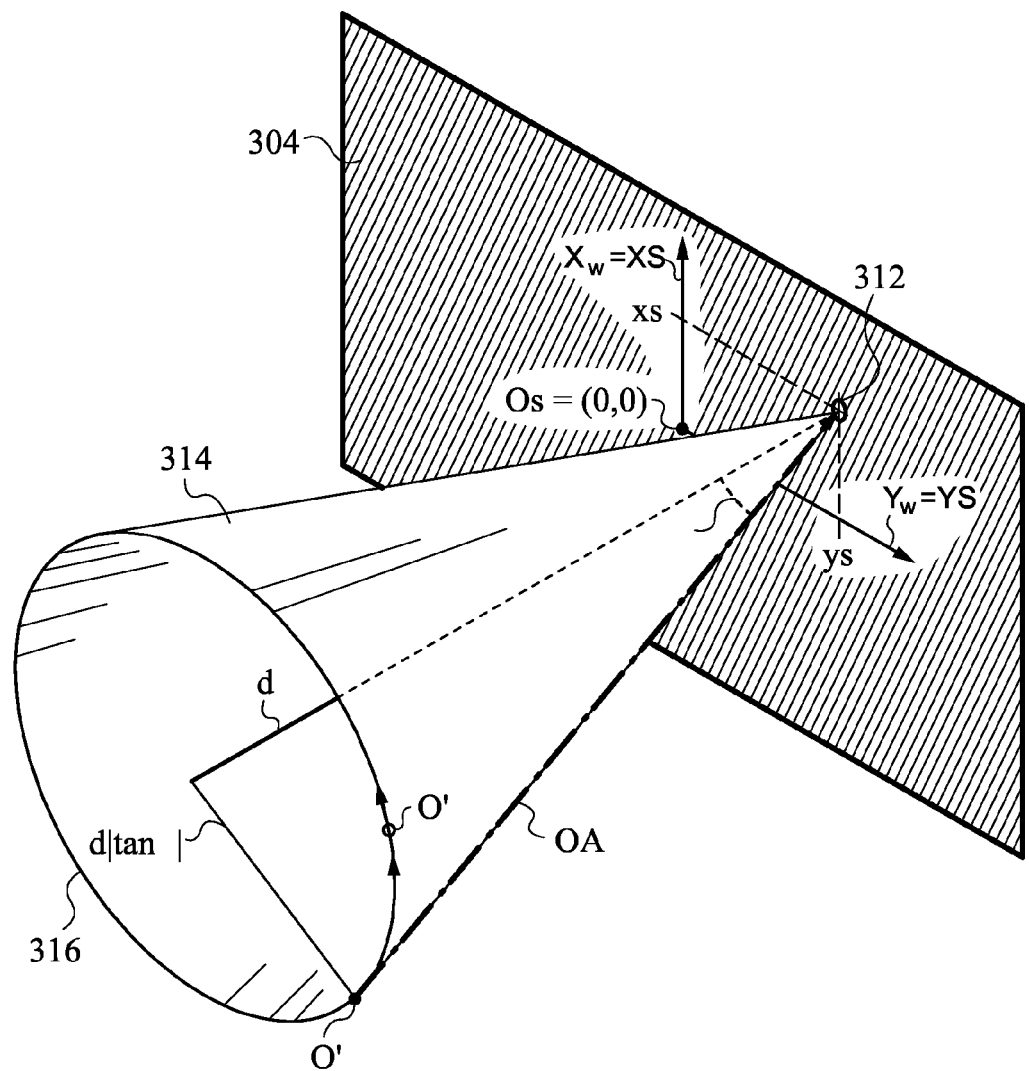

FIG. 10C is an isometric diagram illustrating the details of recovering the tilt angle $\theta$ of the item with on-board camera in the environment of FIG. 10A.

Figure 11:
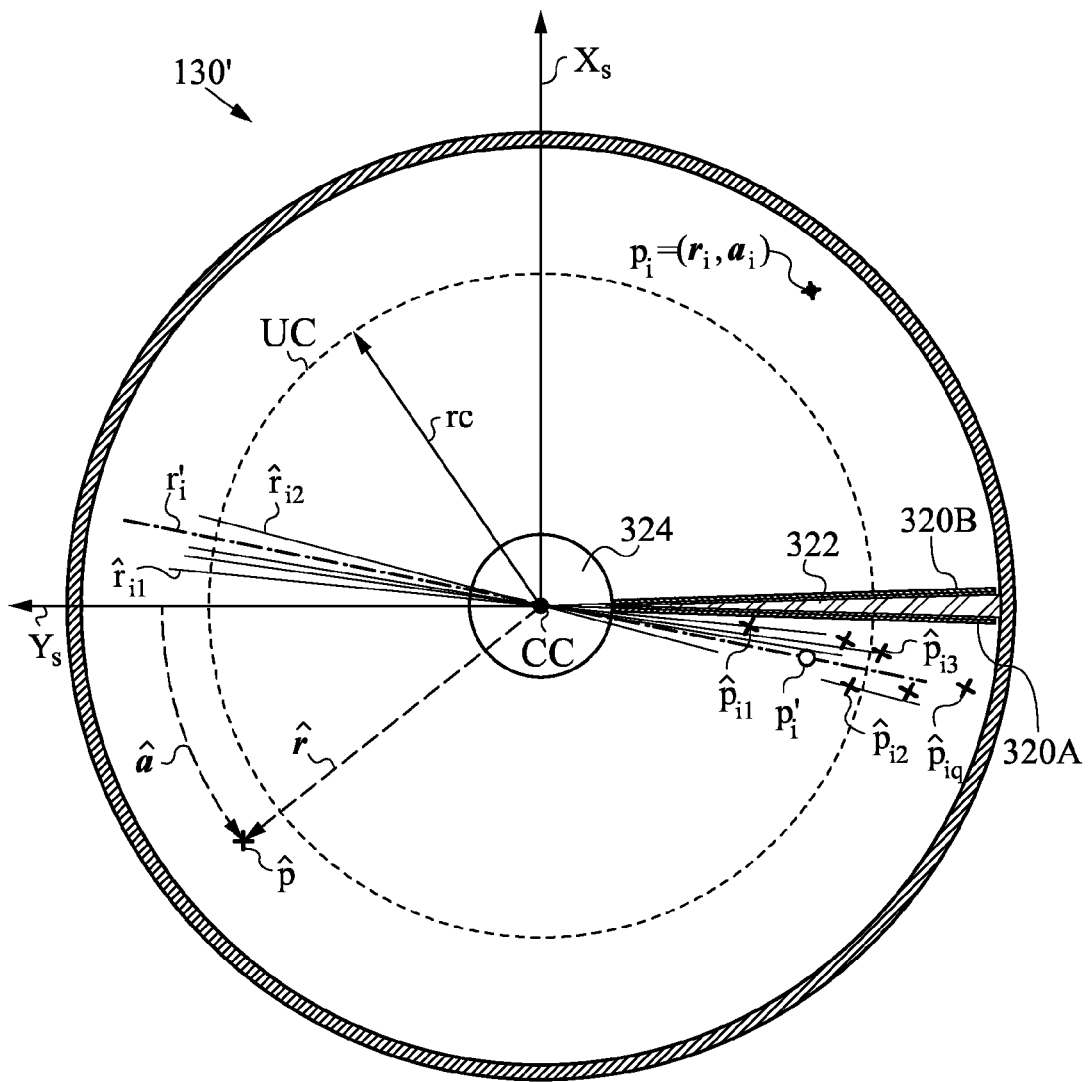

FIG. 11 is a plan view of a preferred optical sensor embodied by a azimuthal position sensing detector (PSD) when the structural uncertainty is radial.

Figure 12A:
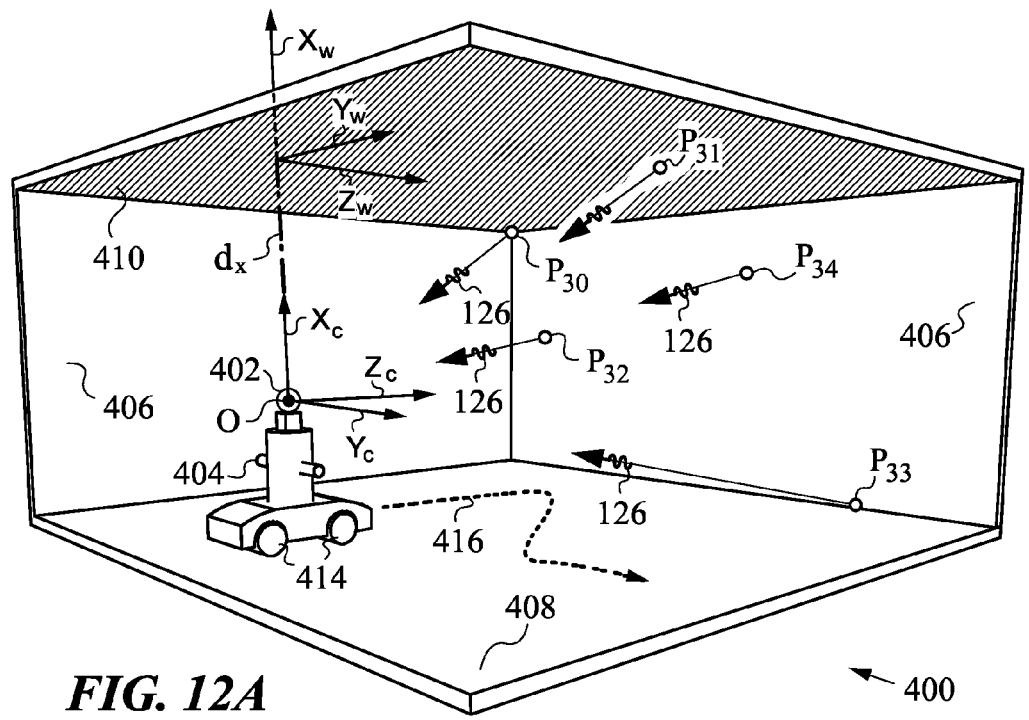

FIG. 12A is a three-dimensional perspective view of another environment in which an optical apparatus is mounted at a fixed height on a robot and structural uncertainty is linear.

Figure 12B:
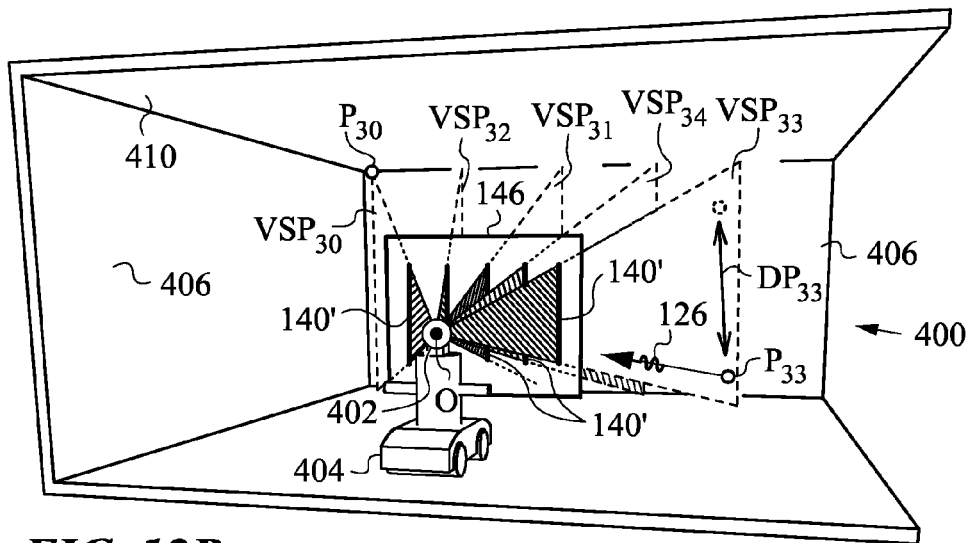

FIG. 12B is a three-dimensional perspective view of the environment and optical apparatus of FIG. 12A showing the specific type of linear structural uncertainty that presents as substantially parallel vertical lines.

Figure 12C:
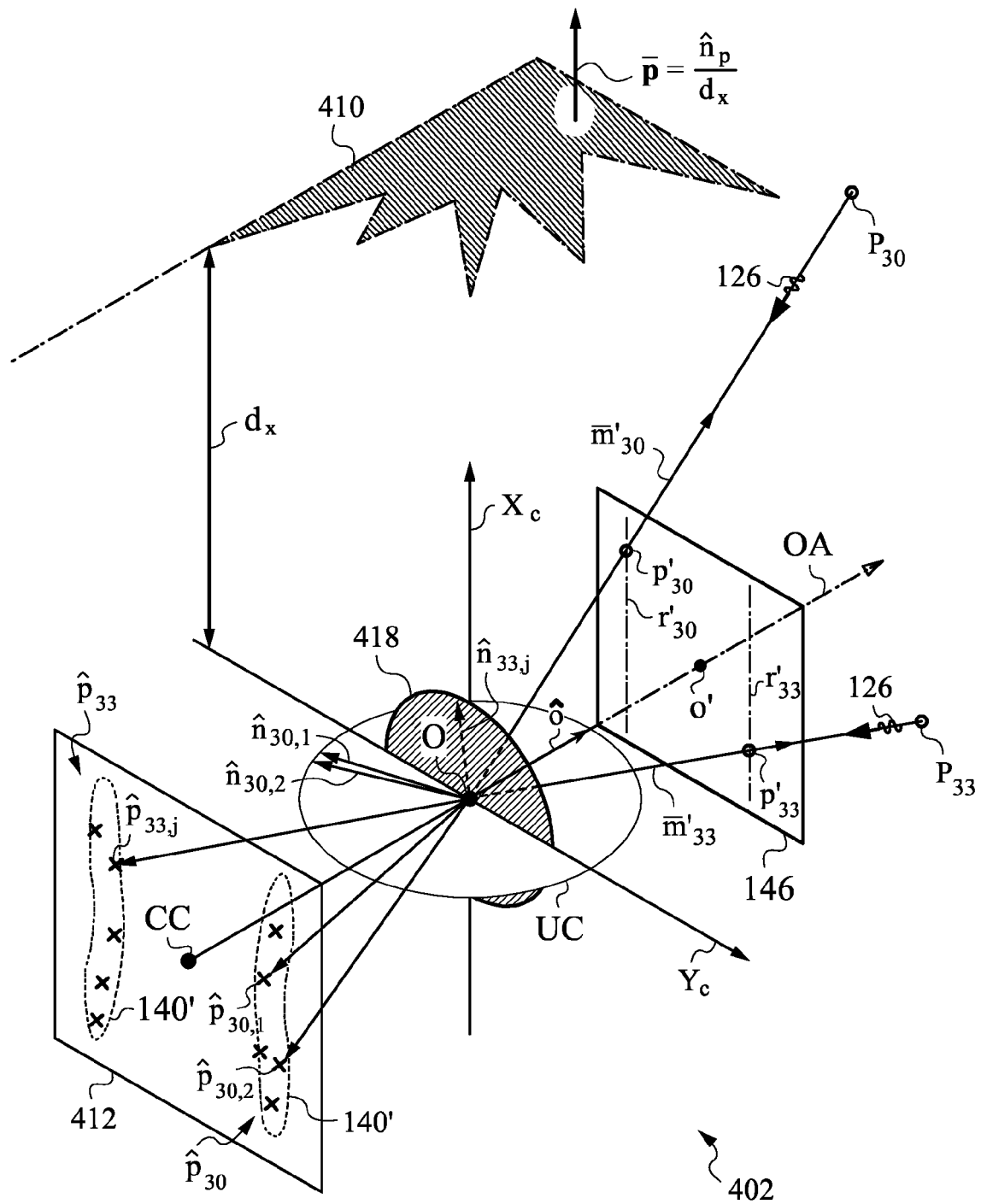

FIG. 12C is a diagram showing the linear structural uncertainty from the point of view of the optical apparatus of FIG. 12A.

Figure 13:
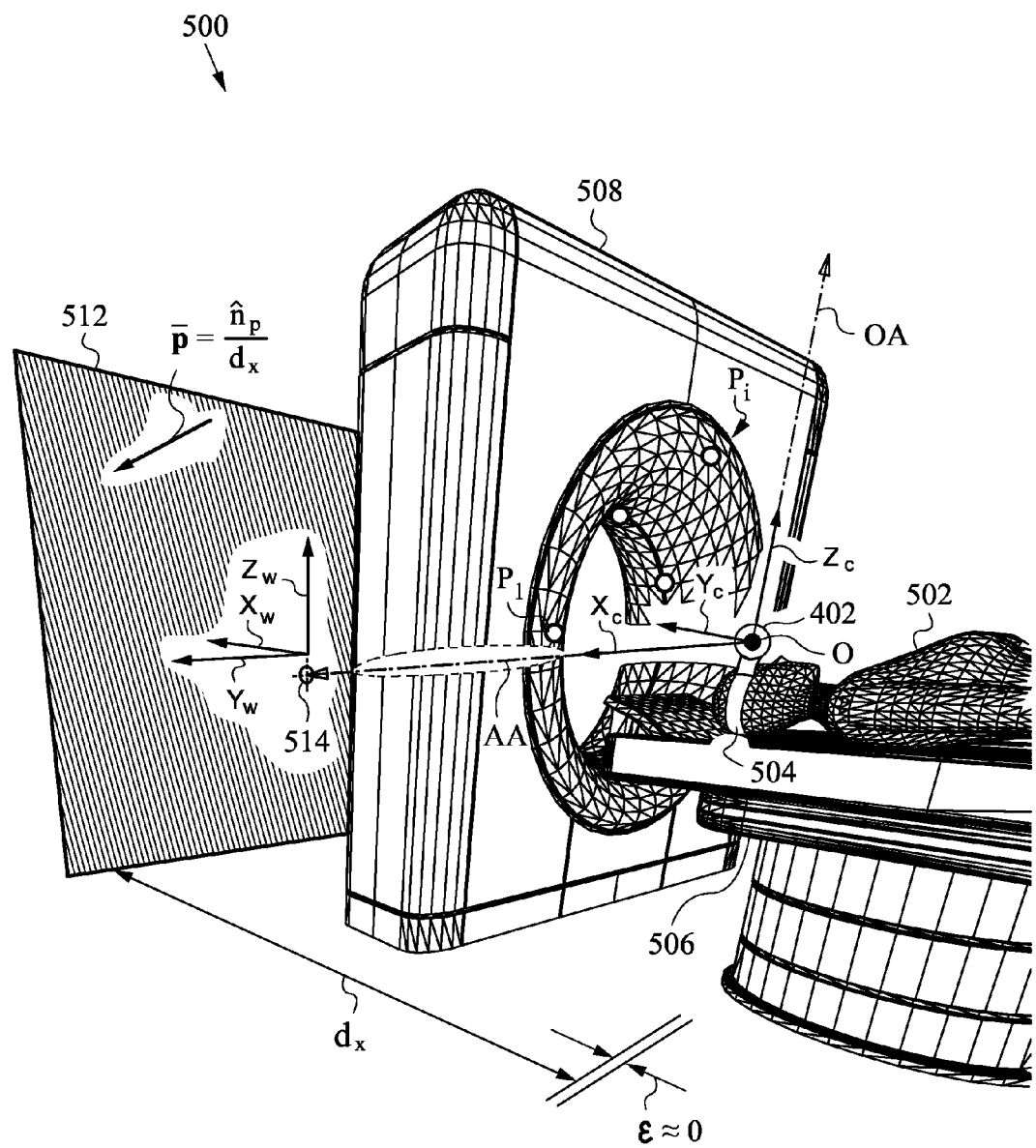

FIG. 13 is a perspective view diagram showing how the optical apparatus of FIG. 12A can operate in the presence of vertical linear structural uncertainty in a clinical setting for recovery of an anchor point that aids in subject alignment.

Figure 14A:
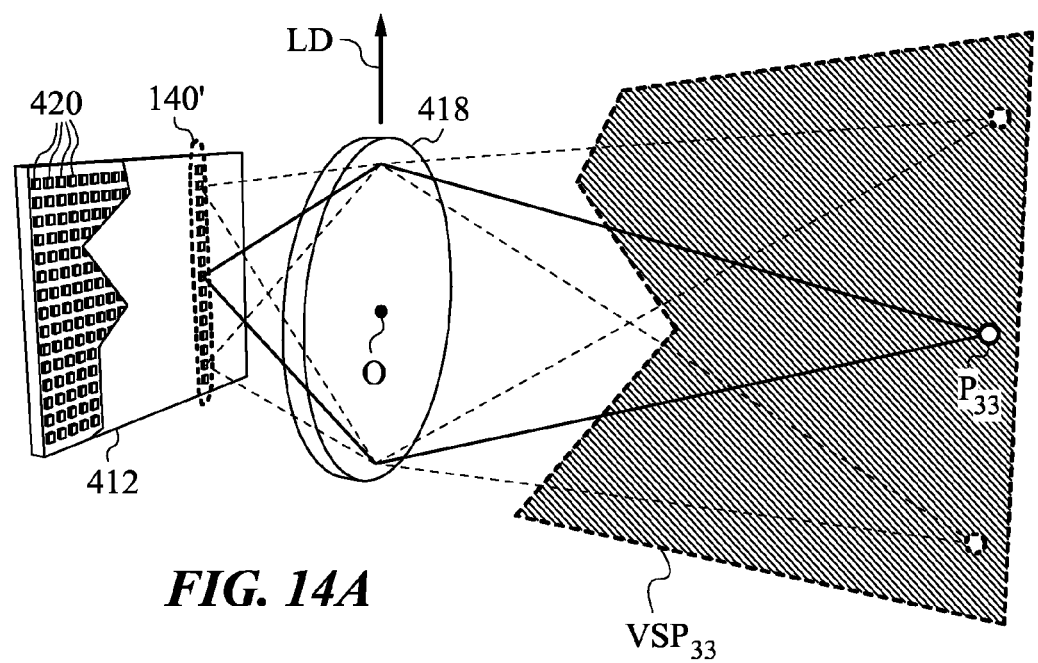

FIG. 14A is a three-dimensional view of the optical sensor and lens deployed in optical apparatus of FIG. 12A.

Figure 14B:
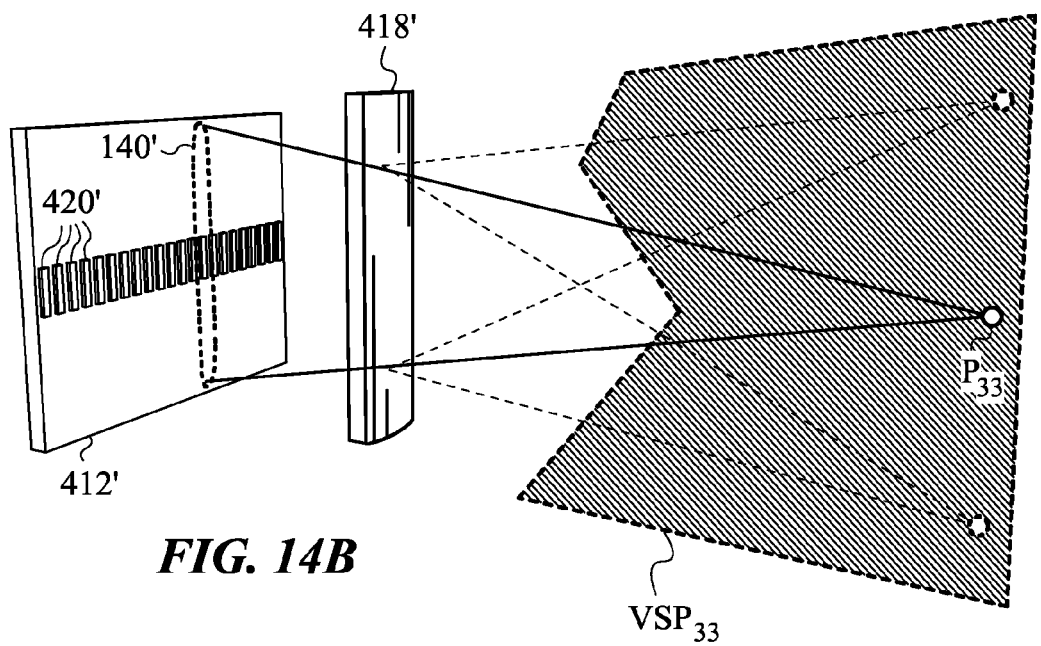

FIG. 14B is a three-dimensional view of a preferred optical sensor embodied by a line camera and a cylindrical lens that can be deployed by the optical apparatus of FIG. 12A when faced with structural uncertainty presenting substantially vertical lines.

Figure 15:
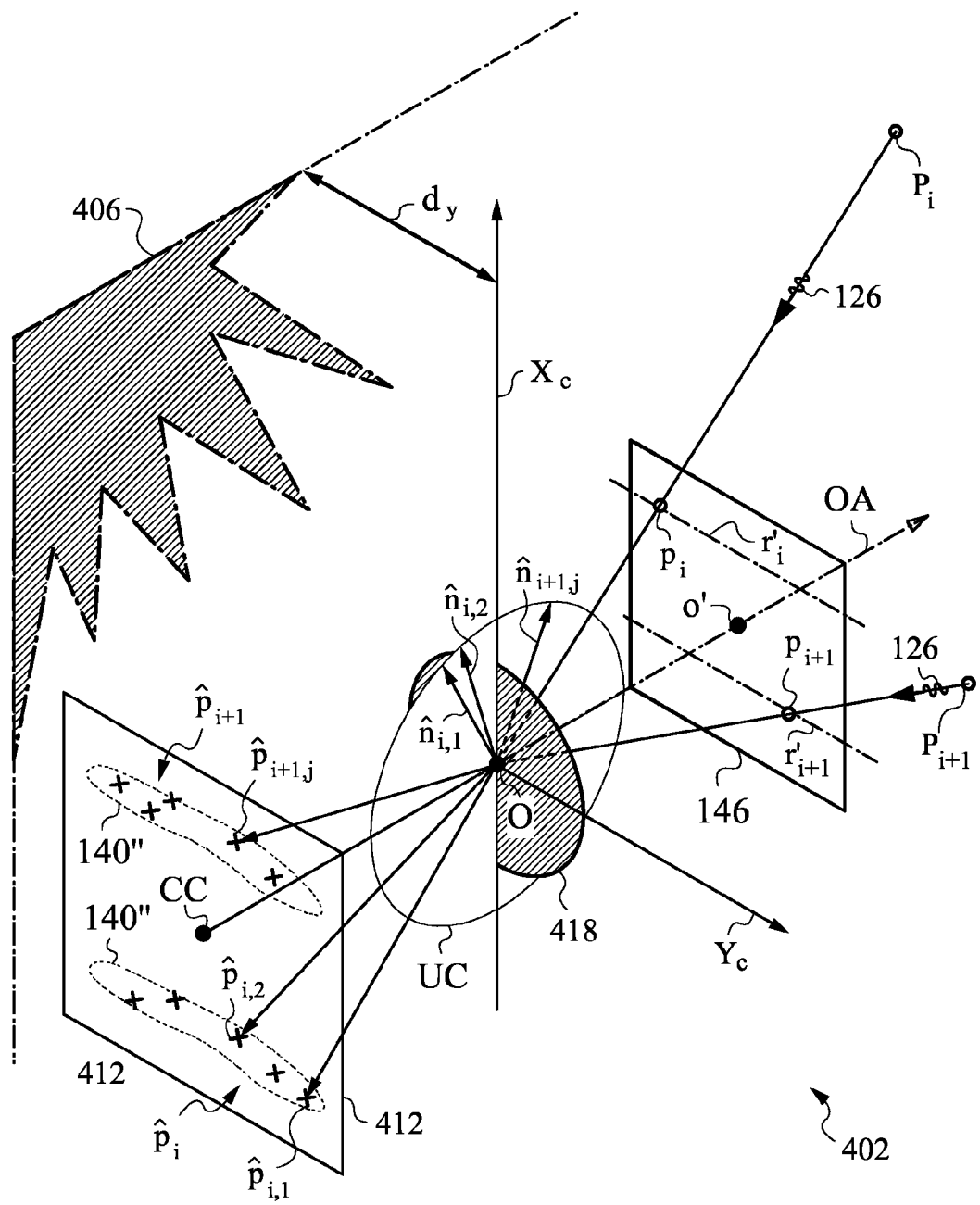

FIG. 15 is a diagram showing horizontal linear structural uncertainty from the point of view of the optical apparatus of FIG. 12A.

Figure 16A:
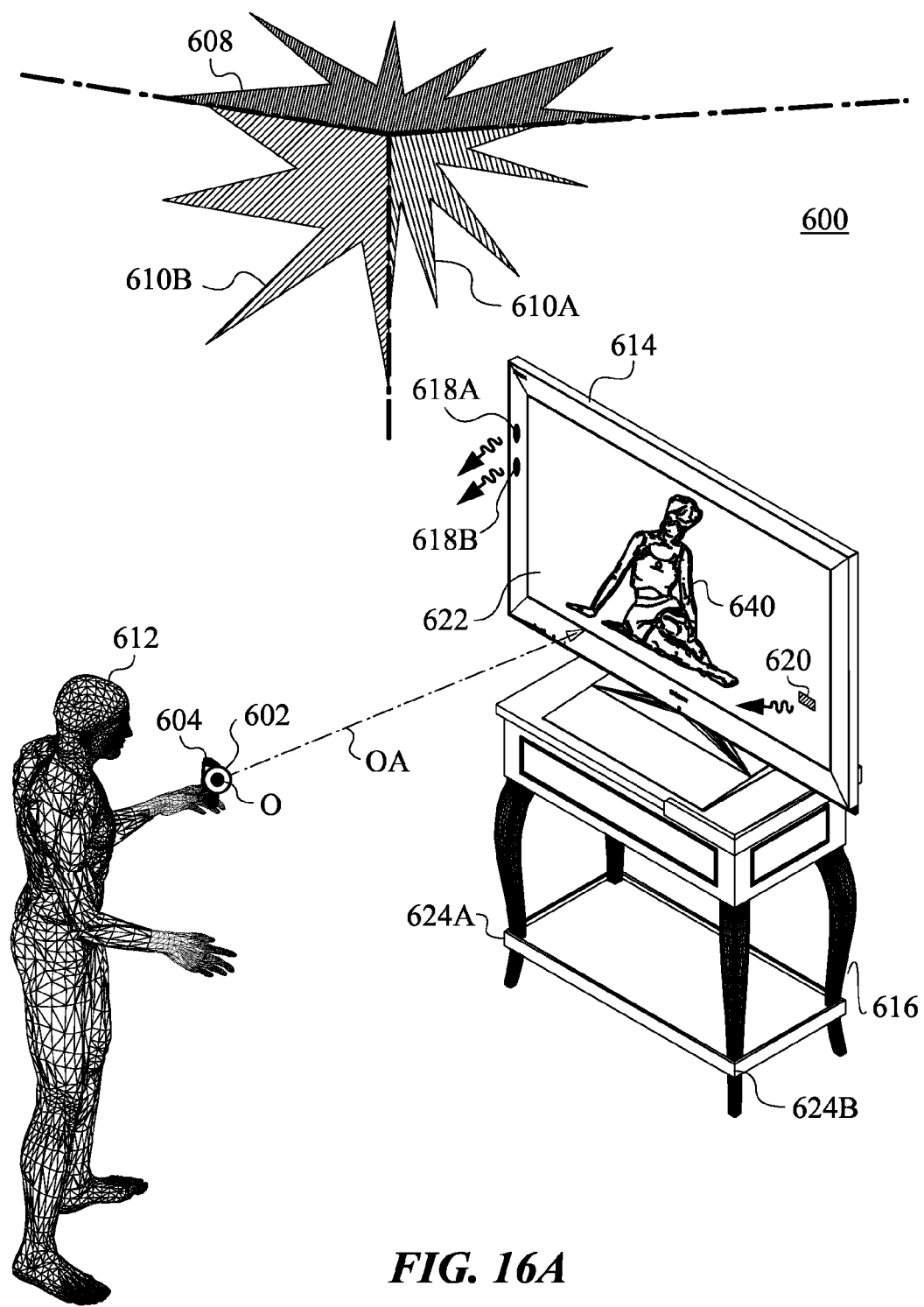

FIG. 16A is a three-dimensional diagram illustrating the use of reduced homography H with the aid of an auxiliary measurement performed by the optical apparatus on-board a smart phone cooperating with a smart television.

Figure 16B:
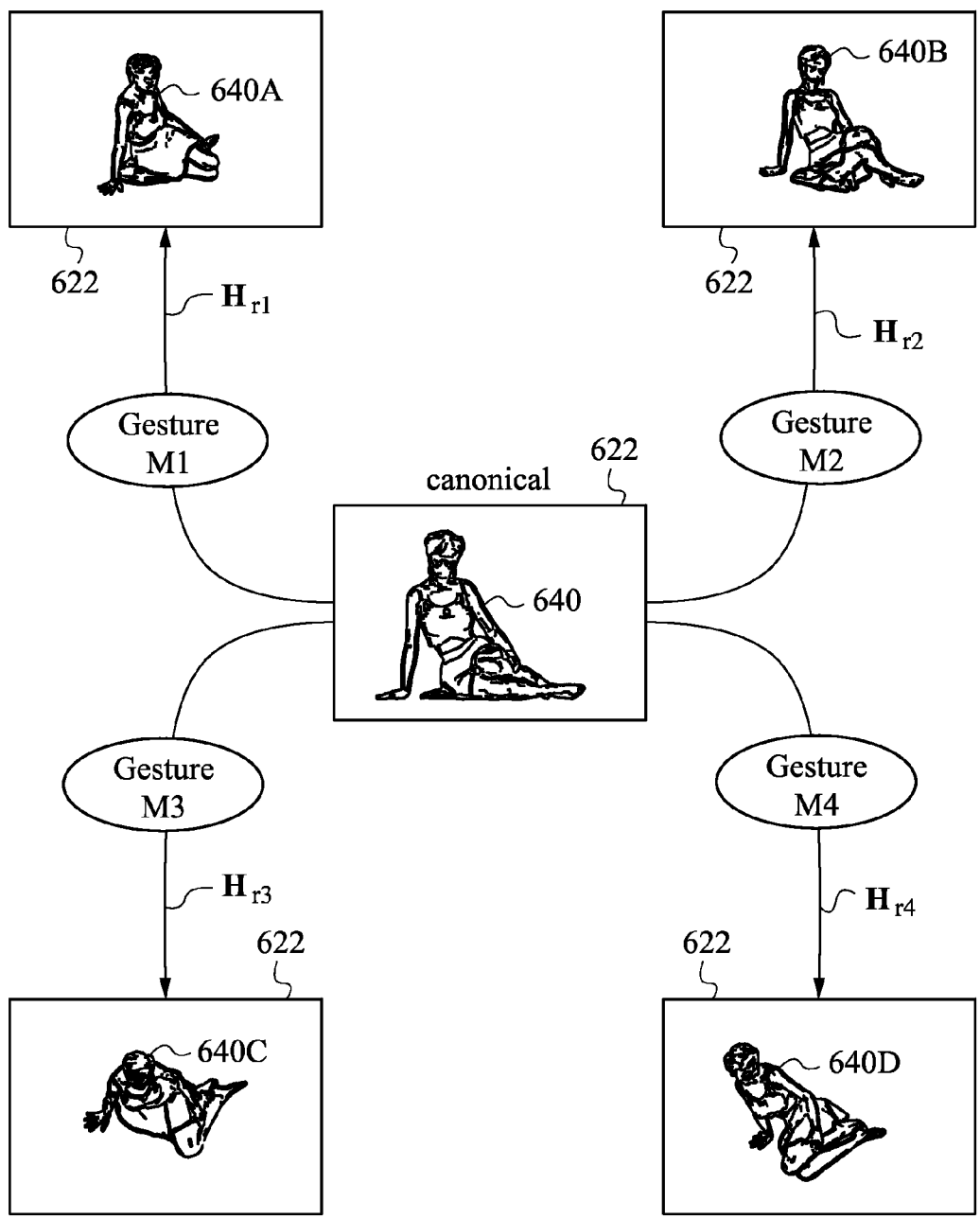

FIG. 16B is a diagram that illustrates the application of pose parameters recovered with the reduced homography H that allow the user to manipulate an image displayed on the smart television of FIG. 16A.

FIG. 17A-D are diagrams illustrating other auxiliary measurement apparatus that can be deployed to obtain an auxiliary measurement of the condition on the motion of the optical apparatus.

Figure 18:
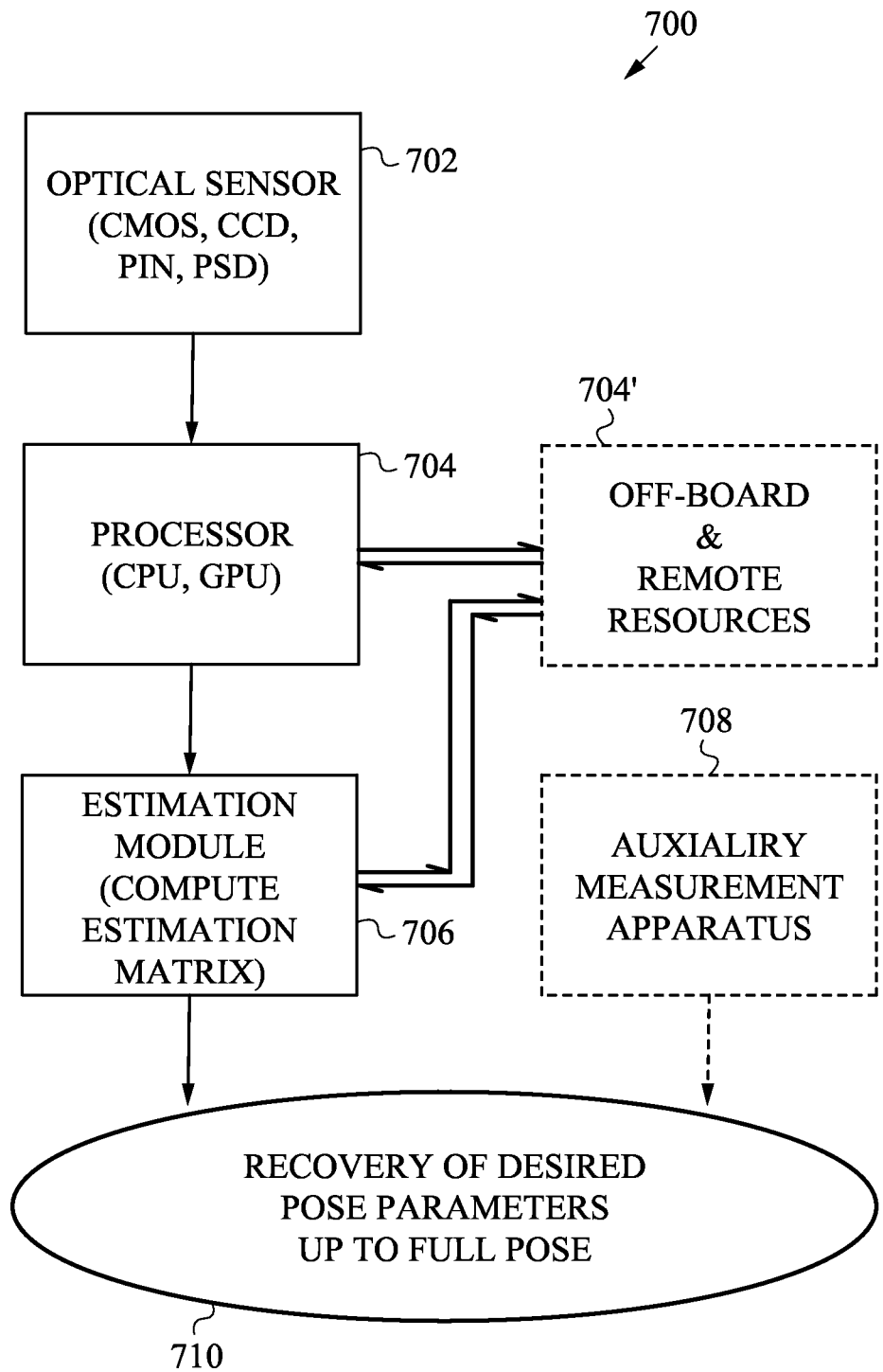

FIG. 18 is a block diagram illustrating the main components of an optical apparatus deploying the reduced homography H in accordance with an embodiment of the invention.

Figure 19A:
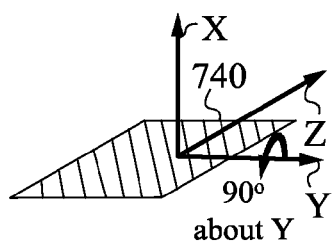
Figure 19B:
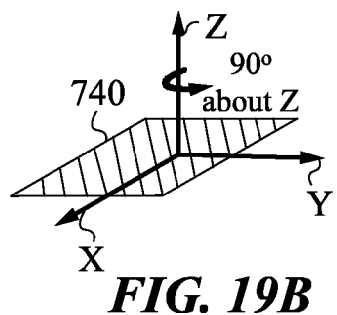
Figure 19C:
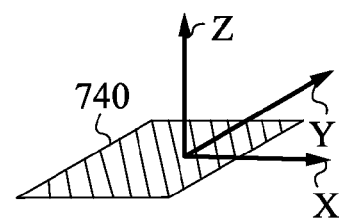

FIG. 19A-C is a diagram visualizing the rotation of a parameterized environment about Y-axis by 90° and then about Z-axis by 90°.

Figure 19D:
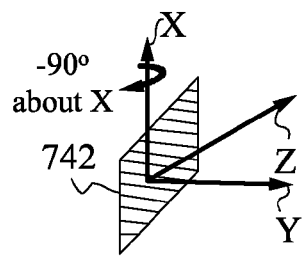
Figure 19E:
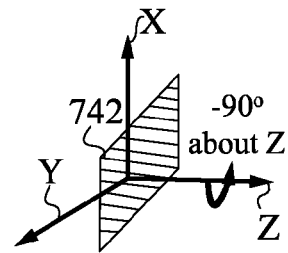
Figure 19F:
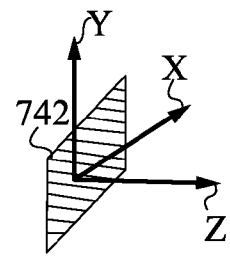

FIG. 19D-F is a diagram visualizing the rotation of a parameterized environment about X-axis by −90° and then about Z-axis by −90°.

Figure 20:
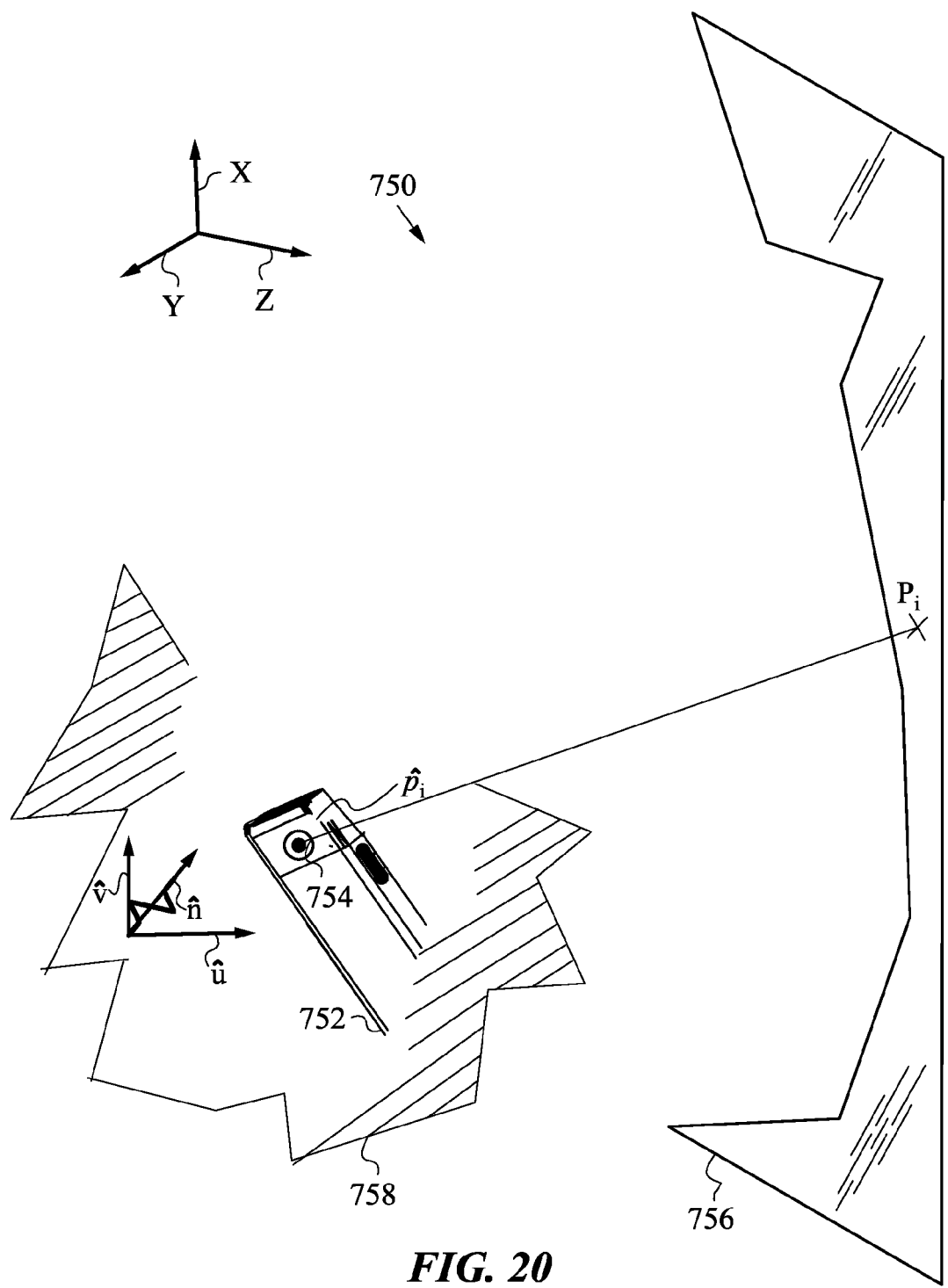

FIG. 20 is a diagram illustrating the redundancy of information along a direction perpendicular to an arbitrary plane to which the motion of a camera or optical apparatus is confined.

Figure 21:
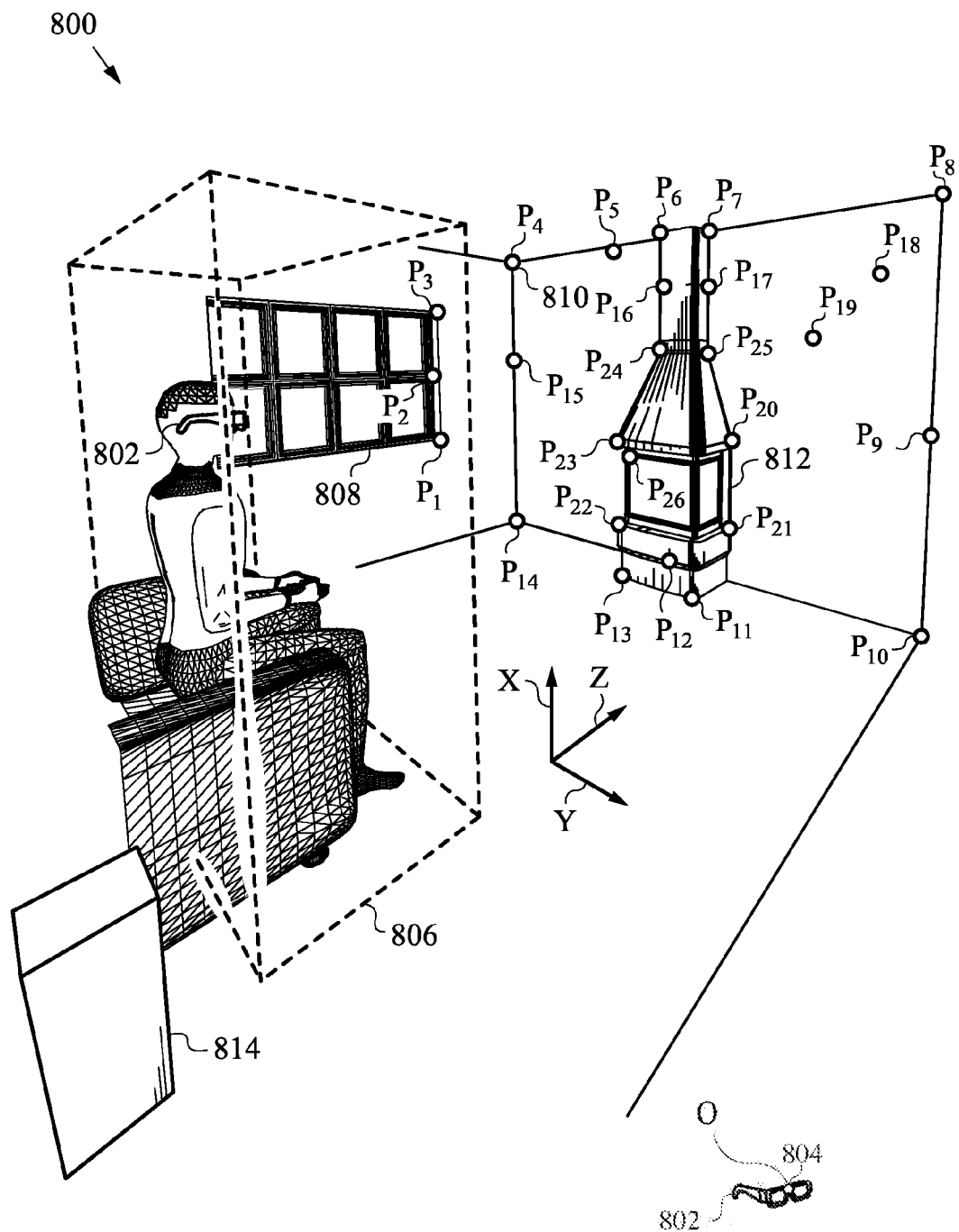

FIG. 21 is a diagram illustrating a perspective view of an environment and a user with an optical apparatus for practicing an embodiment of the invention.

Figure 22:
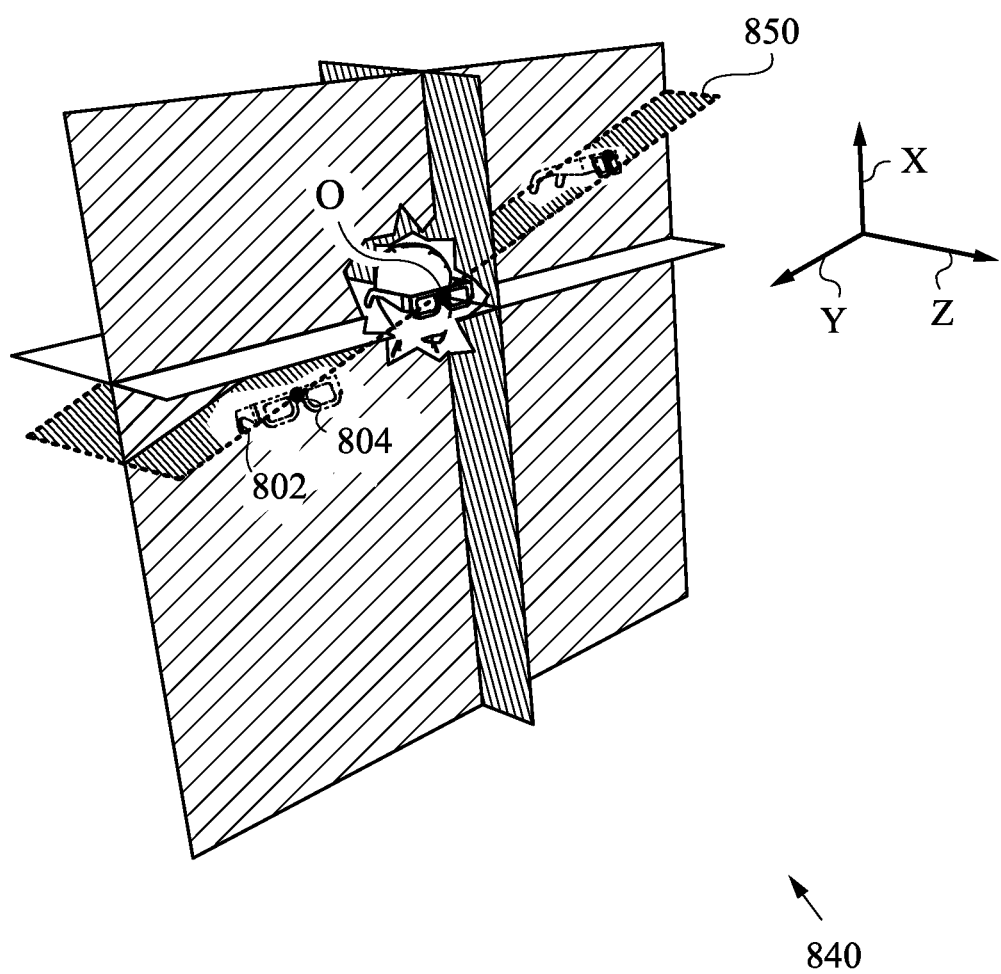

FIG. 22 illustrates the use of glasses of FIG. 21 manipulated in an arbitrary plane to which the motion of the camera contained in the glasses is confined.

Figure 23:
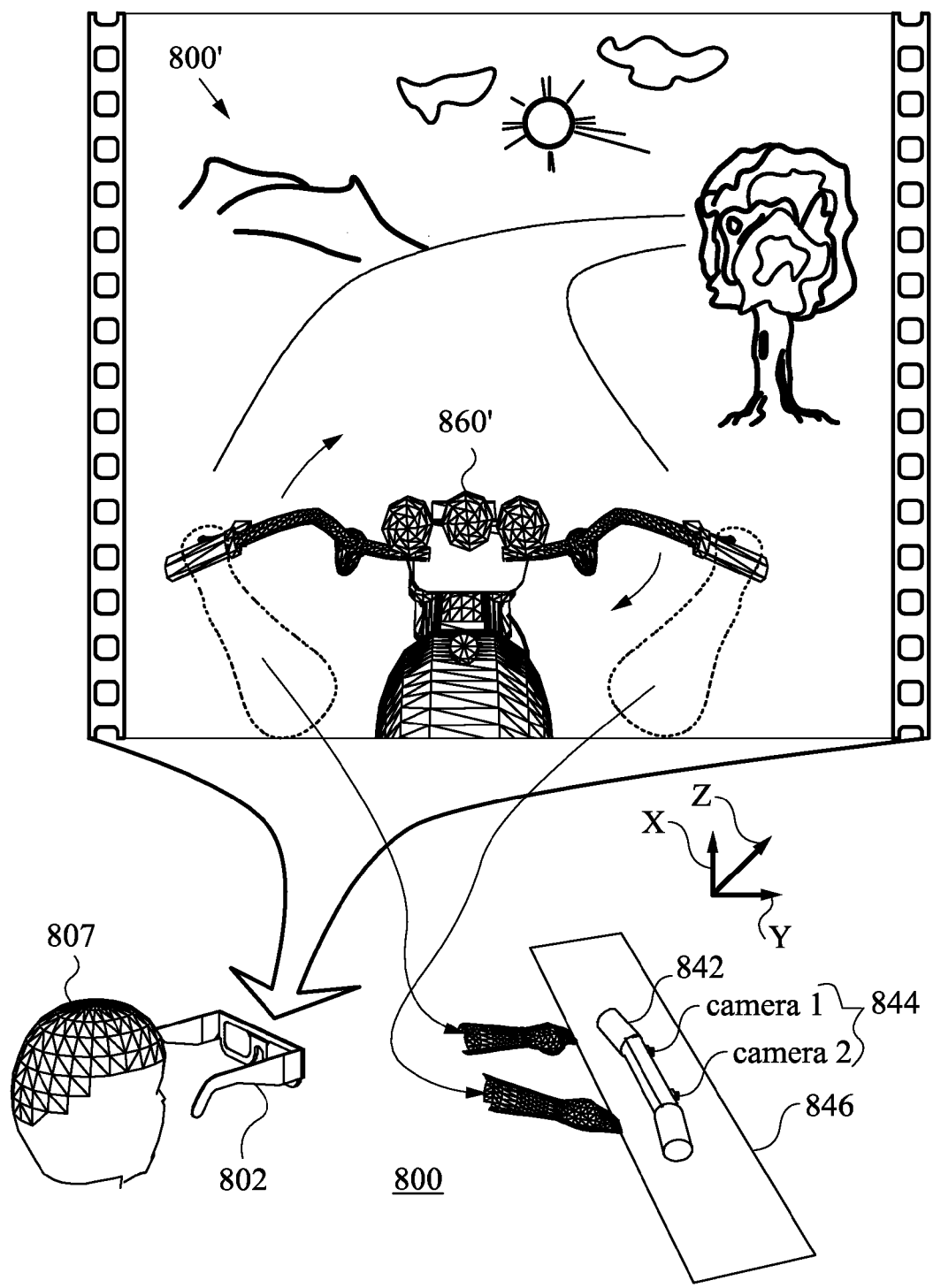

FIG. 23 is a diagram illustrating use of an optical sensor to control a 3-D environment being viewed by the user.

FIG. 24A-D are diagrams illustrating the concept of counter-steering a motorcycle, which may be taught in a Virtual Reality motorcycle trip using a sequence of images generated in accordance with an embodiment of the invention.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Reduced Homography: The Basics

The present invention will be best understood by initially referring to FIG. 5A. This drawing figure illustrates in a perspective view a stable three-dimensional environment 100 in which an item 102 equipped with an on-board optical apparatus 104 is deployed in accordance with the invention. It should be noted, that the present invention relates to the recovery of pose by optical apparatus 104 itself. It is not limited to any item that has optical apparatus 104 installed on-board. In other words, it is entirely conceivable to practice the teachings of the invention where the optical apparatus, sensor or lens is separate from the computation module(s) responsible for recovering the pose. However, for clarity of explanation and a better understanding of the fields of use, it is convenient to base the teachings on concrete examples. In this vein, a cell phone or a smart phone embodies item 102 and a CMOS camera embodies on-board optical apparatus 104.

CMOS camera 104 has a viewpoint O from which it views environment 100. In general, item 102 is understood herein to be any object that is equipped with an on-board optical unit and is manipulated by a user or even worn by the user. For some additional examples of suitable items the reader is referred to U.S. Published Application 2012/0038549 to Mandella et al.

Environment 100 is not only stable, but it is also known. This means that the locations of exemplary stationary objects 106, 108, 110, 112, 114, 116 present in environment 100 and embodied by a refrigerator, a corner between two walls and a ceiling, a table, a microwave oven, a toaster and a kitchen stove, respectively, are known prior to practicing a reduced homography H according to the invention. More precisely still, the locations of non-collinear optical features designated here by space points $P_1, P_2, \ldots, P_i$ and belonging to refrigerator 106, corner 108, table 110, microwave oven 112, toaster 114 and kitchen stove 116 are known prior to practicing reduced homography H of the invention. The reader is instructed to note that this disclosure adopts the convention of representing the reduced homography of the instant invention by H and in some embodiments also by $A_r$. The later notation is useful while comparing the reduced homography $A_r$ of this invention with the traditional or regular homography A. Since the notation H also remains popular for representing homography in the literature, it is also adopted for familiarity in this disclosure. Obviously, the context of the discussion will make it obvious as to which notation is being adopted in the ensuing embodiments.

A person skilled in the art will recognize that working in known environment 100 is a fundamentally different problem from working in an unknown environment. In the latter case, optical features are also available, but their locations in the environment are not known a priori. Thus, a major part of the challenge is to construct a model of the unknown environment before being able to recover any of the camera's extrinsic parameters (position and orientation in the environment, together defining the pose). The present invention applies to known environment 100 in which the positions of objects 106, 108, 110, 112, 114, 116 and hence of the non-collinear optical features $P_1, P_2, \ldots, P_9$ are known a priori, e.g., either from prior measurements, surveys or calibration procedures that may include non-optical measurements, as discussed in more detail below.

The actual non-collinear optical features designated by space points $P_1, P_2, \ldots, P_9$ can be any suitable, preferably high optical contrast parts, markings or aspects of objects 106, 108, 110, 112, 114, 116. The optical features can be passive, active (i.e., emitting electromagnetic radiation) or reflective (even retro-reflective if illumination from on-board item 102 is deployed, e.g., in the form of a flash or continuous illumination with structured light that may, for example, span the infrared (IR) range of the electromagnetic spectrum). In the present embodiment, optical feature designated by space point $P_1$ is a corner of refrigerator 106 that offers inherently high optical contrast because of its location against the walls. Corner 108 designated by space point $P_2$ is also high optical contrast. Table 110 has two optical features designated by space points $P_3$ and $P_6$, which correspond to its back corner and the highly reflective metal support on its front leg. Microwave oven 112 offers high contrast feature denoted by space point $P_4$ representing its top reflective identification plate. Space point $P_5$ corresponds to the optical feature represented by a shiny handle of toaster 114. Finally, space points $P_7$, $P_8$ and $P_9$ are optical features belonging to kitchen stove 116 and they correspond to a marking in the middle of the baking griddle, an LED display and a lighted turn knob, respectively.

It should be noted that any physical features, as long as their optical image is easy to discern, can serve the role of optical features. Preferably, more than just four optical features are selected in order to ensure better performance in pose recovery and to ensure that a sufficient number of them, preferably at least four, remain in the field of view of CMOS camera 104, even when some are obstructed, occluded or unusable for any other reasons. In the subsequent description, we will refer simply to space points $P_1, P_2, \ldots, P_9$ as space points $P_i$ or non-collinear optical features interchangeably. It will also be understood by those skilled in the art that the choice of space points $P_i$ can be changed at any time, e.g., when image analysis reveals space points that offer higher optical contrast than those used at the time or when other space points offer optically advantageous characteristics. For example, the distribution of the space points along with additional new space points presents a better geometrical distribution (e.g., a larger convex hull) and is hence preferable for pose recovery.

As already indicated, camera 104 of smart phone 102 sees environment 100 from point of view O. Point of view O is defined by the design of camera 104 and, in particular, by the type of optics camera 104 deploys. In FIG. 5A, phone 102 is shown in three different poses at times $t=t_{-i}$, $t=t_o$ and $t=t_1$ with the corresponding locations of point of view O being labeled. For purposes of better understanding, at time $t=t_o$ phone 102 is held by an unseen user such that viewpoint O of camera 104 is in a canonical pose. The canonical pose is used as a reference for computing a reduced homography H according to the invention.

In deploying reduced homography H a certain condition has to be placed on the motion of phone 102 and hence of camera 104. The condition depends on the type of reduced homography H. The condition is satisfied in the present embodiment by bounding the motion of phone 102 to a reference plane 118. This confinement does not need to be exact and it can be periodically reevaluated or changed, as will be explained further below. Additionally, a certain forward displacement $\epsilon_f$ and a certain back displacement $\epsilon_b$ away from reference plane 118 are permitted. Note that the magnitudes of displacements $\epsilon_f$, $\epsilon_b$ do not have to be equal.

The condition is thus indicated by the general volume 120, which is the volume bounded by parallel planes at $\epsilon_f$ and $\epsilon_b$ and containing reference plane 118. This condition means that a trajectory 122 executed by viewpoint O of camera 104 belonging to phone 102 is confined to volume 120. Indeed, this condition is obeyed by trajectory 122 as shown in FIG. 5A.

This disclosure will teach techniques for tracking trajectory 122 of optical apparatus or phone 102, based on a reduced homography compared to traditional methods. Based on the reduced homography, the pose of camera 104 can be determined more efficiently and with sufficient frequency to track the motion in time of phone 102 as required for practical applications. As will be shown, we will term this motion as conditioned motion because it will follow certain constraints to allow a reduced homography to be used in determining the pose of camera 104. This tracking capability of the instant invention will apply to various embodiments taught below throughout this disclosure, with varying types of cameras, optical apparatuses, environments observed, and with varying constraints of the conditioned motion.

Phone 102 has a display screen 124. To aid in the explanation of the invention, screen 124 shows what the optical sensor (not shown in the present drawing) of camera 104 sees or records. Thus, display screen 124 at time $t=t_o$, as shown in the lower enlarged portion of FIG. 5A, depicts an image 100' of environment 100 obtained by camera 104 when phone 102 is in the canonical pose. Similarly, display screen 124 at time $t=t_1$, as shown in the upper enlarged portion of FIG. 5A, depicts image 100' of environment 100 taken by camera 104 at time $t=t_1$. (We note that image 100' on display screen 124 is not inverted. This is done for ease of explanation. A person skilled in the art will realize, however, that image 100' as seen by the optical sensor can be inverted depending on the types of optics used by camera 104).

FIG. 5B is another perspective view of environment 100 in which phone 102 is shown in the pose assumed at time $t=t_1$, as previously shown in FIG. 5A. In FIG. 5B we see electromagnetic radiation 126 generally indicated by photons propagating from space points $P_i$ to on-board CMOS camera 104 of phone 102. Radiation 126 is reflected or scattered ambient radiation and/or radiation produced by the optical feature itself. For example, optical features corresponding to space points $P_8$ and $P_9$ are LED display and lighted turn knob belonging to stove 116. Both of these optical features are active (illuminated) and thus produce their own radiation 126.

Radiation 126 should be contained in a wavelength range that camera 104 is capable of detecting. Visible as well as IR wavelengths are suitable for this purpose. Camera 104 thus images all unobstructed space points $P_o$ using its optics and optical sensor (shown and discussed in more detail below) to produce image 100' of environment 100. Image 100' is shown in detail on the enlarged view of screen 124 in the lower portion of FIG. 5B.

For the purposes of computing reduced homography H of the invention, we rely on images of space points $P_i$ projected to correspondent image points $p_i$. Since there are no occlusions or obstructions in the present example and phone 102 is held in a suitable pose, camera 104 sees all nine space points $P_1, \ldots, P_9$ and images them to produce correspondent image points $p_1, \ldots, p_9$ in image 100'.

FIG. 5C is a diagram showing the image plane 128 of camera 104. Optical sensor 130 of camera 104 resides in image plane 128 and lies inscribed within a field of view (F.O.V.) 132. Sensor 130 is a pixelated CMOS sensor with an array of pixels 134. Only a few pixels 134 are shown in FIG. 5C for reasons of clarity. A center CC of sensor 130 (also referred to as camera center) is shown with an offset $(x_{sc}, y_{sc})$ from the origin of sensor or image coordinates $(X_s, Y_s)$. In fact, $(x_{sc}, y_{sc})$ is also the location of viewpoint O and origin o' of the projective plane in sensor coordinates (obviously, though, viewpoint O and origin o' of the projective plane have different values along the z-axis).

All but imaged optical features corresponding to image points $p_1, \ldots, p_9$ are left out of image 100' for reasons of clarity. Note that the image is not shown inverted in this example. Of course, whether the image is or is not inverted will depend on the types of optics deployed by camera 104.

The projections of space points $P_i$ to image points $p_i$ are parameterized in sensor coordinates $(X_s, Y_s)$. Each image point $p_i$ that is imaged by the optics of camera 104 onto sensor 130 is thus measured in sensor or image coordinates along the $X_s$ and $Y_s$ axes. Image points $p_i$ are indicated with open circles (same as in FIG. 5B) at locations that presume perfect or ideal imaging of camera 104 with no noise or structural uncertainties, such as aberrations, distortions, ghost images, stray light scattering or motion blur.

In practice, ideal image points $p_i$ are almost never observed. Instead, a number of measured image points $\hat{p}_i$ indicated by crosses are recorded on pixels 134 of sensor 130 at measured image coordinates $\hat{x}_i, \hat{y}_i$. (In the convention commonly adopted in the art and also herein, the "hat" on any parameter or variable is used to indicate a measured value as opposed to an ideal value or a model value.) Each measured image point $\hat{p}_i$ is thus parameterized in image plane 128 as: $\hat{p}_i=(\hat{x}_i,\hat{y}_i)$ while ideal image point $p_i$ is at: $p_i=(x_i,y_i)$.

Sensor 130 records electromagnetic radiation 126 from space points $P_i$ at various locations in image plane 128. A number of measured image points $\hat{p}_i$ are shown for each ideal image point $p_i$ to aid in visualizing the nature of the error. In fact, FIG. 5C illustrates that for ideal image point $p_1$ corresponding to space point $P_1$ there are ten measured image points $\hat{p}_i$. All ten of these measured image points $\hat{p}_i$ are collected while camera 104 remains in the pose shown at time $t=t_1$. Similarly, at time $t=t_1$, rather than ideal image points $p_2$, $p_6$, $p_9$, sensor 130 of camera 104 records ten measured image points $\hat{p}_2$, $\hat{p}_6$, $\hat{p}_9$, respectively, also indicated by crosses.

In addition, sensor 130 records three outliers 136 at time $t=t_1$. As is known to those skilled in the art, outliers 136 are not normally problematic, as they are considerably outside any reasonable error range and can be discarded. Indeed, the same approach is adopted with respect to outliers 136 in the present invention.

With the exception of outliers 136, measured image points $\hat{p}_i$ are expected to lie within typical or normal error regions more or less centered about corresponding ideal image points $p_i$. To illustrate, FIG. 5C shows a normal error region 138 indicated around ideal image point $p_6$ within which measured image points $\hat{p}_6$ are expected to be found. Error region 138 is bounded by a normal error spread that is due to thermal noise, 1/f noise and shot noise. Unfortunately, measured image points $\hat{p}_6$ obtained for ideal image point $p_6$ lie within a much larger error region 140. The same is true for the other measured image points $\hat{p}_1$, $\hat{p}_2$ and $\hat{p}_9$—these also fall within larger error regions 140.

The present invention targets situations as shown in FIG. 5C, where measured image points $\hat{p}_i$ are not contained within normal error regions, but rather fall into larger error regions 140. Furthermore, the invention addresses situations where larger error regions 140 are not random, but exhibit some systematic pattern. For the purpose of the present invention larger error region 140 exhibiting a requisite pattern for applying reduced homography H will be called a structural uncertainty.

We now turn to FIG. 5D for an enlarged view of structural uncertainty 140 about ideal image point $p_9$. Here, normal error region 138 surrounding ideal image point $p_9$ is small and generally symmetric. Meanwhile, structural uncertainty 140, which extends beyond error region 138 is large but extends generally along a radial line 142 extending from center CC of sensor 130. Note that line 142 is merely a mathematical construct used here (and in FIG. 5C) as an aid in visualizing the character of structural uncertainties 140. In fact, referring back to FIG. 5C, we see that all structural uncertainties 140 share the characteristic that they extend along corresponding radial lines 142. For this reason, structural uncertainties 140 in the present embodiment will be called substantially radial structural uncertainties.

Returning to FIG. 5D, we note that the radial extent of structural uncertainty 140 is so large, that information along that dimension may be completely unreliable. However, structural uncertainty 140 is also such that measured image points $\hat{p}_9$ are all within an angular or azimuthal range 144 that is barely larger and sometimes no larger than the normal error region 138. Thus, the azimuthal information in measured image points $\hat{p}_9$ is reliable.

For any particular measured image point $\hat{p}_9$ corresponding to space point $P_9$ that is recorded by sensor 130 at time t, one can state the following mapping relation:

$$A^T(t)P_9 \to p_9\delta_t \to \hat{p}_9(t). \qquad \text{(Rel. 1)}$$

Here $A^T(t)$ is the transpose of the homography matrix $A(t)$ at time t, $\delta_t$ is the total error at time t, and $\hat{p}_9(t)$ is the measured image point $\hat{p}_9$ captured at time t. It should be noted here that total error $\delta_t$ contains both a normal error defined by error region 138 and the larger error due to radial structural uncertainty 140. Of course, although applied specifically to image point $p_9$, Rel. 1 holds for any other image point $p_i$.

To gain a better appreciation of when structural uncertainty 140 is sufficiently large in practice to warrant application of a reduced homography H of the invention and to explore some of the potential sources of structural uncertainty 140 we turn to FIG. 5E. This drawing shows space points $P_i$ in environment 100 and their projections into a projective plane 146 of camera 104 and into image plane 128 where sensor 130 resides. Ideal image points $p_i$ are shown here in projective plane 146 and they are designated by open circles, as before. Measured image points $\hat{p}_i$ are shown in image plane 128 on sensor 130 and they are designated by crosses, as before. In addition, radial structural uncertainties 140 associated with measured image points $\hat{p}_i$ are also shown in image plane 128.

An optic 148 belonging to camera 104 and defining viewpoint O is also explicitly shown in FIG. 5E. It is understood that optic 148 can consist of one or more lenses and/or any other suitable optical elements for imaging environment 100 to produce its image 100' as seen from viewpoint O. Item 102 embodied by the smart phone is left out in FIG. 5E. Also, projective plane 146, image plane 128 and optic 148 are shown greatly enlarged for purposes of better visualization.

Recall now, that recovering the pose of camera 104 traditionally involves finding the best estimate $\Theta$ for the collineation or homography A from the available measured image points $\hat{p}_i$. Homography A is a matrix that encodes in it $\{R, \bar{h}\}$. R is the complete rotation matrix expressing the unknown rotation of camera 104 with respect to world coordinates $(X_w, Y_w, Z_w)$, and $\bar{h}$ is the unknown translation vector, which in the present case is defined as the distance between the location of viewpoint O when camera 104 (or smart phone 102) is in the canonical pose (e.g., at time $t=t_o$; see FIG. 5A) and in the unknown pose that is to be recovered. An offset $\bar{d}$ between viewpoint O in the canonical pose and the origin of world coordinates $(X_w, Y_w, Z_w)$ parameterizing environment 100 is also indicated. As defined herein, offset $\bar{d}$ is a vector from world coordinate origin to viewpoint O along the $Z_w$ axis of world coordinates $(X_w, Y_w, Z_w)$. Thus, offset $\bar{d}$ is also the vector between viewpoint O and reference plane 118 to which the motion of camera 104 is constrained (see FIG. 5A). When referring to the distance between the world origin and reference plane 118 we will sometimes refer to the scalar value d of offset $\bar{d}$ as the offset or offset distance. Strictly speaking, that scalar value is the norm of the vector, i.e., $d=|\bar{d}|$.

Note that viewpoint O is placed at the origin of camera coordinates $(X_c, Y_c, Z_c)$. In the unknown pose shown in FIG. 5E, a distance between viewpoint O and the origin of world coordinates $(X_w, Y_w, Z_w)$ is thus equal to $\bar{d}+\bar{h}$. This distance is shown by a dashed and dotted line connecting viewpoint O at the origin of camera coordinates $(X_c, Y_c, Z_c)$ with the origin of world coordinates $(X_w, Y_w, Z_w)$.

In comparing ideal points $p_i$ in projective plane 146 with actually measured image points $\hat{p}_i$ and their radial structural uncertainties 140 it is clear that any pose recovery that relies on the radial portion of measured data will be unreliable. In many practical situations, radial structural uncertainty 140 in measured image data is introduced by the on-board optical apparatus, which is embodied by camera 104. The structural uncertainty can be persistent (inherent) or transitory. Persistent uncertainty can be due to radial defects in lens 148 of camera 104. Such lens defects can be encountered in molded lenses or mirrors when the molding process is poor or in diamond turned lenses or mirrors when the turning parameters are incorrectly varied during the turning process. Transitory uncertainty can be due to ghosting effects produced by internal reflections or stray light scattering within lens 148 (particularly acute in a compound or multi-component lens) or due to otherwise insufficiently optimized lens 148. It should be noted that ghosting can be further exacerbated when space points $P_i$ being imaged are all illuminated at high intensities (e.g., high brightness point sources, such as beacons or markers embodied by LEDs or IR LEDs).

Optical sensor 130 of camera 104 can also introduce radial structural uncertainty due to its design (intentional or unintentional), poor quality, thermal effects (non-uniform heating), motion blur and motion artifacts created by a rolling shutter, pixel bleed-through and other influences that will be apparent to those skilled in the art. These effects can be particularly acute when sensor 130 is embodied by a poor quality CMOS sensor or a position sensing device (PSD) with hard to determine radial characteristics. Still other cases may include a sensor such as a 1-D PSD shaped into a circular ring to only measure the azimuthal distances between features in angular units (e.g., radians or degrees). Once again, these effects can be persistent or transitory. Furthermore, the uncertainties introduced by lens 148 and sensor 130 can add to produce a joint uncertainty that is large and difficult to characterize, even if the individual contributions are modest.

The challenge is to provide the best estimate $\Theta$ of homography A from measured image points $\hat{p}_i=(\hat{x}_i,\hat{y}_i)$ despite radial structural uncertainties 140. According to the invention, adopting a reduced representation of measured image points $\hat{p}_i=(\hat{x}_i,\hat{y}_i)$ and deploying a correspondingly reduced homography H meets this challenge. The measured data is then used to obtain an estimation matrix $\Theta$ of the reduced homography H rather than an estimate $\Theta$ of the regular homography A. To better understand reduced homography H and its matrix, it is important to first review 3D rotations in detail. We begin with rotation matrices that compose the full or complete rotation matrix R, which expresses the orientation of camera 104. Orientation is expressed in reference to world coordinates $(X_w,Y_w,Z_w)$ with the aid of camera coordinates $(X_c,Y_c,Z_c)$.

Reduced Homography: Details and Formal Statement

FIG. 6A-D illustrate a general orthogonal rotation convention. Specifically, this convention describes the absolute orientation of a rigid body embodied by an exemplary phone 202 in terms of three rotation angles $\alpha_c$, $\beta_c$ and $\gamma_c$. Here, the rotations are taken around the three camera axes $X_c$, $Y_c$, $Z_c$, of a centrally mounted camera 204 with viewpoint O at the center of phone 202. This choice of rotation convention ensures that viewpoint O of camera 204 does not move during any of the three rotations. The camera axes are initially aligned with the axes of world coordinates $(X_w,Y_w,Z_w)$ when phone 202 is in the canonical pose.

FIG. 6A shows phone 202 in an initial, pre-rotated condition centered in a gimbal mechanism 206 that will mechanically constrain the rotations defined by angles $\alpha_c$, $\beta_c$ and $\gamma_c$. Mechanism 206 has three progressively smaller concentric rings or hoops 210, 212, 214. Rotating joints 211, 213 and 215 permit hoops 210, 212, 214 to be respectively rotated in an independent manner. For purposes of visualization of the present 3D rotation convention, phone 202 is rigidly affixed to the inside of third hoop 214 either by an extension of joint 215 or by any other suitable mechanical means (not shown).

In the pre-rotated state, the axes of camera coordinates $(X_c,Y_c,Z_c)$ parameterizing the moving reference frame of phone 202 are triple primed $(X_c''',Y_c''',Z_c''')$ to better keep track of camera coordinate axes after each of the three rotations. In addition, pre-rotated axes $(X_c''',Y_c''',Z_c''')$ of camera coordinates $(X_c,Y_c,Z_c)$ are aligned with axes $X_w$, $Y_w$ and $Z_w$ of world coordinates $(X_s,Y_s,Z_s)$ that parameterize the environment. However, pre-rotated axes $(X_c''',Y_c''',Z_c''')$ are displaced from the origin of world coordinates $(X_c,Y_c,Z_c)$ by offset $\bar{d}$ (not shown in the present figure, but see FIG. 5E & FIG. 8). Viewpoint O is at the origin of camera coordinates $(X_c,Y_c,Z_c)$ and at the center of gimbal mechanism 206.

The first rotation by angle $\alpha_c$ is executed by rotating joint 211 and thus turning hoop 210, as shown in FIG. 6B. Note that since camera axis $Z_c'''$ of phone 202 (see FIG. 6A) is co-axial with rotating joint 211 the physical turning of hoop 210 is equivalent to this first rotation in camera coordinates $(X_c,Y_c,Z_c)$ of phone 202 around camera $Z_c'''$ axis. In the present convention, all rotations are taken to be positive in the counter-clockwise direction as defined with the aid of the right hand rule (with the thumb pointed in the positive direction of the coordinate axis around which the rotation is being performed). Hence, angle $\alpha_c$ is positive and in this visualization it is equal to 30°.

After each of the three rotations is completed, camera coordinates $(X_c,Y_c,Z_c)$ are progressively unprimed to denote how many rotations have already been executed. Thus, after this first rotation by angle $\alpha_c$, the axes of camera coordinates $(X_c,Y_c,Z_c)$ are unprimed once and designated $(X_c'',Y_c'',Z_c'')$ as indicated in FIG. 6B.

FIG. 6C depicts the second rotation by angle $\beta_c$. This rotation is performed by rotating joint 213 and thus turning hoop 212. Since joint 213 is co-axial with once rotated camera axis $X_c''$ (see FIG. 6B) such rotation is equivalent to second rotation in camera coordinates $(X_c,Y_c,Z_c)$ of phone 202 by angle $\beta_c$ around camera axis $X_c''$. In the counter-clockwise rotation convention we have adopted angle $\beta_c$ is positive and equal to 45°. After completion of this second rotation, camera coordinates $(X_c,Y_c,Z_c)$ are unprimed again to yield twice rotated camera axes $(X_c',Y_c',Z_c')$.

The result of the third and last rotation by angle $\gamma_c$ is shown in FIG. 6D. This rotation is performed by rotating joint 215, which turns innermost hoop 214 of gimbal mechanism 206. The construction of mechanism 206 used for this visualization has ensured that throughout the prior rotations, twice rotated camera axis $Y_c'$ (see FIG. 6C) has remained co-axial with joint 215. Therefore, rotation by angle $\gamma_c$ is a rotation in camera coordinates $(X_c,Y_c,Z_c)$ parameterizing the moving reference frame of camera 202 by angle $\gamma_c$ about camera axis $Y_c'$.

This final rotation yields the fully rotated and now unprimed camera coordinates $(X_c,Y_c,Z_c)$. In this example angle $\gamma_c$ is chosen to be 40°, representing a rotation by 40° in the counter-clockwise direction. Note that in order to return fully rotated camera coordinates $(X_c,Y_c,Z_c)$ into initial alignment with world coordinates $(X_w,Y_w,Z_w)$ the rotations by angles $\alpha_c$, $\beta_c$ and $\gamma_c$ need to be taken in exactly the reverse order (this is due to the order-dependence or non-commuting nature of rotations in 3D space).

It should be understood that mechanism 206 was employed for illustrative purposes to show how any 3D orientation of phone 202 consists of three rotational degrees of freedom. These non-commuting rotations are described or parameterized by rotation angles $\alpha_c$, $\beta_c$ and $\gamma_c$ around camera axes $Z_c'''$, $X_c''$ and finally $Y_c'$. What is important is that this 3D rotation convention employing angles $\alpha_c$, $\beta_c$, $\gamma_c$ is capable of describing any possible orientation that phone 202 may assume in any 3D environment.

We now turn back to FIG. 5E and note that the orientation of phone 102 indeed requires a description that includes all three rotation angles. That is because the motion of phone 102 in environment 100 is unconstrained other than by the condition that trajectory 122 of viewpoint O be approximately confined to reference plane 118 (see FIG. 5A). More precisely, certain forward displacement $\epsilon_f$ and a certain back displacement $\epsilon_b$ away from reference plane 118 are permitted. However, as far as the misalignment of camera coordinates $(X_c,Y_c,Z_c)$ with world coordinates $(X_w,Y_w,Z_w)$ is concerned, all three rotations are permitted. Thus, we have to consider any total rotation represented by a full or complete rotation matrix R that accommodates changes in one, two or all three of the rotation angles. For completeness, a person skilled in the art should notice that all possible camera rotations, or, more precisely the rotation matrices representing them, are a special class of collineations.

Each one of the three rotations described by the rotation angles $\alpha_c$, $\beta_c$, $\gamma_c$ has an associated rotation matrix, namely: $R(\alpha)$, $R(\beta)$ and $R(\gamma)$. A number of conventions for the order of the individual rotations, other than the order shown in FIG. 6A-D, are routinely used by those skilled in the art. All of them are ultimately equivalent, but once a choice is made it needs to be observed throughout because of the non-commuting nature of rotation matrices.

The full or complete rotation matrix R is a composition of individual rotation matrices $R(\alpha)$, $R(\beta)$, $R(\gamma)$ that account for all three rotations $(\alpha_c,\beta_c,\gamma_c)$ previously introduced in FIG. 6A-D. These individual rotation matrices are expressed as follows:

$$R(\alpha) = \begin{pmatrix} \cos\alpha & \sin\alpha & 0 \\ -\sin\alpha & \cos\alpha & 0 \\ 0 & 0 & 1 \end{pmatrix} \quad \text{(Eq. 2A)}$$

$$R(\beta) = \begin{pmatrix} 1 & 0 & 0 \\ 0 & \cos\beta & \sin\beta \\ 0 & -\sin\beta & \cos\beta \end{pmatrix} \quad \text{(Eq. 2B)}$$

$$R(\gamma) = \begin{pmatrix} \cos\gamma & 0 & -\sin\gamma \\ 0 & 1 & 0 \\ \sin\gamma & 0 & \cos\gamma \end{pmatrix} \quad \text{(Eq. 2C)}$$

The reader is advised that throughout this disclosure, the mathematical formalism is taught using the prevailing notational conventions of linear algebra whereby matrices are represented either by parentheses ( ) as in Eq. 2A-C above, or by square brackets [ ]. Thus the reader may find the interchangeable use of the above notations in these teachings familiar.

The complete rotation matrix R is obtained by multiplying the above individual rotation matrices in the order of the chosen rotation convention. For the rotations performed in the order shown in FIG. 6A-D the complete rotation matrix is thus: $R = R(\gamma_c) \cdot R(\beta_c) \cdot R(\alpha_c)$.

It should be noted that rotation matrices are always square and have real-valued elements. Algebraically, a rotation matrix in 3-dimensions is a 3×3 special orthogonal matrix (SO(3)) whose determinant is 1 and whose transpose is equal to its inverse:

$$\text{Det}(R)=1; \; R^T=R^{-1}, \quad \text{(Eq. 3)}$$

where "Det" designates the determinant, superscript "T" indicates the transpose and superscript "−1" indicates the inverse.

For reasons that will become apparent later, in pose recovery with reduced homography H according to the invention we will use rotations defined by the Euler rotation convention. The convention illustrating the rotation of the body or camera 104 as seen by an observer in world coordinates is shown in FIG. 6E. This isometric diagram illustrates each of the three rotation angles applied to on-board optical unit 104.

In pose recovery we are describing what camera 104 sees as a result of the rotations. We are thus not interested in the rotations of camera 104, but rather the transformation of coordinates that camera 104 experiences due to the rotations. As is well known, the rotation matrix R that describes the coordinate transformation corresponds to the transpose of the composition of rotation matrices introduced above (Eq. 2A-C). From now on, when we refer to the rotation matrix R we will thus be referring to the rotation matrix that describes the coordinate transformation experienced by camera 104. (It is important to recall here, that the transpose of a composition or product of matrices A and B inverts the order of that composition, such that $(AB)^T=B^TA^T$.)

In accordance with the Euler composition we will use, the first rotation angle designated by $\psi$ is the same as angle $\alpha$ defined above. Thus, the first rotation matrix $R(\psi)$ in the Euler convention is:

$$R(\psi) = \begin{pmatrix} \cos\psi & -\sin\psi & 0 \\ \sin\psi & \cos\psi & 0 \\ 0 & 0 & 1 \end{pmatrix}.$$

The second rotation by angle $\theta$, same as angle $\beta$ defined above, produces rotation matrix $R(\theta)$:

$$R(\theta) = \begin{pmatrix} 1 & 0 & 0 \\ 0 & \cos\theta & -\sin\theta \\ 0 & \sin\theta & \cos\theta \end{pmatrix}.$$

Now, the third rotation by angle $\phi$, same as angle $\gamma$ defined above, corresponds to rotation matrix $R(\phi)$ and is described by:

$$R(\phi) = \begin{pmatrix} \cos\phi & -\sin\phi & 0 \\ \sin\phi & \cos\phi & 0 \\ 0 & 0 & 1 \end{pmatrix}.$$

The result is that in the Euler convention using Euler rotation angles $\phi,\theta,\psi$ we obtain a complete rotation matrix $R=R(\phi)\cdot R(\theta)\cdot R(\gamma)$. Note the ordering of rotation matrices to ensure that angles $\phi,\theta,\psi$ are applied in that order. (Note that in some textbooks the definition of rotation angles $\phi$ and $\psi$ is reversed.)

Having defined the complete rotation matrix R in the Euler convention, we turn to FIG. 7 and review the reduced representation of measured image points $\hat{p}_i$ according to the present invention. The representation deploys N-vectors defined in homogeneous coordinates using projective plane 146 and viewpoint O as the origin. By definition, an N-vector in normalized homogeneous coordinates is a unit vector that is computed by dividing that vector by its norm using the normalization operator N as follows: $N[\bar{u}]=\bar{u}/\|\bar{u}\|$.

Before applying the reduced representation to measured image points $\hat{p}_i$, we note that any point (a,b) in projective plane 146 is represented in normalized homogeneous coordinates by applying the normalization operator N to the triple (a,b,f), where f is the focal length of lens 148. Similarly, a line Ax+By+C=0, sometimes also represented as [A,B,C] (square brackets are often used to differentiate points from lines), is expressed in normalized homogeneous coordinates by applying normalization operator N to the triple [A,B,C/f]. The resulting point and line representations are insensitive to sign, i.e., they can be taken with a positive or negative sign.

We further note, that a collineation is a one-to-one mapping from the set of image points $p'_i$ seen by camera 104 in an unknown pose to the set of image points $p_i$ as seen by camera 104 in the canonical pose shown in FIG. 5A at time $t=t_o$. The prime notation "'" will henceforth be used to denote all quantities observed in the unknown pose. As previously mentioned, a collineation preserves certain properties, namely: collinear image points remain collinear, concurrent image lines remain concurrent, and an image point on a line remains on the line. Moreover, a traditional collineation A is a linear mapping of N-vectors such that:

$$\bar{m}'_i=\pm N[A^T\bar{m}_i]; \bar{n}'_i=\pm N[A^{-1}\bar{n}_i]. \tag{Eq. 4}$$

In Eq. 4 $\bar{m}'_i$ is the homogeneous representation of an image point $p'_i$ as it should be seen by camera 104 in the unknown pose, and $\bar{n}'_i$ is the homogeneous representation of an image line as should be seen in the unknown pose.

Eq. 4 states that these homogenous representations are obtained by applying the transposed collineation $A^T$ to image point $p_i$ represented by $\bar{m}_i$ in the canonical pose, and by applying the collineation inverse $A^{-1}$ to line represented by $\bar{n}_i$ in the canonical pose. The application of the normalization operator N ensures that the collineations are normalized and insensitive to sign. In addition, collineations are unique up to a scale and, as a matter of convention, their determinant is usually set to 1, i.e.: $Det\|A\|=1$ (the scaling in practice is typically recovered/applied after computing the collineation). Also, due to the non-commuting nature of collineations inherited from the non-commuting nature of rotation matrices R, as already explained above, a collineation $A_1$ followed by collineation $A_2$ results in the total composition $A=A_1\cdot A_2$.

Returning to the challenge posed by structural uncertainties 140, we now consider FIG. 7. This drawing shows radial structural uncertainty 140 for a number of correspondent measured image points $\hat{p}_i$ associated with ideal image point $p'_i$ that should be measured in the absence of noise and structural uncertainty 140. All points are depicted in projective plane 146. Showing measured image points $\hat{p}_i$ in projective plane 146, rather than in image plane 128 where they are actually recorded on sensor 130 (see FIG. 5E), will help us to appreciate the choice of a reduced representation $r'_i$ associated to ideal image point $p'_i$ and extended to measured points $\hat{p}_i$. We also adopt the standard convention reviewed above, and show ideal image point $p_i$ observed in the canonical pose in projective plane 146 as well. This ideal image point $p_i$ is represented in normalized homogeneous coordinates by its normalized vector $\bar{m}_i$.

Now, in departure from the standard approach, we take the ideal reduced representation $r'_i$ of point $p'_i$ to be a ray in projective plane 146 passing through $p'_i$ and the origin o' of plane 146. Effectively, reducing the representation of image point $p'_i$ to just ray $r'_i$ passing through it and origin o' eliminates all radial but not azimuthal (polar) information contained in point $p'_i$. The deliberate removal of radial information from ray $r'_i$ is undertaken because the radial information of a measurement is highly unreliable. This is confirmed by the radial structural uncertainty 140 in measured image points $\hat{p}_i$ that under ideal conditions (without noise or structural uncertainty 140) would project to ideal image point $p'_i$ in the unknown pose we are trying to recover.

Indeed, it is a very surprising finding of the present invention, that in reducing the representation of measured image points $\hat{p}_i$ by discarding their radial information and representing them with rays $\hat{r}_i$ (note the "hat", since the rays are the reduced representations of measured rather than model or ideal points) the resultant reduced homography H nonetheless supports the recovery of all extrinsic parameters (full pose) of camera 104. In FIG. 7 only a few segments of rays $\hat{r}_i$ corresponding to reduced representations of measured image points $\hat{p}_i$ are shown for reasons of clarity. A reader will readily see, however, that they would all be nearly collinear with ideal reduced representation $r'_i$ of ideal image point $p'_i$ that should be measured in the unknown pose when no noise or structural uncertainty is present.

Due to well-known duality between lines and points in projective geometry (each line has a dual point and vice versa; also known as pole and polar or as "perps" in universal hyperbolic geometry) any homogeneous representation can be translated into its mathematically dual representation. In fact, a person skilled in the art will appreciate that the below approach developed to teach a person skilled in the art about the practice of reduced homography H can be recast into mathematically equivalent formulations by making various choices permitted by this duality.

In order to simplify the representation of ideal and measured rays $r'_i$, $\hat{r}_i$ for reduced homography H, we invoke the rules of duality to represent them by their duals or poles. Thus, reduced representation of point $p'_i$ by ray $r'_i$ can be translated to its pole by constructing the join between origin o' and point $p'_i$. (The join is closely related to the vector cross product of standard Euclidean geometry.) A pole or n-vector $\bar{n}'_i$ is defined in normalized homogeneous coordinates as the cross product between unit vector $\hat{o}=(0,0,1)^T$ (note that in this case the "hat" stands for unit vector rather than a measured value) from the origin of camera coordinates $(X_c,Y_c,Z_c)$ at viewpoint O towards origin o' of projective plane 146 and normalized vector $\bar{m}'_i$ representing point $p'_i$.

Notice that the pole of any line through origin o' will not intersect projective plane 146 and will instead represent a "point at infinity". This means that in the present embodiment where all reduced representations $r'_i$ pass through origin o' we expect all n-vectors $\bar{n}'_i$ to be contained in a plane through viewpoint O and parallel to projective plane 146 (i.e., the $X_c$-$Y_c$ plane). Indeed, we see that this is so from the formal definition for the pole of $p'_i$:

$$\bar{n}'_i=\pm N(\hat{o}\times\bar{m}'_i) \tag{Eq. 5}$$

where the normalization operator N is deployed again to ensure that n-vector $\bar{n}_i'$ is expressed in normalized homogeneous coordinates. Because of the cross-product with unit vector $\hat{o}=(0,0,1)^T$, the value of any z-component of normalized n-vector $\bar{m}_i'$ is discarded and drops out from any calculations involving the n-vector $\bar{n}_i'$.

In the ideal or model case, reduced homography H acts on vector $\bar{m}_i'$ representing point $p_i$ in the canonical pose to transform it to a reduced representation by $\bar{m}_i'$ (without the z-component) for point $p_i'$ in the unknown pose (again, primes "'" denote ideal or measured quantities in unknown pose). In other words, reduced homography H is a 2×3 mapping instead of the traditional 3×3 mapping. The action of reduced homography H is visualized in FIG. 7.

In practice we do not know ideal image points $p_i'$ nor their rays $r_i'$. Instead, we only know measured image points $\hat{p}_i$ and their reduced representations as rays $\hat{r}_i$. This means that our task is to find an estimation matrix $\Theta$ for reduced homography H based entirely on measured values $\hat{p}_i$ in the unknown pose and on known vectors $\bar{m}_i$ representing the known points $P_o$ in canonical pose (the latter also sometimes being referred to as ground truth). As an additional aid, we have the condition that the motion of smart phone 102 and thus of its on-board camera 104 is substantially bound to reference plane 118 and is therefore confined to volume 120, as illustrated in FIG. 5A.

We now refer to FIG. 8, which once again presents a perspective view of environment 100, but with all stationary objects removed. Furthermore, smart phone 102 equipped with the on-board camera 104 is shown at time $t=t_o$ (canonical pose) and at time $t=t_1$ (unknown pose). World coordinates $(X_w,Y_w,Z_w)$ parameterizing environment 100 are chosen such that wall 150 is coplanar with the $(X_w\text{-}Y_w)$ plane. Of course, any other parameterization choices of environment 100 can be made, but the one chosen herein is particularly well-suited for explanatory purposes. That is because wall 150 is defined to be coplanar with reference surface 118 and separated from it by offset distance d (to within $d-\epsilon_f$ and $d+\epsilon_b$, and recall that $d=|\bar{d}|$).

From the prior art teachings it is known that a motion of camera 104 defined by a succession of sets $\{R, \bar{h}\}$ relative to a planar surface defined by a p-vector $\bar{p}=\hat{n}_p/d$ induces the collineation or homography A expressed as:

$$A = \frac{1}{k}(I - \bar{p}\cdot\bar{h}^T)R \text{ with } k = \sqrt[3]{1-(\bar{p}\cdot\bar{h})},$$ (Eq. 6)

where I is the 3×3 identity matrix and $\bar{h}^T$ is the transpose (i.e., row vector) of $\bar{h}$. In our case, the planar surface used in the explanation is wall 150 due to the convenient parameterization choice made above. In normalized homogeneous coordinates wall 150 can be expressed by its corresponding p-vector $\bar{p}$, where $\hat{n}_p$ is the unit surface normal to wall 150 and pointing away from viewpoint O, and d is the offset, here shown between reference plane 118 and wall 150 (or the $(X_w\text{-}Y_w)$ plane of the world coordinates). (Note that the "hat" on the unit surface normal does note stand for a measured value, but is used instead to express the unit vector just as in the case of the $\hat{o}$ unit vector introduced above in FIG. 7).

To recover the unknown pose of smart phone 102 at time $t=t_1$ we need to find the matrix that sends the known points $P_i$ as seen by camera 104 in canonical pose (shown at time $t=t_o$) to points $p_i'$ as seen by camera 104 in the unknown pose. In the prior art, that matrix is the transpose, $A^T$, of homography A. The matrix that maps points $p_i'$ from the unknown pose back to canonical pose is the transpose of the inverse $A^{-1}$ of homography A. Based on the definition that any homography matrix multiplied by its inverse has to yield the identity matrix I, we find from Eq. 6 that $A^{-1}$ is expressed as:

$$A^{-1} = kR^T\left(I + \frac{\bar{p}\cdot\bar{h}^T}{1-(\bar{p}\cdot\bar{h})}\right).$$ (Eq. 7)

Before taking into account rotations, let's examine the behavior of homography A in a simple and ideal model case. Take parallel translation of camera 104 in plane 118 at offset distance d to world coordinate origin while keeping phone 102 such that optical axis OA remains perpendicular to plane 118 (no rotation—i.e., full rotation matrix R is expressed by the 3×3 identity matrix I). We thus have $\bar{p}=(0,0,1/d)$ and $\bar{h}=(\delta x,\delta y,0)$. Therefore, from Eq. 6 we see that homography A in such a simple case is just:

$$A = \begin{pmatrix} 1 & 0 & 0 \\ 0 & 1 & 0 \\ -\frac{\delta x}{d} & -\frac{\delta y}{d} & 1 \end{pmatrix}.$$

When z is allowed to vary slightly, i.e., between $\epsilon_f$ and $\epsilon_b$ or within volume 120 about reference plane 118 as previously defined (see FIG. 5A), we obtain a slightly more complicated homography A by applying Eq. 6 as follows:

$$A = \begin{pmatrix} 1 & 0 & 0 \\ 0 & 1 & 0 \\ -\frac{\delta x}{d} & -\frac{\delta y}{d} & 1-\frac{\delta z}{d} \end{pmatrix}/k.$$

The inverse homography $A^{-1}$ for either one of these simple cases can be computed by using Eq. 7.

Now, when rotation of camera 104 is added, the prior art approach produces homography A that contains the full rotation matrix R and displacement $\bar{h}$. To appreciate the rotation matrix R in traditional homography A we show traditional pose recovery just with respect to wall 150 defined by known corners $P_2$, $P_{10}$, $P_{11}$ and $P_{12}$ (room 100 is empty in FIG. 8 so that all the corners are clearly visible). (By stating that corners $P_2$, $P_{10}$, $P_{11}$ and $P_{12}$ are known, we mean that the correspondence is known. In addition, note that the traditional recovery is not limited to requiring co-planar points used in this visualization.)

In the canonical pose at time $t=t_o$ an enlarged view of display screen 124 showing image 100' captured by camera 104 of smart phone 102 contains image 150' of wall 150. In this pose, wall image 150' shows no perspective distortion. It is a rectangle with its conjugate vanishing points v1, v2 (not shown) both at infinity. The unit vectors $\hat{n}_{v1},\hat{n}_{v2}$ pointing to these conjugate vanishing points are shown with their designations in the further enlarged inset labeled CPV (Canonical Pose View). Unit surface normal $\hat{n}_p$, which is obtained from the cross-product of vectors $\hat{n}_{v1},\hat{n}_{v2}$ points into the page in inset CPV. In the real three-dimensional space of environment 100, this corresponds to pointing from viewpoint O straight at the origin of world coordinates ($X_w, Y_w, Z_w$) along optical axis OA. Of course, $\hat{n}_p$ is also the normal to wall 150 based on our parameterization and definitions.

In the unknown pose at time $t=t_1$ another enlarged view of display screen 124 shows image 100'. This time image 150' of wall 150 is distorted by the perspective of camera 104. Now conjugate vanishing points v1, v2 associated with the quadrilateral of wall image 150' are no longer at infinity, but at the locations shown. Of course, vanishing points v1, v2 are not real points but are defined by mathematical construction, as shown by the long-dashed lines. The unit vectors $\hat{n}_{v1}, \hat{n}_{v2}$ pointing to conjugate vanishing points v1, v2 are shown in the further enlarged inset labeled UPV (Unknown Pose View). Unit surface normal $\hat{n}_p$, again obtained from the cross-product of vectors $\hat{n}_{v1}, \hat{n}_{v2}$, no longer points into the page in inset UVP. In the real three-dimensional space of environment 100, $\hat{n}_p$ still points from viewpoint O at the origin of world coordinates ($X_w, Y_w, Z_w$), but this is no longer a direction along optical axis OA of camera 104 due to the unknown rotation of phone 102.

The traditional homography A will recover the unknown rotation in terms of rotation matrix R composed of vectors $\hat{n}_{v1}, \hat{n}_{v2}, \hat{n}_p$ in their transposed form $\hat{n}_{v1}, \hat{n}_{v2}, \hat{n}_p$. In fact, the transposed vectors $\hat{n}_{v1}, \hat{n}_{v2}, \hat{n}_p$ simply form the column space of rotation matrix R. Of course, the complete traditional homography A also contains displacement $\bar{h}$. Finally, to recover the pose of phone 102 we again need to find homography A, which is easily done by the rules of linear algebra.

In accordance with the invention, we start with traditional homography A that includes rotation matrix R and reduce it to homography H by using the fact that the z-component of normalized n-vector $\bar{m}_i'$ does not contribute to n-vector (the pole into which $r_i'$ is translated). From Eq. 5, the pole $\bar{n}_i'$ representing model ray $r_i'$ in the unknown pose is given by:

$$\bar{n}_i' = \hat{o}' \times \bar{m}_i' = \begin{pmatrix} 0 & -1 & 0 \\ 1 & 0 & 0 \\ 0 & 0 & 0 \end{pmatrix} \bar{m}_i' = \begin{pmatrix} -y_i' \\ x_i' \\ 0 \end{pmatrix}, \quad \text{(Eq. 8)}$$

where the components of vector $\bar{m}_i'$ are called ($x_i', y_i', z_i'$). Homography A representing the collineation from canonical pose to unknown pose, in which we represent points $p_i'$ with n-vectors $\bar{m}_i'$ can then be written with a scaling constant $\kappa$ as:

$$\bar{m}_i' = \kappa A^T \bar{m}_i. \quad \text{(Eq. 9)}$$

Note that the transpose of A, or $A^T$, is applied here because of the "passive" convention as defined by Eq. 4. In other words, when camera 104 motion is described by matrix A, what happens to the features in the environment from the camera's point of view is just the opposite. Hence, the transpose of A is used to describe what the camera is seeing as a result of its motion.

Now, in the reduced representation chosen according to the invention, the z-component of n-vector $\bar{m}_i'$ does not matter (since it will go to zero as we saw in Eq. 8). Hence, the final z-contribution from the transpose of the Euler rotation matrix that is part of the homography does not matter. Thus, by using reduced transposes of Eqs. 2A & 2B representing the Euler rotation matrices and setting their z-contributions to zero except for $R^T(\phi)$, we obtain a reduced transpose $R_r^T$ of a modified rotation matrix $R_r$:

$$R_r^T = R_r^T(\psi) \cdot R_r^T(\psi) \cdot R_r^T(\theta) \cdot R^T(\phi). \quad \text{(Eq. 10A)}$$

Expanded to its full form, this transposed rotation matrix $R_r^T$ is:

$$R_r^T = \begin{pmatrix} \cos\psi & \sin\psi & 0 \\ -\sin\psi & \cos\psi & 0 \\ 0 & 0 & 0 \end{pmatrix} \begin{pmatrix} 1 & 0 & 0 \\ 0 & \cos\theta & \sin\theta \\ 0 & 0 & 0 \end{pmatrix} \begin{pmatrix} \cos\phi & \sin\phi & 0 \\ -\sin\phi & \cos\phi & 0 \\ 0 & 0 & 1 \end{pmatrix}, \quad \text{(Eq. 10B)}$$

and it multiplies out to:

$$R_r^T = \begin{pmatrix} \cos\phi\cos\psi - \cos\theta\sin\phi\sin\psi & \cos\psi\sin\phi + \cos\theta\cos\phi\sin\psi & \sin\theta\sin\psi \\ -\cos\theta\cos\psi\sin\phi - \cos\phi\sin\psi & \cos\theta\cos\phi\cos\psi - \sin\phi\sin\psi & \cos\psi\sin\theta \\ 0 & 0 & 0 \end{pmatrix}. \quad \text{(Eq. 10C)}$$

Using trigonometric identities on entries with multiplication of three rotation angles in the transpose of the modified rotation matrix $R_r^T$ we convert expressions involving sums and differences of rotation angles in the upper left 2×2 sub-matrix of $R_r^T$ into a 2×2 sub-matrix C as follows:

$$C = \frac{1}{2}\begin{pmatrix} -\cos\theta\cos(\phi-\psi) + \cos(\phi-\psi) + & -\cos\theta\sin(\phi-\psi) + \sin(\phi-\psi) + \\ \cos\theta\cos(\phi+\psi) + \cos(\phi+\psi) & \cos\theta\sin(\phi+\psi) + \sin(\phi+\psi) \\ -\cos\theta\sin(\phi-\psi) + \sin(\phi-\psi) - & \cos\theta\cos(\phi-\psi) - \cos(\phi-\psi) + \\ \cos\theta\sin(\phi+\psi) - \sin(\phi+\psi) & \cos\theta\cos(\phi+\psi) + \cos(\phi+\psi) \end{pmatrix} \quad \text{(Eq. 11)}$$

It should be noted that sub-matrix C can be decomposed into a 2×2 improper rotation (reflection along y, followed by rotation) and a proper 2×2 rotation.

Using sub-matrix C from Eq. 11, we can now rewrite Eq. 9 as follows:

$$\bar{m}_i' = \kappa \begin{pmatrix} C & \sin\psi\sin\theta \\ & \cos\psi\sin\theta \\ 0 & 0 \end{pmatrix} \begin{pmatrix} 1 & 0 & -\delta x/d \\ 0 & 1 & -\delta y/d \\ 0 & 0 & (d-\delta z)/d \end{pmatrix} \bar{m}_i = \kappa H^T \bar{m}_i \quad \text{(Eq. 12)}$$

At this point we remark again, that because of the reduced representation of the invention the z-component of n-vector $\bar{m}_i'$ does not matter. We can therefore further simplify Eq. 12 as follows:

$$\bar{m}_i' = \kappa \begin{pmatrix} C & \bar{b} \\ 0 & 0 \end{pmatrix} \bar{m}_i, \quad \text{(Eq. 13)}$$

where the newly introduced column vector $\bar{b}$ follows from Eq. 12:

$$\bar{b} = -C\begin{pmatrix} \delta x/d \\ \delta y/d \end{pmatrix} + \frac{d-\delta z}{d}\begin{pmatrix} \sin\psi \\ \cos\psi \end{pmatrix}\sin\theta. \quad \text{(Eq. 13A)}$$

Thus we have now derived a reduced homography H, or rather its transpose $H^T = [C, \bar{b}]$.

We now deploy our reduced representation as the basis for performing actual pose recovery. In this process, the transpose of reduced homography $H^T$ has to be estimated with a 2×3 estimation matrix $\Theta$ from measured points $\hat{p}_i$. Specifically, we set $\Theta$ to match sub-matrix C and two-dimensional column vector $\bar{b}$ as follows:

$$\Theta = \begin{pmatrix} \theta_1 & \theta_2 & \theta_3 \\ \theta_4 & \theta_5 & \theta_6 \end{pmatrix} = (C \quad \bar{b}). \quad \text{(Eq. 14)}$$

Note that the thetas used in Eq. 14 are not angles, but rather the estimation values of the reduced homography.

When $\Theta$ is estimated, we need to extract the values for the in-plane displacements $\delta x/d$ and $\delta y/d$. Meanwhile $\delta z$, rather than being zero when strictly constrained to reference plane 118, is allowed to vary between $-\epsilon_f$ and $+\epsilon_b$. From Eq. 14 we find that under these conditions displacements $\delta x/d$, $\delta y/d$ are given by:

$$\begin{pmatrix} \delta x/d \\ \delta y/d \end{pmatrix} \approx -C^{-1} \begin{pmatrix} \theta_3 \\ \theta_6 \end{pmatrix} + C^{-1} \begin{pmatrix} \sin\psi \\ \cos\psi \end{pmatrix} \sin\theta. \quad \text{(Eq. 15)}$$

Note that $\delta z$ should be kept small (i.e., $(d-\delta z)/d$ should be close to one) to ensure that this approach yields good results.

Now we are in a position to put everything into our reduced representation framework. For any given space point $P_i$, its ideal image point $p_i$ in canonical pose is represented by $\bar{m}_i = (x_i, y_i, z_i)^T$. In the unknown pose, the ideal image point $p_i'$ has a reduced ray representation $r_i'$ and translates to an n-vector $\bar{n}_i'$. The latter can be written as follows:

$$\bar{n}_i' = \kappa \begin{bmatrix} -y_i' \\ x_i' \\ 0 \end{bmatrix}. \quad \text{(Eq. 16)}$$

The primed values in the unknown pose, i.e., point $p_i'$ expressed by its $x_i'$ and $y_i'$ values recorded on sensor 130, can be restated in terms of estimation values $\theta_1, \ldots, \theta_6$ and canonical point $p_i$ known by its $x_i$ and $y_i$ values. This is accomplished by referring back to Eq. 14 to see that:

$x'_i = \theta_1 x_i + \theta_2 y_i + \theta_3$, and $y'_i = \theta_4 x_i + \theta_5 y_i + \theta_6$.

In this process, we have scaled the homogeneous representation of space points $P_i$ by offset d through multiplication by $1/d$. In other words, the corresponding m-vector $\bar{m}_i$ for each point $P_i$ is taken to be:

$$\bar{m}_i = \begin{bmatrix} x_i \\ y_i \\ d \end{bmatrix} \xrightarrow{1/d} \begin{bmatrix} x_i \\ y_i \\ 1 \end{bmatrix}. \quad \text{(Eq. 17)}$$

With our reduced homography framework in place, we turn our attention from ideal or model values $(p_i' = (x_i', y_i'))$ to the actual measured values $\hat{x}_i$ and $\hat{y}_i$ that describe the location of measured points $\hat{p}_i = (\hat{p}_i = (\hat{x}_i, \hat{y}_i))$ produced by the projection of space points $P_i$ onto sensor 130. Instead of looking at measured values $\hat{x}_i$ and $\hat{y}_i$ in image plane 128 where sensor 130 is positioned, however, we will look at them in projective plane 146 for reasons of clarity and ease of explanation.

FIG. 9A is a plan view diagram of projective plane 146 showing three measured values $\hat{x}_i$ and $\hat{y}_i$ corresponding to repeated measurements of image point $\hat{p}_i$ taken while camera 104 is in the same unknown pose. Remember that, in accordance with our initial assumptions, we know which actual space point $P_i$ is producing measurements $\hat{x}_i$ and $\hat{y}_i$ (the correspondence is known). To distinguish between the individual measurements, we use an additional index to label the three measured points $\hat{p}_i$ along with their x and y coordinates in projective plane 146 as: $\hat{p}_{i1} = (\hat{x}_{i1}, \hat{y}_{i1})$, $\hat{p}_{i2} = (\hat{x}_{i2}, \hat{y}_{i2})$, $\hat{p}_{i3} = (\hat{x}_{i3}, \hat{y}_{i3})$. The reduced representations of these measured points $\hat{p}_{i1}$, $\hat{p}_{i2}$, $\hat{p}_{i3}$ are the corresponding rays $\hat{r}_{i1}$, $\hat{r}_{i2}$, $\hat{r}_{i3}$ derived in accordance with the invention, as described above. The model or ideal image point $p_i'$, which is unknown and not measurable in practice due to noise and structural uncertainty 140, is also shown along with its representation as model or ideal ray $r_i'$ to aid in the explanation.

Since rays $\hat{r}_{i1}$, $\hat{r}_{i2}$, $\hat{r}_{i3}$ remove all radial information on where along their extent measured points $\hat{p}_{i1}$, $\hat{p}_{i2}$, $\hat{p}_{i3}$ are located, we can introduce a useful computational simplification. Namely, we take measured points $\hat{p}_{i1}$, $\hat{p}_{i2}$, $\hat{p}_{i3}$ to lie where their respective rays $\hat{r}_{i1}$, $\hat{r}_{i2}$, $\hat{r}_{i3}$ intersect a unit circle UC that is centered on origin o' of projective plane 146. By definition, a radius rc of unit circle UC is equal to 1.

Under the simplification the sum of squares for each pair of coordinates of points $\hat{p}_{i1}$, $\hat{p}_{i2}$, $\hat{p}_{i3}$, i.e., $(\hat{x}_{i1}, \hat{y}_{i1})$, $(\hat{x}_{i2}, \hat{y}_{i2})$, $(\hat{x}_{i3}, \hat{x}_{i3})$, has to equal 1. Differently put, we have artificially required that $\hat{x}_i^2 + \hat{y}_i^2 = 1$ for all measured points. Furthermore, we can use Eq. 5 to compute the corresponding n-vector translations for each measured point as follows:

$$\hat{n}_i = \begin{bmatrix} -\hat{y}_i \\ \hat{x}_i \\ 0 \end{bmatrix}.$$

Under the simplification, the translation of each ray $\hat{r}_{i1}$, $\hat{r}_{i2}$, $\hat{r}_{i3}$ into its corresponding n-vector $\hat{n}_{i1}$, $\hat{n}_{i2}$, $\hat{n}_{i3}$ ensures that the latter is normalized. Since the n-vectors do not reside in projective plane 146 (see FIG. 7) their correspondence to rays $\hat{r}_{i1}$, $\hat{r}_{i2}$, $\hat{r}_{i3}$ is only indicated with arrows in FIG. 9A.

Now, space point $P_i$ represented by vector $\bar{m}_i = (x_i, y_1, z_i)^T$ (which is not necessarily normalized) is mapped by the transposed reduced homography $H^T$. The result of the mapping is vector $\bar{m}_i' = (x_i', y_i', z_i')$. The latter, because of its reduced representation as seen above in Eq. 8, is translated into just a two-dimensional pole $\bar{n}_i' = (-y_i', x_i')$. Clearly, when working with just the two-dimensional pole $\bar{n}_i'$ we expect that the 2×3 transposed reduced homography $H^T$ of the invention will offer certain advantages over the prior art full 3×3 homography A.

Of course, camera 104 does not measure ideal data while phone 102 is held in the unknown pose. Instead, we get three measured points $\hat{p}_{i1}$, $\hat{p}_{i2}$, $\hat{p}_{i3}$, their rays $\hat{r}_{i1}$, $\hat{r}_{i2}$, $\hat{r}_{i3}$ and the normalized n-vectors representing these rays, namely $\hat{n}_{i1}$, $\hat{n}_{i2}$, $\hat{n}_{i3}$. We want to obtain an estimate of transposed reduced homography $H^T$ in the form of estimation matrix $\Theta$ that best explains n-vectors $\hat{n}_{i1}$, $\hat{n}_{i2}$, $\hat{n}_{i3}$ we have derived from measured points $\hat{p}_{i1}$, $\hat{p}_{i2}$, $\hat{p}_{i3}$ to ground truth expressed for that space point $P_i$ by vector $\bar{n}_i'$. This problem can be solved using several known numerical methods, including iterative techniques. The technique taught herein converts the problem into an eigenvector problem in linear algebra, as discussed in the next section.

Reduced Homography: A General Solution

We start by noting that the mapped ground truth vector $\bar{n}_i'$ (i.e., the ground truth vector after the application of the homography) and measured n-vectors $\hat{n}_{i1}$, $\hat{n}_{i2}$, $\hat{n}_{i3}$ should align under a correct mapping. Let us call their lack of alignment with mapped ground truth vector $\bar{n}_i'$ a disparity h. We define disparity h as the magnitude of the cross product between $\bar{n}_i'$ and measured unit vectors or n-vectors $\hat{n}_{i1}$, $\hat{n}_{i2}$, $\hat{n}_{i3}$. Note that the letter h to denote disparity here is not to be confused with the use of vector $\bar{h}$ to denote camera translation of the teachings of the embodiments. The difference should be obvious from the context to skilled readers of the art, as well as the appreciation that such similarity/overlap of notations is sometimes unavoidable, and even desirable given the prevailing conventions found in the textbooks and other industry literature of the art.

FIG. 9B shows the disparity $\bar{n}_i'$, between C which corresponds to space point $P_i$, and $\hat{n}_{i1}$ derived from first measurement point $\hat{p}_{i1}=(\hat{x}_{i1},\hat{y}_{i1})$ From the drawing figure, and by recalling the Pythagorean theorem, we can write a vector equation that holds individually for each disparity $h_i$ as follows:

$$h_i^2 + (\bar{n}_i' \cdot \hat{n}_i)^2 = \bar{n}_i' \cdot \bar{n}_i'. \qquad \text{(Eq. 18)}$$

Substituting with the actual x and y components of the vectors in Eq. 18, collecting terms and solving for $h_i^2$, we obtain:

$$h_i^2 = (y_i')^2 + (x_i')^2 - (y_i')^2(\hat{y}_i)^2 - (x_i')^2(\hat{x}_i)^2 - 2(x_i'y_i')(\hat{x}_i\hat{y}_i) \qquad \text{(Eq. 19)}$$

Since we have three measurements, we will have three such equations, one for each disparity $h_{i1}$, $h_{i2}$, $h_{i3}$.

We can aggregate the disparity from the three measured points we have, or indeed from any number of measured points, by taking the sum of all disparities squared. In the present case, the approach produces the following performance criterion and associated optimization problem:

$$\min_{\text{over } \theta_1,\ldots,\theta_6} J = \frac{1}{2} \sum h_i^2 \qquad \text{(Eq. 20)}$$

such that $$\text{Det}\|\Theta\Theta^T\| = 1.$$

Note that the condition of the determinant of the square symmetric matrix $\Theta\Theta^T$ is required to select one member out of the infinite family of possible solutions. To recall, any homography is always valid up to a scale. In other words, other than the scale factor, the homography remains the same for any magnification (de-magnification) of the image or the stationary objects in the environment.

In a first step, we expand Eq. 19 over all estimation values $\theta_1, \ldots, \theta_6$ of our estimation matrix $\Theta$. To do this, we first construct vectors $\bar{\theta}=(\theta_1,\theta_2,\theta_3,\theta_4,\theta_5,\theta_6)$ containing all estimation values. Note that $\bar{\theta}$ vectors are six-dimensional.

Now we notice that all the squared terms in Eq. 19 can be factored and substituted using our computational simplification in which $\hat{x}_i^2 + \hat{y}_i^2 = 1$ for all measured points. To apply the simplification, we first factor the square terms as follows:

$$(y_i')^2 + (x_i')^2 - (y_i')^2(\hat{y}_i)^2 - (x_i')^2(\hat{x}_i)^2 = (x_i')^2(1-\hat{x}_i^2) + (y_i')^2(1-\hat{y}_i^2)$$

We now substitute $(1-\hat{x}_i^2)=\hat{y}_i^2$ and $(1-\hat{y}_i^2)=\hat{x}_i^2$ from the condition $\hat{x}_i^2 + \hat{y}_i^2 = 1$ and rewrite entire Eq. 19 as:

$$h_i^2 = (x_i')^2(\hat{y}_i)^2 + (y_i')^2(\hat{x}_i)^2 - 2(x_i'y_i')(\hat{x}_i\hat{y}_i)$$

From elementary algebra we see that in this form the above is just the square of a difference. Namely, the right hand side is really $(a-b)^2 = a^2 - 2ab + b^2$ in which $a=(x_i')^2(\hat{y}_i)^2$ and $b=(y_i')^2(\hat{x}_i)^2$. We can express this square of a difference in matrix form to obtain:

$$h_i^2 = (x_i'\hat{y}_i, y_i'\hat{x}_i) \cdot \left[\begin{pmatrix} x_i'\hat{y}_i \\ y_i'\hat{x}_i \end{pmatrix} - \begin{pmatrix} y_i'\hat{x}_i \\ x_i'\hat{y}_i \end{pmatrix}\right]. \qquad \text{(Eq. 21)}$$

Returning now to our purpose of expanding over vectors $\bar{\theta}$, we note that from Eq. 14 we have already obtained expressions for the expansion of $x_i'$ and $y_i'$ over estimation values $-_1, -_2, -_3, -_4, -_5, -_6$. To recall, $x'_i = \theta_1 x_i + \theta_2 y_i + \theta_3$ and $y'_i = \theta_4 x_i + \theta_5 y_i + \theta_6$ This allows us to reformulate the column vector $[x_i'\hat{y}_i, y_i'\hat{x}_i]$ and expand it over our estimation values as follows:

$$\begin{bmatrix} x_i'\hat{y}_i \\ y_i'\hat{x}_i \end{bmatrix} = \begin{bmatrix} \hat{y}_i[x_i,y_i,1] & 0\ 0\ 0 \\ 0\ 0\ 0 & \hat{x}_i[x_i,y_i,1] \end{bmatrix} \cdot \bar{\theta}. \qquad \text{(Eq. 22A)}$$

Now we have a 2×6 matrix acting on our 6-dimensional column vector $\bar{\theta}$ of estimation values.

Vector $[x_i, y_i, 1]$ in its row or column form represents corresponding space point $P_i$ in canonical pose and scaled coordinates. In other words, it is the homogeneous representation of space points $P_i$ scaled by offset distance d through multiplication by 1/d.

By using the row and column versions of the vector $\bar{m}_i$ we can rewrite Eq. 22A as:

$$\begin{bmatrix} x_i'\hat{y}_i \\ y_i'\hat{x}_i \end{bmatrix} = \begin{bmatrix} \hat{y}_i \bar{m}_i^T & 0 \\ 0 & \hat{x}_i \bar{m}_i^T \end{bmatrix} \cdot \bar{\theta}, \qquad \text{(Eq. 22B)}$$

where the transpose of the vector is taken to place it in its row form. Additionally, the off-diagonal zeroes now represent 3-dimensional zero row vectors (0,0,0), since the matrix is still 2×6.

From Eq. 22B we can express $[y_i',\hat{x}_i,x_i']^T$ as follows:

$$\begin{bmatrix} y_i'\hat{x}_i \\ x_i'\hat{y}_i \end{bmatrix} = \begin{bmatrix} 0 & \hat{x}_i \bar{m}_i^T \\ \hat{y}_i \bar{m}_i^T & 0 \end{bmatrix} \cdot \bar{\theta}.$$

Based on the matrix expression of vector $[x_i'\hat{y}_i, y_i'\hat{x}_i]^T$ of Eq. 22B we can now rewrite Eq. 21, which is the square of the difference of these two vector entries in matrix form expanded over the 6-dimensions of our vector of estimation values $\bar{\theta}$ as follows:

$$h_i^2 = \bar{\theta}^T \cdot \begin{bmatrix} \hat{y}_i \bar{m}_i & 0 \\ 0 & \hat{x}_i \bar{m}_i \end{bmatrix} \begin{bmatrix} \hat{y}_i \bar{m}_i^T & -\hat{x}_i \bar{m}_i^T \\ -\hat{y}_i \bar{m}_i^T & \hat{x}_i \bar{m}_i^T \end{bmatrix} \cdot \bar{\theta}. \qquad \text{(Eq. 23)}$$

It is important to note that the first matrix is 6×2 while the second is 2×6 (recall from linear algebra that matrices that are n by m and j by k can be multiplied, as long as m=j).

Multiplication of the two matrices in Eq. 23 thus yields a 6×6 matrix that we shall call M. The M matrix is multiplied on the left by row vector $\bar{\theta}^T$ of estimation values and on the right by column vector $\bar{\theta}$ of estimation values. This formulation accomplishes our goal of expanding the expression for the square of the difference over all estimation values as we had intended. Moreover, it contains only known quantities, namely the measurements from sensor 130 (quantities with "hats") and the coordinates of space points $P_i$ in the known canonical pose of camera 104.

Furthermore, the 6×6 M matrix obtained in Eq. 23 has several useful properties that can be immediately deduced from the rules of linear algebra. The first has to do with the fact that it involves compositions of 3-dimensional m-vectors in column form $\bar{m}_i$ and row form $\bar{m}_i^T$. A composition taken in that order is very useful because it expands into a 3×3 matrix that is guaranteed to be symmetric and positive definite, as is clear upon inspection:

$$\bar{m}_i \cdot \bar{m}_i^T = \begin{bmatrix} x_i^2 & x_i y_i & x_i \\ x_i y_i & y_i^2 & y_i \\ x_i & y_i & 1 \end{bmatrix}.$$

In fact, the 6×6 M matrix has four 3×3 blocks that include this useful composition, as is confirmed by performing the matrix multiplication in Eq. 23 to obtain the 6×6 M matrix in its explicit form:

$$M = \begin{bmatrix} \hat{y}_i^2 \bar{m}_i \bar{m}_i^T & -\hat{x}_i \hat{y}_i \bar{m}_i \bar{m}_i^T \\ -\hat{x}_i \hat{y}_i \bar{m}_i \bar{m}_i^T & \hat{x}_i^2 \bar{m}_i \bar{m}_i^T \end{bmatrix} = \begin{bmatrix} S_{02} & -S_{11} \\ -S_{11} & S_{22} \end{bmatrix}.$$

The congenial properties of the $\bar{m}_i \bar{m}_i^T$ 3×3 block matrices bestow a number of useful properties on correspondent block matrices S that make up the M matrix, and on the M matrix itself. In particular, we note the following symmetries:

$$S_{02}^T = S_{02}; S_{20}^T = S_{20}; S_{11}^T = S_{11}; M^T = M.$$

These properties guarantee that the M matrix is positive definite, symmetrical and that its eigenvalues are real and positive.

Of course, the M matrix only corresponds to a single measurement. Meanwhile, we will typically accumulate many measurements for each space point $P_i$. In addition, the same homography applies to all space points $P_i$ in any given unknown pose. Hence, what we really need is a sum of M matrices. The sum has to include measurements $\hat{p}_{ij} = (\hat{x}_{ij}, \hat{y}_{ij})$ for each space point $P_i$ and all of its measurements further indexed by j. The sum of all M matrices thus produced is called the Σ-matrix and is expressed as:

$$\Sigma = \Sigma_{i,j} M.$$

The Σ-matrix should not be confused with the summation sign used to sum all of the M matrices.

Now we are in a position to revise the optimization problem originally posed in Eq. 20 using the Σ-matrix we just introduced above to obtain:

$$\min_{\bar{\theta}} J = \frac{1}{2}(\bar{\theta}^T \Sigma \bar{\theta}) \text{ such that } \|\bar{\theta}\| = 1. \tag{Eq. 24}$$

Note that the prescribed optimization requires that the minimum of the Σ-matrix be found by varying estimation values $\theta_1$, $\theta_2$, $\theta_3$, $\theta_4$, $\theta_5$, $\theta_6$ succinctly expressed by vector $\bar{\theta}$ under the condition that the norm of $\bar{\theta}$ be equal to one. This last requirement is not the same as the original constraint that $\text{Det}\|\Theta\Theta^T\|=1$, but is a robust approximation that in the absence of noise produces the same solution and makes the problem solvable with linear methods.

There are a number of ways to solve the optimization posed by Eq. 24. A convenient procedure that we choose herein involves the well-known Lagrange multipliers method that provides a strategy for finding the local minimum (or maximum) of a function subject to an equality constraint. In our case, the equality constraint is placed on the norm of vector $\bar{\theta}$. Specifically, the constraint is that $\|\bar{\theta}\|=1$, or otherwise put: $\bar{\theta}^T \cdot \bar{\theta} = 1$. (Note that this last expression does not produce a matrix, since it is not an expansion, but rather an inner product that is a number, in our case 1. The reader may also review various types of matrix and vector norms, including the Forbenius norm for additional prior art teachings on this subject).

To obtain the solution we introduce the Lagrange multiplier λ as an additional parameter and translate Eq. 24 into a Lagrangian under the above constraint as follows:

$$\min_{\bar{\theta}, \lambda} J = \frac{1}{2}(\bar{\theta}^T \Sigma \bar{\theta}) + \frac{\lambda}{2}(1 - \bar{\theta}^T \bar{\theta}). \tag{Eq. 25}$$

To find the minimum we need to take the derivative of the Lagrangian of Eq. 25 with respect to our parameters of interest, namely those expressed in vector $\bar{\theta}$. A person skilled in the art will recognize that we have introduced the factor of ½ into our Lagrangian because the derivative of the squared terms of which it is composed will yield a factor of 2 when the derivative of the Lagrangian is taken. Thus, the factor of ½ that we introduced above will conveniently cancel the factor of 2 due to differentiation.

The stationary point or the minimum that we are looking for occurs when the derivative of the Lagrangian with respect to $\bar{\theta}$ is zero. We are thus looking for the specific vector $\bar{\theta}^*$ when the derivative is zero, as follows:

$$\frac{dJ}{d\bar{\theta}}\bigg|_{\bar{\theta}=\bar{\theta}^*} = \Sigma \bar{\theta}^* - \lambda \bar{\theta}^* = 0. \tag{Eq. 26}$$

(Notice the convenient disappearance of the ½ factor in Eq. 26.) We immediately recognize that Eq. 26 is a characteristic equation that admits of solutions by an eigenvector of the Σ matrix with the eigenvalue λ. In other words, we just have to solve the eigenvalue equation:

$$\Sigma \bar{\theta}^* = \lambda \bar{\theta}^*, \tag{Eq. 27}$$

where $\bar{\theta}^*$ is the eigenvector and λ the corresponding eigenvalue. As we noted above, the Σ matrix is positive definite, symmetric and has real and positive eigenvalues. Thus, we are guaranteed a solution. The one we are looking for is the eigenvector $\bar{\theta}^*$ with the smallest eigenvalue, i.e., $\lambda = \lambda_{min}$.

The eigenvector $\bar{\theta}^*$ contains all the information about the rotation angles. In other words, once the best fit of measured data to unknown pose is determined by the present optimization approach, or another optimization approach, the eigenvector $\bar{\theta}^*$ provides the actual best estimates for the six parameters that compose the reduced homography H, and which are functions of the rotation angles $\phi,\theta,\psi$ we seek to find (see Eq. 12 and components of reduced or modified rotation matrix $R_r^T$ in Eq. 11). A person skilled in the art will understand that using this solution will allow one to recover pose parameters of camera 104 by applying standard rules of trigonometry and linear algebra.

Reduced Homography: Detailed Application Examples and Solutions in Cases of Radial Structural Uncertainty We now turn to FIG. 10A for a practical example of camera pose recovery that uses the reduced homography H of the invention. FIG. 10A is an isometric view of a real, stable, three-dimensional environment 300 in which the main stationary object is a television 302 with a display screen 304. World coordinates $(X_w, Y_w, Z_w)$ that parameterize environment 300 have their origin in the plane of screen 304 and are oriented such that screen 304 coincides with the $X_w$-$Y_w$ plane. Moreover, world coordinates $(X_w, Y_w, Z_w)$ are right-handed with the $Z_w$-axis pointing into screen 304.

Item 102 equipped with on-board optical apparatus 104 is the smart phone with the CMOS camera already introduced above. For reference, viewpoint O of camera 104 in the canonical pose at time $t=t_o$ is shown. Recall that in the canonical pose camera 104 is aligned such that camera coordinates $(X_c, Y_c, Z_c)$ are oriented the same way as world coordinates $(X_w, Y_w, Z_w)$. In other words, in the canonical pose camera coordinates $(X_c, Y_c, Z_c)$ are aligned with world coordinates $(X_w, Y_w, Z_w)$ and thus the rotation matrix R is the identity matrix I.

The condition that the motion of camera 104 be essentially confined to a reference plane holds as well. Instead of showing the reference plane explicitly in FIG. 10A, viewpoint O is shown with a vector offset $\bar{d}$ from the $X_w$-$Y_w$ plane in the canonical position. The offset distance from the $X_w$-$Y_w$ plane that viewpoint O needs to maintain under the condition on the motion of camera 104 from the plane of screen 304 is just equal to that vector's norm, namely d. As already explained above, offset distance d to $X_w$-$Y_w$ plane may vary slightly during the motion of camera 104 (see FIG. 5A and corresponding description). Alternatively, the accuracy up to which offset distance d is known can exhibit a corresponding tolerance.

In an unknown pose at time $t=t_2$, the total displacement between viewpoint O and the origin of world coordinates $(X_w, Y_w, Z_w)$ is equal to $\bar{d}+\bar{h}$. The scalar distance between viewpoint O and the origin of world coordinates $(X_w, Y_w, Z_w)$ is just the norm of this vector sum. Under the condition imposed on the motion of camera 104 the z-component (in world coordinates) of the vector sum should always be approximately equal to offset distance d set in the canonical pose. More precisely put, offset distance d, which is the z-component of vector sum $\bar{d}+\bar{h}$ should preferably only vary between $d-\epsilon_f$ and $d+\epsilon_b$, as explained above in reference to FIG. 5A.

In the present embodiment, the condition on the motion of smart phone 102, and thus on camera 104, can be enforced from knowledge that allows us to place bounds on that motion. In the present case, the knowledge is that smart phone 102 is operated by a human. A hand 306 of that human is shown holding smart phone 102 in the unknown pose at time $t=t_2$.

In a typical usage case, the human user will stay seated a certain distance from screen 304 for reasons of comfort and ease of operation. For example, the human may be reclined in a chair or standing at a comfortable viewing distance from screen 304. In that condition, a gesture or a motion 308 of his or her hand 306 along the z-direction (in world coordinates) is necessarily limited. Knowledge of the human anatomy allows us to place the corresponding bound on motion 308 in z. This is tantamount to bounding the variation in offset distance d from the $X_w$-$Y_w$ plane or to knowing that the z-distance between viewpoint O and the $X_w$-$Y_w$ plane, as required for setting our condition on the motion of camera 104. If desired, the possible forward and back movements that human hand 306 is likely to execute, i.e., the values of $d-\epsilon_f$ and $d+\epsilon_b$, can be determined by human user interface specialists. Such accurate knowledge ensures that the condition on the motion of camera 104 consonant with the reduced homography H that we are practicing is met.

Alternatively, the condition can be enforced by a mechanism that physically constrains motion 308. For example, a pane of glass 310 serving as that mechanism may be placed at distance d from screen 304. It is duly noted that this condition is frequently found in shopping malls and at storefronts. Other mechanisms are also suitable, especially when the optical apparatus is not being manipulated by a human user, but instead by a robot or machine with intrinsic mechanical constraints on its motion.

In the present embodiment non-collinear optical features that are used for pose recovery by camera 104 are space points $P_{20}$ through $P_{27}$ belonging to television 302. Space points $P_{20}$ through $P_{24}$ belong to display screen 304. They correspond to its corners and to a designated pixel. Space points $P_{25}$ through $P_{27}$ are high contrast features of television 302 including its markings and a corner. Knowledge of these optical features can be obtained by direct measurement prior to implementing the reduced homography H of the invention or they may be obtained from the specifications supplied by the manufacturer of television 302. Optionally, separate or additional optical features, such as point sources (e.g., LEDs or even IR LEDs) can be provided at suitable locations on television 302 (e.g., around screen 304).

During operation, the best fit of measured data to unknown pose at time $t=t_2$ is determined by the optimization method of the previous section, or by another optimization approach. The eigenvector $\bar{\theta}^*$ found in the process provides the actual best estimates for the six parameters that are its components. Given those, we will now examine the recovery of camera pose with respect to television 302 and its screen 304.

First, in unknown pose at $t=t_2$ we apply the optimization procedure introduced in the prior section. The eigenvector $\bar{\theta}^*$ we find, yields the best estimation values for our transposed and reduced homography $H^T$ as expressed by estimation matrix $\Theta$. To recall, Eq. 14 shows that the estimation values correspond to entries of 2×2 C sub-matrix and the components of two-dimensional $\bar{b}$ vector as follows:

$$\Theta = \begin{pmatrix} \theta_1 & \theta_2 & \theta_3 \\ \theta_4 & \theta_5 & \theta_6 \end{pmatrix} = (C \; \bar{b}). \quad \text{(Eq. 14)}$$

We can now use this estimation matrix $\Theta$ to explicitly recover a number of useful pose parameters, as well as other parameters that are related to the pose of camera 104. Note that it will not always be necessary to extract all pose parameters and the scaling factor κ to obtain the desired information.

Pointer Recovery

Frequently, the most important pose information of camera 104 relates to a pointer 312 on screen 304. Specifically, it is very convenient in many applications to draw pointer 312 at the location where the optical axis OA of camera 104 intersects screen 304, or, equivalently, the $X_w$-$Y_w$ plane of world coordinates $(X_w,Y_w,Z_w)$. Of course, optical axis OA remains collinear with $Z_n$-axis of camera coordinates as defined in the present convention irrespective of pose assumed by camera 104 (see, e.g., FIG. 7). This must therefore be true in the unknown pose at time $t=t_2$. Meanwhile, in the canonical pose obtaining at time $t=t_o$ in the case shown in FIG. 10A, pointer 312 must be at the origin of world coordinates $(X_w,Y_w,Z_w)$, as indicated by the dashed circle.

Referring now to FIG. 10B, we see an isometric view of just the relevant aspects of FIG. 10A as they relate to the recovery of the location of pointer 312 on screen 304. To further simplify the explanation, screen coordinates (XS, YS) are chosen such that they coincide with world coordinate axes $X_w$ and $Y_w$. Screen origin Os is therefore also coincident with the origin of world coordinates $(X_w,Y_w,Z_w)$. Note that in some conventions the screen origin is chosen in a corner, e.g., the upper left corner of screen 304 and in those situations a displacement between the coordinate systems will have to be accounted for by a corresponding coordinate transformation.

In the canonical pose, as indicated above, camera $Z_n$-axis is aligned with world $Z_w$-axis and points at screen origin Os. In this pose, the location of pointer 312 in screen coordinates is just (0,0) (at the origin), as indicated. Viewpoint O is also at the prescribed offset distance d from screen origin Os.

Unknown rotation and translation, e.g., a hand gesture, executed by the human user places smart phone 102, and more precisely its camera 104 into the unknown pose at time $t=t_2$, in which viewpoint O is designated with a prime, i.e., O'. The camera coordinates that visualize the orientation of camera 104 in the unknown pose are also denoted with primes, namely $(X_c',Y_c',Z_c')$. (Note that we use the prime notation to stay consistent with the theoretical sections in which ideal parameters in the unknown pose were primed and were thus distinguished from the measured ones that bear a "hat" and the canonical ones that bear no marking.)

In the unknown pose, optical axis OA extending along rotated camera axis $Z_c'$ intersects screen 304 at unknown location $(x_s,y_s)$ in screen coordinates, as indicated in FIG. 10B. Location $(x_s,y_s)$ is thus the model or ideal location where pointer 312 should be drawn. Because of the constraint on the motion of camera 104 necessary for practicing our reduced homography we know that viewpoint O' is still at distance d to the plane (XS-YS) of screen 304. Pointer 312 as seen by the camera from the unknown pose is represented by vector $\overline{m}_s'$. However, vector $\overline{m}_s'$ which extends along the camera axis from viewpoint O' in the unknown pose to the unknown location of pointer 312 on screen 304 (i.e., $\overline{m}_s'$ extends along optical axis OA) is $\overline{m}_s'=(0,0,d)$.

The second Euler rotation angle, namely tilt θ, is visualized explicitly in FIG. 10B. In fact, tilt angle θ is the angle between the p-vector $\overline{p}$ that is perpendicular to the screen plane (see FIG. 8 and corresponding teachings for the definition of p-vector). By also explicitly drawing offset d between unknown position of viewpoint O' and screen 304 we see that it is parallel to p-vector $\overline{p}$. In fact, tilt θ is also clearly the angle between offset d and optical axis OA of rotated camera axis $Z_c'$ in the unknown pose.

According to the present teachings, transposed and reduced homography $H^T$ recovered in the form of estimation matrix Θ contains all the necessary information to recover the position $(x_s,y_s)$ of pointer 312 on screen 304 in the unknown pose of camera 104. In terms of the reduced homography, we know that its application to vector $\overline{m}_s=(x_s,y_s,d)$ in canonical pose should map it to vector $\overline{m}_s'=(0,0,d)$ with the corresponding scaling factor κ, as expressed by Eq. 13 (see also Eq. 12). In fact, by substituting the estimation matrix Θ found during the optimization procedure in the place of the transpose of reduced homography $H^T$, we obtain from Eq. 13:

$$\overline{m}_s' = \kappa(C\overline{b})\overline{m}_s. \tag{Eq. 13'}$$

Written explicitly with vectors we care about, Eq. 13' becomes:

$$\overline{m}_s' = \begin{pmatrix} 0 \\ 0 \end{pmatrix} = \kappa(C \ \ \overline{b}) \begin{pmatrix} x_s \\ y_s \\ d \end{pmatrix}.$$

At this point we see a great advantage of the reduced representation of the invention. Namely, the z-component of vector $\overline{m}_s'$ does not matter and is dropped from consideration. The only entries that remain are those we really care about, namely those corresponding to the location of pointer 312 on screen 304.

Because the map is to ideal vector (0,0,d) we know that this mapping from the point of view of camera 104 is a scale-invariant property. Thus, in the case of recovery of pointer 312 we can drop scale factor κ. Now, solving for pointer 312 on screen 304, we obtain the simple equation:

$$\begin{pmatrix} 0 \\ 0 \end{pmatrix} = (C \ \ \overline{b}) \begin{pmatrix} x_s \\ y_s \\ d \end{pmatrix} = C \begin{pmatrix} x_s \\ y_s \end{pmatrix} + d\overline{b}. \tag{Eq. 28}$$

To solve this linear equation for our two-dimensional vector $(x_s,y_s)$ we subtract vector $d\overline{b}$. Then we multiply by the inverse of matrix C, i.e., by $C^{-1}$, taking advantage of the property that any matrix times its inverse is the identity. Note that unlike reduced homography H, which is a 2 by 3 matrix and thus has no inverse, matrix C is a non-singular 2 by 2 matrix and thus has an inverse. The position of pointer 312 on screen 304 satisfies the following equation:

$$\begin{pmatrix} x_s \\ y_s \end{pmatrix} = -dC^{-1}\overline{b}. \tag{Eq. 29A}$$

To get the actual numerical answer, we need to substitute for the entries of matrix C and vector $\overline{b}$ the estimation values obtained during the optimization procedure. Just to denote this in the final numerical result, we will denote the estimation values taken from the eigenvector $\overline{\theta}^*$ with "hats" (i.e., $\overline{\theta}^*=(\theta_1,\theta_2,\theta_3,\theta_4,\theta_5,\theta_6)$ and write:

$$\begin{pmatrix} \hat{x}_s \\ \hat{y}_s \end{pmatrix} = -d \begin{pmatrix} \hat{\theta}_1 & \hat{\theta}_2 \\ \hat{\theta}_4 & \hat{\theta}_5 \end{pmatrix}^{-1} \begin{pmatrix} \hat{\theta}_3 \\ \hat{\theta}_6 \end{pmatrix}. \quad \text{(Eq. 29B)}$$

Persons skilled in the art will recognize that this is a very desirable manner of recovering pointer 312, because it can be implemented without having to perform any extraneous computations such as determining scale factor κ.

Recovery of Pose Parameters and Rotation Angles

Of course, in many applications the position of pointer 312 on screen 304 is not all the information that is desired. To illustrate how the rotation angles $\phi, \theta, \psi$ are recovered, we turn to the isometric diagram of FIG. 10C, which again shows just the relevant aspects of FIG. 10A as they relate to the recovery of rotation angles of camera 104 in the unknown pose. Specifically, FIG. 10C shows the geometric meaning of angle θ, which is also the second Euler rotation angle in the convention we have chosen herein.

Before recovering the rotation angles to which camera 104 was subjected by the user in moving from the canonical to the unknown pose, let us first examine sub-matrix C and vector $\bar{b}$ more closely. Examining them will help us better understand their properties and the pose parameters that we will be recovering.

We start with 2×2 sub-matrix C. The matrices whose composition led to sub-matrix C and vector $\bar{b}$ were due to the transpose of the modified or reduced rotation matrix $R_r^T$ involved in the transpose of the reduced homography $H^T$ of the present invention. Specifically, prior to trigonometric substitutions in Eq. 11 we find that in terms of the Euler angles sub-matrix C is just:

$$C = \begin{pmatrix} \theta_1 & \theta_2 \\ \theta_4 & \theta_5 \end{pmatrix} = \quad \text{(Eq. 30A)}$$

$$\begin{pmatrix} \cos\phi\cos\psi - \cos\theta\sin\phi\sin\psi & \cos\psi\sin\phi + \cos\theta\cos\phi\sin\psi \\ -\cos\theta\cos\psi\sin\phi - \cos\phi\sin\psi & \cos\theta\cos\phi\cos\psi - \sin\phi\sin\psi \end{pmatrix}.$$

Note that these entries are exactly the same as those in the upper left 2×2 block matrix of reduced rotation matrix $R_r^T$. In fact, sub-matrix C is produced by the composition of upper left 2×2 block matrices of the composition $R^T(\psi)R^T(\theta)R^T(\phi)$ that makes up our reduced rotation matrix $R_r^T$ (see Eq. 10A). Hence, sub-matrix C can also be rewritten as the composition of these 2×2 block matrices as follows:

$$C = \begin{pmatrix} \cos\psi & \sin\psi \\ -\sin\psi & \cos\psi \end{pmatrix} \begin{pmatrix} 1 & 0 \\ 0 & \cos\theta \end{pmatrix} \begin{pmatrix} \cos\phi & \sin\phi \\ -\sin\phi & \cos\phi \end{pmatrix}. \quad \text{(Eq. 30B)}$$

By applying the rule of linear algebra that the determinant of a composition is equal to the product of determinants of the component matrices we find that the determinant of sub-matrix C is:

$$\text{Det}(C) = \quad \text{(Eq. 31)}$$

$$\text{Det}\begin{pmatrix} \cos\psi & \sin\psi \\ -\sin\psi & \cos\psi \end{pmatrix} \text{Det}\begin{pmatrix} 1 & 0 \\ 0 & \cos\theta \end{pmatrix} \text{Det}\begin{pmatrix} \cos\phi & \sin\phi \\ -\sin\phi & \cos\phi \end{pmatrix} = \cos\theta$$

Clearly, the reduced rotation representation of the present invention resulting in sub-matrix C no longer obeys the rule for rotation matrices that their determinant be equal to one (see Eq. 3). The rule that the transpose be equal to the inverse is also not true for sub-matrix C (see also Eq. 3). However, the useful conclusion from this examination is that the determinant of sub-matrix C is equal to case, which is the cosine of rotation angle θ and in terms of the best estimates from computed estimation matrix Θ this is equal to:

$$\cos\theta = \hat{\theta}_1\hat{\theta}_5 - \hat{\theta}_2\hat{\theta}_4. \quad \text{(Eq. 32)}$$

Because of the ambiguity in sign and in scaling, Eq. 32 is not by itself sufficient to recover angle θ. However, we can use it as one of the equations from which some aspects of pose can be recovered. We should bear in mind as well, however, that our estimation matrix was computed under the constraint that $\|\bar{\theta}\|=1$ (see Eq. 24). Therefore, the property of Eq. 32 is not explicitly satisfied.

In turning back to FIG. 10C we see the corresponding geometric meaning of rotation angle θ and of its cosine cos θ. Specifically, angle θ is the angle between offset d, which is perpendicular to screen 304, and the optical axis OA in unknown pose. More precisely, optical axis OA in extends from viewpoint O' in the unknown pose to pointer location $(\hat{x}_s, \hat{y}_s)$ that we have recovered in the previous section.

Now, rotation angle θ is seen to be the cone angle of a cone 314. Geometrically, cone 314 represents the set of all possible unknown poses in which a vector from viewpoint O' goes to pointer location $(x_s, y_s)$ on screen 304. Because of the condition imposed by offset distance d, only vectors on cone 314 that start on a section parallel to screen 304 at offset d are possible solutions. That section is represented by circle 316. Thus, viewpoint O' at any location on circle 316 can produce line OA that goes from viewpoint O' in unknown pose to pointer 312 on screen 304. The cosine cos θ of rotation angle θ is related to the radius of circle 316. Specifically, the radius of circle 316 is just d|tan θ| as indicated in FIG. 10C. Since Eq. 32 gives us an expression for cos θ, and $\tan^2\theta = (1-\cos^2\theta)/\cos^2\theta$, we can recover cone 314, circle 316 and angle θ up to sign. This information can be sufficient in some practical applications.

To recover rotation angles $\phi, \theta, \psi$ we need to revert back to the mathematics. Specifically, we need to finish our analysis of sub-matrix C we review its form after the trigonometric substitutions using sums and differences of rotation angles $\phi$ and $\psi$ (see Eq. 11). In this form we see that sub-matrix C represents an improper rotation and a reflection as follows:

$$C = \frac{1-\cos\theta}{2} \begin{pmatrix} \cos(\phi-\psi) & \sin(\phi-\psi) \\ \sin(\phi-\psi) & -\cos(\phi-\psi) \end{pmatrix} + \quad \text{(Eq. 33)}$$

$$\frac{1+\cos\theta}{2} \begin{pmatrix} \cos(\phi+\psi) & \sin(\phi+\psi) \\ -\sin(\phi+\psi) & \cos(\phi+\psi) \end{pmatrix}.$$

The first term in Eq. 33 represents an improper rotation (reflection along y followed by rotation) and the second term is a proper rotation.

Turning now to vector $\bar{b}$, we note that it can be derived from Eq. 12 and that it contains the two non-zero entries of reduced rotation matrix $R_r^T$ (see Eq. 10C) such that:

$$\bar{b} = -C\begin{pmatrix} \delta x/d \\ \delta y/d \end{pmatrix} + \frac{d-\delta z}{d}\begin{pmatrix} \sin\psi \\ \cos\psi \end{pmatrix}\sin\theta \quad \text{(Eq. 34)}$$

Note that under the condition that the motion of camera 104 be confined to offset distance d from screen 304, δz is zero, and hence Eq. 34 reduces to:

$$\bar{b} = -C\begin{pmatrix} \delta x/d \\ \delta y/d \end{pmatrix} + \begin{pmatrix} \sin\psi \\ \cos\psi \end{pmatrix}\sin\theta.$$

Also notice, that with no displacement at all, i.e., when δx and δy are zero, vector $\bar{b}$ further reduces to just the sine and cosine terms. With the insights gained from the analysis of sub-matrix C and vector $\bar{b}$ we continue to other equations that we can formulate to recover the rotation angles φ,θ,ψ.

We first note that the determinant $\mathrm{Det}\|\Theta\Theta^T\|$ we initially invoked in our optimization condition in the theory section can be directly computed. Specifically, we obtain for the product of the estimation matrices:

$$\Theta\Theta^T = (C \;\; \bar{b})\begin{bmatrix} C' \\ \bar{b}' \end{bmatrix} = CC' + \bar{b}\bar{b}' \quad \text{(Eq. 35)}$$

From the equation for pointer recovery (Eq. 29A), we can substitute for $\bar{b}\bar{b}'$ in terms of sub-matrix C, whose value we have already found to be cos θ from Eq. 31, and pointer position. We will call the latter just $(x_s, y_s)$ to keep the notation simple, and now we get for $\bar{b}\bar{b}'$:

$$\bar{b}\bar{b}' = (1/d)^2 C(y_s, x_s)(x_s, y_s)C'. \quad \text{(Eq. 36)}$$

Now we write $\Theta\Theta^T$ just in terms of quantities we know, by substituting $\bar{b}\bar{b}'$ from Eq. 36 into Eq. 35 and combining terms as follows:

$$\Theta\Theta^T = C\begin{bmatrix} 1 + (x_s/d)^2 & (x_s/d)(y_s/d) \\ (y_s/d)(x_s/d) & 1 + (y_s/d)^2 \end{bmatrix}C'. \quad \text{(Eq. 37)}$$

We now compute the determinant of Eq. 37 (substituting cos θ for the determinant of C) to yield:

$$\mathrm{Det}\|\Theta\Theta^T\| = \cos^2\theta\left(1 + \frac{x_s^2 + y_s^2}{d^2}\right). \quad \text{(Eq. 38)}$$

We should bear in mind, however, that our estimation matrix was computed under the constraint that $\|\bar{\Theta}\|=1$ (see Eq. 24). Therefore, the property of Eq. 38 is not explicitly satisfied.

There are several other useful combinations of estimation parameters $\theta_i$ that will be helpful in recovering the rotation angles. All of these can be computed directly from equations presented above with the use of trigonometric identities. We will now list them as properties for later use:

$$\theta_1\theta_2 + \theta_4\theta_5 = \sin^2\theta\sin\phi\cos\phi \quad \text{(Prop. I)}$$

$$\theta_1\theta_4 + \theta_2\theta_5 = -\sin^2\theta\sin\psi\cos\psi \quad \text{(Prop. II)}$$

$$\theta_1^2 + \theta_4^2 = \cos^2\phi + \sin^2\phi\cos^2\theta \quad \text{(Prop. III)}$$

$$\theta_2^2 + \theta_5^2 = \sin^2\phi + \cos^2\phi\cos^2\theta \quad \text{(Prop. IV)}$$

-continued $$\theta_1^2 + \theta_2^2 + \theta_4^2 + \theta_5^2 = 1 + \cos^2\theta \quad \text{(Prop. V)}$$

$$\frac{\theta_2 - \theta_4}{\theta_1 + \theta_5} = \tan(\phi + \psi) \quad \text{(Prop. VI)}$$

We also define a parameter ρ as follows:

$$\rho = \frac{\theta_1^2 + \theta_2^2 + \theta_4^2 + \theta_5^2}{\mathrm{Det}\|C\|}. \quad \text{(Prop. VII)}$$

The above equations and properties allow us to finally recover all pose parameters of camera 104 as follows:

Sum of rotation angles φ and ψ (sometimes referred to as yaw and roll) is obtained directly from Prop. VI and is invariant to the scale of Θ and valid for 1+cos θ>0:

$$\widehat{(\phi+\psi)} = a\tan 2\left(\frac{\hat{\theta}_2 - \hat{\theta}_4}{\hat{\theta}_1 + \hat{\theta}_5}\right)$$

The cosine of θ, cos θ, is recovered using Prop. VII:

$$\widehat{\cos\theta} = \rho/2 - \sqrt{(\rho/2)^2 - 1},$$

where the non-physical solution is discarded. Notice that this quantity is also scale-invariant.

The scale factor κ is recovered from Prop. V as:

$$\kappa^2 = \frac{1 + (\widehat{\cos\theta})^2}{\hat{\theta}_1^2 + \hat{\theta}_2^2 + \hat{\theta}_4^2 + \hat{\theta}_5^2}$$

Finally, rotation angles φ and ψ are recovered from Prop. I and Prop. II, with the additional use of trigonometric double-angle formulas:

$$\widehat{\sin 2\phi} = \frac{2(\hat{\theta}_1\hat{\theta}_2 + \hat{\theta}_4\hat{\theta}_5)\hat{\kappa}^2}{1 - (\widehat{\cos\theta})^2}$$

$$\widehat{\sin 2\psi} = \frac{2(\hat{\theta}_1\hat{\theta}_4 + \hat{\theta}_2\hat{\theta}_5)\hat{\kappa}^2}{1 - (\widehat{\cos\theta})^2}$$

We have thus recovered all the pose parameters of camera 104 despite the deployment of reduced homography H.

Preferred Photo Sensor for Radial Structural Uncertainty

The reduced homography H according to the invention can be practiced with optical apparatus that uses various optical sensors. However, the particulars of the approach make the use of some types of optical sensors preferred. Specifically, when structural uncertainty is substantially radial, such as structural uncertainty 140 discussed in the above example embodiment, it is convenient to deploy as optical sensor 130 a device that is capable of collecting azimuthal information a about measured image points $\hat{p}_i = (\hat{x}_i, \hat{y}_i)$.

FIG. 11 is a plan view of a preferred optical sensor 130' embodied by a circular or azimuthal position sensing detector (PSD) when structural uncertainty 140 is radial. It should be noted that sensor 130' can be used either in item 102, i.e., in the smart phone, or any other item whether manipulated or worn by the human user or mounted on-board any device, mechanism or robot. Sensor 130' is parameterized by sensor coordinates $(X_s,Y_s)$ that are centered at camera center CC and oriented as shown.

For clarity, the same pattern of measured image points $\hat{p}_i$ as in FIG. 9A are shown projected from space point $P_i$ in unknown pose of camera 104 onto PSD 130' at time $t=t_1$. Ideal point $p_i'$ whose ray $r_i'$ our optimization should converge to is again shown as an open circle rather than a cross (crosses are used to show measured data). The ground truth represented by ideal point $p_i=(r_i,a_i)$, which is the location of space point $P_i$ in canonical pose at time $t=t_o$, is shown with parameterization according to the operating principles of PSD 130', rather than the Cartesian convention used by sensor 130.

PSD 130' records measured data directly in polar coordinates. In these coordinates r corresponds to the radius away from camera center CC and a corresponds to an azimuthal angle (sometimes called the polar angle) measured from sensor axis $Y_s$ in the counter-clockwise direction. The polar parameterization is also shown explicitly for a measured point $\hat{p}=(\hat{a},\hat{r})$ so that the reader can appreciate that to convert between the Cartesian convention and polar convention of PSD 130' we use the fact that $x=-r\sin a$ and $y=r\cos a$.

The actual readout of signals corresponding to measured points $\hat{p}$ is performed with the aid of anodes 320A, 320B. Furthermore, signals in regions 322 and 324 do not fall on the active portion of PSD 130' and are thus not recorded. A person skilled in the art will appreciate that the readout conventions will differ between PSDs and are thus referred to the documentation for any particular PSD type and design.

The fact that measured image points $\hat{p}_i=(\hat{x}_i,\hat{y}_i)$ are reported by PSD 130' already in polar coordinates as $\hat{p}_i=(rc,\hat{a}_i)$ is very advantageous. Recall that in the process of deriving estimation matrix $\Theta$ we introduced the mathematical convenience that $\hat{x}_i^2+\hat{y}_i^2=1$ for all measured points $\hat{p}$. In polar coordinates, this condition is ensured by setting the radial information r for any measured point $\hat{p}$ equal to one. In fact, we can set radiation information r to any constant rc. From FIG. 11, we see that constant rc simply corresponds to the radius of a circle UC. In our specific case, it is best to chose circle UC to be the unit circle introduced above, thus effectively setting rc=1 and providing for the mathematical convenience we use in deriving our reduced homography H.

Since radial information r is not actually used, we are free to further narrow the type of PSD 130' from one providing both azimuthal and radial information to just a one-dimensional PSD that provides only azimuthal information a. A suitable azimuthal sensor is available from Hamamatsu Photonics K.K., Solid State Division under model S8158. For additional useful teachings regarding the use of PSDs the reader is referred to U.S. Pat. No. 7,729,515 to Mandella et al.

Reduced Homography: Detailed Application Examples and Solutions in Cases of Linear Structural Uncertainty Reduced homography H can also be applied when the structural uncertainty is linear, rather than radial. To understand how to apply reduced homography H and what condition on motion is consonant with the reduced representation in cases of linear structural uncertainty we turn to FIG. 12A. FIG. 12A is a perspective view of an environment 400 in which an optical apparatus 402 with viewpoint O is installed on-board a robot 404 at a fixed height. While mounted at this height, optical apparatus 402 can move along with robot 404 and execute all possible rotations as long as it stays at the fixed height.

Environment 400 is a real, three-dimensional indoor space enclosed by walls 406, a floor 408 and a ceiling 410. World coordinates $(X_w,Y_w,Z_w)$ that parameterize environment 400 are right handed and their $Y_w$-$Z_w$ plane is coplanar with ceiling 410. At the time shown in FIG. 12A, camera coordinates $(X_c,Y_c,Z_c)$ of optical apparatus 402 are aligned with world coordinates $(X_w,Y_w,Z_w)$ (full rotation matrix R is the 3×3 identity matrix I). Additionally, camera $X_c$-axis is aligned with world $X_w$-axis, as shown. The reader will recognize that this situation depicts the canonical pose of optical apparatus 402 in environment 400.

Environment 400 offers a number of space points $P_{30}$ through $P_{34}$ representing optical features of objects that are not shown. As in the above embodiments, optical apparatus 402 images space points $P_{30}$ through $P_{34}$ onto its photo sensor 412 (see FIG. 12C). Space points $P_{30}$ through $P_{34}$ can be active or passive. In any event, they provide electromagnetic radiation 126 that is detectable by optical apparatus 402.

Robot 404 has wheels 414 on which it moves along some trajectory 416 on floor 408. Due to this condition on robot 404, the motion of optical apparatus 402 is mechanically constrained to a constant offset distance $d_x$ from ceiling 410. In other words, in the present embodiment the condition on the motion of optical apparatus 402 is enforced by the very mechanism on which the latter is mounted, i.e., robot 404. Of course, the actual gap between floor 408 and ceiling 410 may not be the same everywhere in environment 400. As we have learned above, as long as this gap does not vary more than by a small deviation $\epsilon$, the use of reduced homography H in accordance with the invention will yield good results.

In this embodiment, structural uncertainty is introduced by on-board optical apparatus 402 and it is substantially linear. To see this, we turn to the three-dimensional perspective view of FIG. 12B. In this drawing robot 404 has progressed along its trajectory 416 and is no longer in the canonical pose. Thus, optical apparatus 402 receives electromagnetic radiation 126 from all five space points $P_{30}$ through $P_{34}$ in its unknown pose.

An enlarged view of the pattern as seen by optical apparatus 402 under its linear structural uncertainty condition is shown in projective plane 146. Due to the structural uncertainty, optical apparatus 402 only knows that radiation 126 from space points $P_{30}$ through $P_{34}$ could come from any place in correspondent virtual sheets $VSP_{30}$ through $VSP_{34}$ that contain space points $P_{30}$ through $P_{34}$ and intersect at viewpoint O. Virtual sheets $VSP_{30}$ through $VSP_{34}$ intersect projective plane 146 along vertical lines 140'. Lines 140' represent the vertical linear uncertainty.

It is crucial to note that virtual sheets $VSP_{30}$ through $VSP_{34}$ are useful for visualization purposes only to explain what optical apparatus 402 is capable of seeing. No correspondent real entities exist in environment 400. It is optical apparatus 402 itself that introduces structural uncertainty 140' that is visualized here with the aid of virtual sheets $VSP_{30}$ through $VSP_{34}$ intersecting with projective plane 146—no corresponding uncertainty exist in environment 400.

Now, as seen by looking at radiation 126 from point $P_{33}$ in particular, structural uncertainty 140' causes the information as to where radiation 126 originates from within virtual sheet $SP_{33}$ to be lost to optical apparatus 402. As shown by arrow $DP_{33}$, the information loss is such that space point $P_{33}$ could move within sheet $VSP_{33}$ without registering any difference by optical apparatus 402.

FIG. 12C provides a more detailed diagram of linear structural uncertainty 140' associated with space points $P_{30}$ and $P_{33}$ as recorded by optical apparatus 402 on its optical sensor 412. FIG. 12C also shows a lens 418 that defines viewpoint O of optical apparatus 402. As in the previous embodiment, viewpoint O is at the origin of camera coordinates $(X_c, Y_c, Z_c)$ and the $Z_n$-axis is aligned with optical axis OA. Optical sensor 412 resides in the image plane defined by lens 418.

Optical apparatus 402 is kept in the unknown pose illustrated in FIG. 12B long enough to collect a number of measured points $\hat{p}_{30}$ as well as $\hat{p}_{33}$. Ideal points $p_{30}'$ and $p_{33}'$ that should be produced by space points $P_{30}$ and $P_{33}$ if there were no structural uncertainty are now shown in projective plane 146. Unfortunately, structural uncertainty 140' is there, as indicated by the vertical, dashed regions on optical sensor 412. Due to normal noise, structural uncertainty 140' does not exactly correspond to the lines we used to represent it with in the more general FIG. 12B. That is why we refer to linear uncertainty 140' as substantially linear, similarly as in the case of substantially radial uncertainty 140 discussed in the previous embodiment.

The sources of linear structural uncertainty 140' in optical apparatus 402 can be intentional or unintended. As in the case of radial structural uncertainty 140, linear structural uncertainty 140' can be due to intended and unintended design and operating parameters of optical apparatus 402. For example, poor design quality, low tolerances and in particular unknown decentering or tilting of lens elements can produce linear uncertainty. These issues can arise during manufacturing and/or during assembly. They can affect a specific optical apparatus 402 or an entire batch of them. In the latter case, if additional post-assembly calibration is not possible, the assumption of linear structural uncertainty for all members of the batch and application of reduced homography H can be a useful way of dealing with the poor manufacturing and/or assembly issues. Additional causes of structural uncertainty are discussed above in association with the embodiment exhibiting radial structural uncertainty.

FIG. 12C explicitly calls out the first two measured points $\hat{p}_{30,1}$ and $\hat{p}_{30,2}$ produced by space point $P_{30}$ and a measured point $\hat{p}_{33,j}$ (the j-th measurement of point $\hat{p}_{30}$) produced by space point $P_{33}$. As in the previous embodiment, any number of measured points can be collected for each available space point $P_i$. Note that in this embodiment the correspondence between space points $P_i$ and their measured points $\hat{p}_{i,j}$ is also known.

In accordance with the reduced homography H of the invention, measured points $\hat{p}_{i,j}$ are converted into their corresponding n-vectors $\hat{n}_{i,j}$. This is shown explicitly in FIG. 12C for measured points $\hat{p}_{30,1}, \hat{p}_{30,2}$ and $\hat{p}_{33,j}$ with correspondent n-vectors $\hat{n}_{30,1}, \hat{n}_{30,2}$ and $\hat{n}_{33,j}$. Recall that n-vectors $\hat{n}_{30,1}, \hat{n}_{30,2}$ and $\hat{n}_{33,j}$ are normalized for the aforementioned reasons of computational convenience to the unit circle UC. However, note that in this embodiment unit circle UC is horizontal for reasons that will become apparent below and from Eq. 40.

As in the previous embodiment, we know from Eq. 6 (restated below for convenience) that a motion of optical apparatus 402 defined by a succession of sets $\{R, \bar{h}\}$ relative to a planar surface defined by a p-vector $\bar{p} = \hat{n}_p/d$ induces the collineation or homography A expressed as:

$$A = \frac{1}{k}(I - \bar{p}\cdot\bar{h}^T)R \text{ with } k = \sqrt[3]{1 - (\bar{p}\cdot\bar{h})}, \quad \text{(Eq. 6)}$$

where I is the 3×3 identity matrix and $\bar{h}^T$ is the transpose (i.e., row vector) of $\bar{h}$.

In the present embodiment, the planar surface is ceiling 410. In normalized homogeneous coordinates ceiling 410 is expressed by its corresponding p-vector $\bar{p}$, where $\hat{n}_p$ is the unit surface normal to ceiling 410 and pointing away from viewpoint O, and $d_x$ is the offset. Hence, p-vector is equal to $\bar{p} = \hat{n}_p/d_x$ as indicated in FIG. 12C. The specific value of the p-vector in the present embodiment is $$\bar{p} = \left(\frac{1}{d_x}\right)(1, 0, 0).$$

Therefore, for motion and rotation of optical apparatus 402 with the motion constraint of fixed offset $d_x$ from ceiling 410 homography A is:

$$A = \left(\frac{1}{k}\right)\begin{pmatrix} 1 - \frac{\delta x}{d} & -\frac{\delta y}{d} & -\frac{\delta z}{d} \\ 0 & 1 & 0 \\ 0 & 0 & 1 \end{pmatrix}R. \quad \text{(Eq. 39)}$$

Structural uncertainty 140' can now be modeled in a similar manner as before (see Eq. 4), by ideal rays r', which are vertical lines visualized in projective plane 146. FIG. 12C explicitly shows ideal rays $r_{30}'$ and $r_{33}'$ to indicate our reduced representation for ideal points $p_{30}'$ and $p_{33}'$. The rays corresponding to the actual measured points $\hat{p}_{30,1}, \hat{p}_{30,2}$ and $\hat{p}_{33,j}$ are not shown explicitly here for reasons of clarity. However, the reader will understand that they are generally parallel to their correspondent ideal rays.

In solving the reduced homography H we will be again working with the correspondent translations of ideal rays r' into ideal vectors $\bar{n}'$. The latter are the homogeneous representations of rays r' as should be seen in the unknown pose. An ideal vector $\bar{n}'$ is expressed as:

$$\bar{n}' = \pm N(\hat{o} \times \bar{m}') = \pm N((1, 0, 0)^T \times \bar{m}') = \quad \text{(Eq. 40)}$$

$$K\begin{pmatrix} 0 & 0 & 0 \\ 0 & 0 & -1 \\ 0 & 1 & 0 \end{pmatrix} \cdot \begin{pmatrix} m_1' \\ m_2' \\ m_3' \end{pmatrix} = \begin{pmatrix} 0 \\ -m_3' \\ m_2' \end{pmatrix}.$$

Note that unlike our previous radial embodiment from Eq. 5 where unit vector $\hat{o}$ was $(0,0,1)^T$, here unit vector $\hat{o}$ is instead equal to $(1,0,0)^T$, and analogously to the radial case, the value of any x-component of normalized n-vector $\bar{m}_i'$ is discarded and drops out from the calculations involving the n-vector $\bar{n}_i'$. The reader is invited to check Eq. 5 and the previous embodiment to see the similarity in the reduced representation arising from this cross product with the one obtained in the case of radial structural uncertainty.

Once again, we now have to obtain a modified or reduced rotation matrix $R_r$ appropriate for the vertical linear case. Our condition on motion is in offset $d_x$ along x, so we should choose an Euler matrix composition than is consonant with the reduced homography H for this case. The composition will be different than in the radial case, where the condition on motion that was consonant with the reduced homography H involved an offset d along z (or $d_z$).

From component rotation matrices of Eq. 2A-C we choose Euler rotations in the X-Y-X convention (instead of Z-X-Z convention used in the radial case). The composition is thus a "roll" by rotation angle $\psi$ around the $X_c$-axis, then a "tilt" by rotation angle $\theta$ about the $Y_c$-axis and finally a "yaw" by rotation angle $\phi$ around the $X_c$-axis again. This composition involves Euler rotation matrices:

$$R(\psi) = \begin{pmatrix} 1 & 0 & 0 \\ 0 & \cos\psi & -\sin\psi \\ 0 & \sin\psi & \cos\psi \end{pmatrix},$$

$$R(\theta) = \begin{pmatrix} \cos\theta & 0 & \sin\theta \\ 0 & 1 & 0 \\ -\sin\theta & 0 & \cos\theta \end{pmatrix},$$

$$R(\phi) = \begin{pmatrix} 1 & 0 & 0 \\ 0 & \cos\phi & -\sin\phi \\ 0 & \sin\phi & \cos\phi \end{pmatrix}.$$

Since we need the transpose $R^T$ of the total rotation matrix R, the corresponding composition is taken transposed and in reverse order to yield:

$$R^T = \begin{pmatrix} 1 & 0 & 0 \\ 0 & \cos\psi & \sin\psi \\ 0 & -\sin\psi & \cos\psi \end{pmatrix} \begin{pmatrix} \cos\theta & 0 & -\sin\theta \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix}. \quad \text{(Eq. 40A)}$$

Now, we modify or reduce the order of transpose $R^T$ because the x component of $\overline{m}'$ does not matter in the case of our vertical linear uncertainty 140' (see Eq. 40). Thus we obtain:

$$R_r^T = \begin{pmatrix} 0 & 0 & 0 \\ 0 & \cos\psi & \sin\psi \\ 0 & -\sin\psi & \cos\psi \end{pmatrix} \begin{pmatrix} 0 & 0 & 0 \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix}, \quad \text{(Eq. 40B)}$$

and by multiplying we finally get transposed reduced rotation matrix $R_r^T$:

$$R_r^T = \begin{pmatrix} \sin\theta\sin\psi & \cos\phi\cos\psi - \cos\theta\sin\phi\sin\psi & \cos\psi\sin\phi + \cos\theta\cos\phi\sin\psi \\ \cos\psi\sin\theta & -\cos\theta\cos\psi\sin\phi - \cos\phi\sin\psi & \cos\theta\cos\phi\cos\psi - \sin\phi\sin\psi \end{pmatrix}. \quad \text{(Eq. 40C)}$$

We notice that $R_r^T$ in the case of vertical linear uncertainty 140' is very similar to the one we obtained for radial uncertainty 140. Once again, it consist of sub-matrix C and vector $\overline{b}$. However, these are now found in reverse order, namely:

$$R_r^T = \begin{pmatrix} \sin\theta\sin\psi \\ \sin\theta\cos\psi \end{pmatrix} C \bigg). \quad \text{(Eq. 40D)}$$

Now we again deploy Eq. 9 for homography A representing the collineation from canonical pose to unknown pose, in which we represent points $p_i'$ with n-vectors $\overline{m}_i'$ and use scaling constant $\kappa$ to obtain with our reduced homography H:

$$\overline{m}_i' = \kappa H^T \overline{m}_i = \kappa R_r^T \begin{pmatrix} 1 - \frac{\delta x}{d} & 0 & 0 \\ \frac{-\delta y}{d} & 1 & 0 \\ \frac{-\delta z}{d} & 0 & 1 \end{pmatrix} \overline{m}_i = \quad \text{(Eq. 41)}$$

$$\kappa \begin{pmatrix} \sin\theta\sin\psi \\ \sin\theta\cos\psi \end{pmatrix} C \bigg) \begin{pmatrix} 1 - \frac{\delta x}{d} & 0 & 0 \\ \frac{-\delta y}{d} & 1 & 0 \\ \frac{-\delta z}{d} & 0 & 1 \end{pmatrix} \overline{m}_i.$$

In this case vector $\overline{b}$ is (compare with Eq. 34):

$$\overline{b} = \frac{d - \delta x}{d} \begin{pmatrix} \sin\psi \\ \cos\psi \end{pmatrix} \sin\theta - C \begin{pmatrix} \delta y/d \\ \delta z/d \end{pmatrix}. \quad \text{(Eq. 42)}$$

By following the procedure already outlined in the previous embodiment, we now convert the problem of finding the transpose of our reduced homography $H^T$ to the problem of finding the best estimation matrix $\Theta$ based on actually measured points $\hat{p}_{i,j}$. That procedure can once again be performed as taught in the above section entitled: *Reduced Homography: A General Solution*.

Anchor Point Recovery

Rather than pointer recovery, as in the radial case, the present embodiment allows for the recovery of an anchor point that is typically not in the field of view of optical apparatus 402. This is illustrated in a practical setting with the aid of the perspective diagram view of FIG. 13

FIG. 13 shows a clinical environment 500 where optical apparatus 402 is deployed. Rather than being mounted on robot 404, optical apparatus 402 is now mounted on the head of a subject 502 with the aid of a headband 504. Subject 502 is positioned on a bed 506 designed to place him or her into the right position prior to placement in a medical apparatus 508 for performing a medical procedure. Medical procedure requires that the head of subject 502 be positioned flat and straight on bed 506. It is this requirement that can be ascertained with the aid of optical apparatus 402 and the recovery of its anchor point 514 using the reduced homography H according to the invention.

To accomplish the task, optical apparatus 402 is mounted such that its camera coordinates $(X_c, Y_c, Z_c)$ are aligned as shown in FIG. 13, with $X_c$-axis pointing straight at a wall 512 behind medical apparatus 508. World coordinates $(X_w, Y_w, Z_w)$ are defined such that their $Y_w$-$Z_w$ plane is coplanar with wall 512 and their $X_w$-axis points into wall 512. In the canonical pose, camera coordinate axis $X_c$ is aligned with world $X_w$-axis, just as in the canonical pose described above when optical apparatus 402 is mounted on robot 404.

Canonical pose of optical apparatus 402 mounted on headband 504 is thus conveniently set to when the head of subject 502 is correctly positioned on bed 506. In this situation, an anchor axis AA, which is co-extensive with $X_c$-axis, intersects wall 512 at the origin of world coordinates ($X_w, Y_w, Z_w$). However, when optical apparatus 402 is not in canonical pose, anchor axis AA intersects wall 512 (or, equivalently, the $Y_w$-$Z_w$ plane) at some other point. This point of intersection of anchor axis AA and wall 512 is referred to as anchor point 514. In a practical application, it may be additionally useful to emit a beam of radiation, e.g., a laser beam from a laser pointer, that propagates from optical apparatus 402 along its $X_c$-axis to be able to visually inspect the instantaneous location of anchor point 514 on wall 512.

Now, the reduced homography H of the invention permits the operator of medical apparatus 508 to recover the instantaneous position of anchor point 514 on wall 512. The operator can thus determine when the head of subject 502 is properly positioned on bed 506 without the need for mounting any additional optical devices such as laser pointers or levels on the head of subject 502.

During operation, optical apparatus 402 inspects known space points $P_i$ in its field of view and deploys the reduced homography H to recover anchor point 514, in a manner analogous to that deployed in the case of radial structural uncertainty for recovering the location of pointer 312 on display screen 304 (see FIGS. 10A-C and corresponding description). In particular, with the vertical structural uncertainty 140' the equation for recovery of anchor point 514 becomes:

$$\begin{pmatrix} 0 \\ 0 \end{pmatrix} = \Theta \begin{pmatrix} d \\ y_s \\ z_s \end{pmatrix} = d\bar{b} + C \begin{pmatrix} y_s \\ z_s \end{pmatrix} \quad \text{(Eq. 43)}$$

Note that Eq. 43 is very similar to Eq. 28 for pointer recovery, but in the present case $\Theta = (\bar{b}\ C)$. We solve this linear equation in the same manner as taught above to obtain the recovered position of anchor point 514 on wall 512 as follows:

$$\begin{pmatrix} y_s \\ z_s \end{pmatrix} = -dC^{-1}\bar{b} \quad \text{(Eq. 44A)}$$

Then, to get the actual numerical answer, we substitute for the entries of matrix C and vector $\bar{b}$ the estimation values obtained during the optimization procedure. We denote this in the final numerical result by marking estimation values taken from the eigenvector $\bar{\theta}^*$ with "hats" (i.e., $\bar{\theta}^* = (\hat{\theta}_1, \hat{\theta}_2, \hat{\theta}_3, \hat{\theta}_4, \hat{\theta}_5, \hat{\theta}_6)$ and write:

$$\begin{pmatrix} \hat{y}_s \\ \hat{z}_s \end{pmatrix} = -d \begin{pmatrix} \hat{\theta}_2 & \hat{\theta}_3 \\ \hat{\theta}_5 & \hat{\theta}_6 \end{pmatrix}^{-1} \begin{pmatrix} \hat{\theta}_1 \\ \hat{\theta}_4 \end{pmatrix}. \quad \text{(Eq. 44B)}$$

Notice that this equation is similar, but not identical to Eq. 29B. The indices are numbered differently because in this case $\Theta = (\bar{b}\ C)$ Persons skilled in the art will recognize that this is a very desirable manner of recovering anchor point 514, because it can be implemented without having to perform any extraneous computations such as determining scale factor κ.

Of course, in order for reduced homography H to yield accurate results the condition on the motion of optical apparatus 402 has to be enforced. This means that offset distance $d_x$ should not vary by a large amount, i.e., $\epsilon \approx 0$. This can be ensured by positioning subject 502 on bed 506 with their head such that viewpoint O of optical apparatus 402 is maintained more or less (i.e., within $\epsilon \approx 0$) at offset distance $d_x$ from wall 512. Of course, the actual criterion for good performance of homography H is that $d_x - \epsilon/d_x = 1$. Therefore, if offset distance $d_x$ is large, a larger deviation E is permitted.

Recovery of Pose Parameters and Rotation Angles

The recovery of the remaining pose parameters and the rotation angles φ,θ,ψ in particular, whether in the case where optical apparatus 402 is mounted on robot 404 or on head of subject 502 follows the same approach as already shown above for the case of radial structural uncertainty. Rather than solving for these angles αgain, we remark on the symmetry between the present linear case and the previous radial case. In particular, to transform the problem from the present linear case to the radial case, we need to perform a 90° rotation around y and a 90° rotation around z. From previously provided Eqs. 2A-C we see that transformation matrix T that accomplishes that is:

$$T = \begin{pmatrix} 0 & 1 & 0 \\ 0 & 0 & 1 \\ 1 & 0 & 0 \end{pmatrix}. \quad \text{(Eq. 45)}$$

The inverse of transformation matrix T, i.e., $T^{-1}$, will take us from the radial case to the vertical case. In other words, the results for the radial case can be applied to the vertical case after the substitutions x→y, y→z and z→x (Euler Z-X-Z rotations becoming X-Y-X rotations).

Preferred Photo Sensor and Lens for Linear Structural Uncertainty

The reduced homography H in the presence of linear structural uncertainty such as the vertical uncertainty just discussed, can be practiced with any optical apparatus that is subject to this type of uncertainty. However, the particulars of the approach make the use of some types of optical sensors and lenses preferred.

To appreciate the reasons for the specific choices, we first refer to FIG. 14A. It presents a three-dimensional view of optical sensor 412 and lens 418 of optical apparatus 402 deployed in environments 400 and 500, as described above. Optical sensor 412 is shown here with a number of its pixels 420 drawn in explicitly. Vertical structural uncertainty 140' associated with space point $P_{33}$ is shown superposed on sensor 412. Examples of cases that produce this kind of linear structural uncertainty may include: case 1) When it is known that the optical system comprises lens 418 that intermittently becomes decentered in the vertical direction as shown by lens displacement arrow LD in FIG. 14A during optical measurement process; and case 2) When it is known that there are very large errors in the vertical placement (or tilt) of lens 418 due to manufacturing tolerances.

As already pointed out above, the presence of structural uncertainty 140' is equivalent to space point $P_{33}$ being anywhere within virtual sheet $VSP_{33}$. Three possible locations of point $P_{33}$ within virtual sheet $VSP_{33}$ are shown, including its actual location drawn in solid line. Based on how lens 418 images, we see that the different locations within virtual sheet all map to points along a single vertical line that falls within vertical structural uncertainty 140'. Thus, all the possible positions of space point $P_{33}$ within virtual sheet $VSP_{33}$ map to a single vertical row of pixels 420 on optical sensor 412, as shown.

This realization can be used to make a more advantageous choice of optical sensor 412 and lens 418. FIG. 14B is a three-dimensional view of such preferred optical sensor 412' and preferred lens 418'. In particular, lens 418' is a cylindrical lens of the type that focuses radiation that originates anywhere within virtual sheet $VSP_{33}$ to a single vertical line. This allows us to replace the entire row of pixels 420 that corresponds to structural uncertainty 140' with a single long aspect ratio pixel 420' to which lens 418' images light within virtual sheet $VSP_{33}$. The same can be done for all remaining vertical structural uncertainties 140' thus reducing the number of pixels 420 required to a single row. Optical sensor 412' indeed only has the one row of pixels 420 that is required. Frequently, optical sensor 412' with a single linear row or column of pixels is referred to in the art as a line camera or linear photo sensor. Of course, it is also possible to use a 1-D linear position sensing device (PSD) as optical sensor 412'. In fact, this choice of a 1-D PSD, whose operating parameters are well understood by those skilled in the art, will be the preferred linear photo sensor in many situations.

Reduced Homography: Extensions and Additional Applications

In reviewing the above teachings, it will be clear to anyone skilled in the art, that the reduced homography H of the invention can be applied when structural uncertainty corresponds to horizontal lines. This situation is illustrated in FIG. 15 for optical apparatus 402 operating in environment 400. The same references are used as in FIG. 12C in order to more easily discern the similarity between this case and the case where the structural uncertainty corresponds to vertical lines.

In the case of horizontal structural uncertainty 140'', the consonant condition on motion of optical apparatus 402 is preservation of its offset distance $d_y$ from side wall 406, rather than from ceiling 410. Note that in this case measured points $\hat{p}_{i,j}$ are again converted into their corresponding n-vectors $\hat{n}_{i,j}$. This is shown explicitly in FIG. 15 for measured points $\hat{p}_{i,1}$, $\hat{p}_{i,2}$ and $\hat{p}_{i+1,j}$ with correspondent n-vectors $\hat{n}_{i,1}$, $\hat{n}_{i,2}$ and $\hat{n}_{i+1,j}$. Recall that n-vectors $\hat{n}_{i,1}$, $\hat{n}_{i,2}$ and $\hat{n}_{i+1,j}$ are normalized to the unit circle UC. Also note that in this embodiment unit circle UC is vertical rather than horizontal.

Recovery of anchor point, pose parameters and rotation angles is similar to the situation described above for the case of vertical structural uncertainty. A skilled artisan will recognize that a simple transformation will allow them to use the above teachings to obtain all these parameters. Additionally, it will be appreciated that the use of cylindrical lenses and linear photo sensors is appropriate when dealing with horizontal structural uncertainty.

Furthermore, for structural uncertainty corresponding to skewed (i.e., rotated) lines, it is again possible to apply the previous teachings. Skewed lines can be converted by a simple rotation around the camera $Z_n$-axis into the horizontal or vertical case. The consonant condition of the motion of optical apparatus 402 is also rotated to be orthogonal to the direction of the structural uncertainty.

The reduced homography H of the invention can be further expanded to make the condition on motion of the optical apparatus less of a limitation. To accomplish this, we note that the condition on motion is itself related to at least one of the pose parameters of the optical apparatus. In the radial case, it is offset distance $d_z$ that has to be maintained at a given value. Similarly, in the linear cases it is offset distances $d_x$, $d_y$ that have to be kept substantially constant. More precisely, it is really the conditions that $(d-\delta z)/d \approx 1$; $(d-\delta x)/d \approx 1$ and $(d-\delta y)/d \approx 1$ that matter.

Clearly, in any of these cases when the value of offset distance d is very large, a substantial amount of deviation from the condition can be supported without significantly affecting the accuracy of pose recovery achieved with reduced homography H. Such conditions may obtain when practicing reduced homography H based on space points $P_i$ that are very far away and where the origin of world coordinates can thus be placed very far away as well. In situations where this is not true, other means can be deployed. More precisely, the condition can be periodically reset based on the corresponding pose parameter.

FIG. 16A is a three-dimensional diagram illustrating an indoor environment 600. An optical apparatus 602 with viewpoint O is on-board a hand-held device 604, which is once again embodied by a smart phone. Environment 600 is a confined room whose ceiling 608, and two walls 610A, 610B are partially shown. A human user 612 manipulates phone 604 by executing various movements or gestures with it.

In this embodiment non-collinear optical features chosen for practicing the reduced homography H include parts of a smart television 614 as well as a table 616 on which television 614 stands. Specifically, optical features belonging to television 614 are its two markings 618A, 618B and a designated pixel 620 belonging to its display screen 622. Two tray corners 624A, 624B of table 616 also server as optical features. Additional non-collinear optical features in room 600 are chosen as well, but are not specifically indicated in FIG. 16A.

Optical apparatus 602 experiences a radial structural uncertainty and hence deploys the reduced homography H of the invention as described in the first embodiment. The condition imposed on the motion of phone 604 is that it remain a certain distance $d_z$ away from screen 622 of television 614 for homography H to yield good pose recovery.

Now, offset distance $d_z$ is actually related to a pose parameter of optical apparatus 604. In fact, depending on the choice of world coordinates, $d_z$ may even be the pose parameter defining the distance between viewpoint O and the world origin, i.e., the z pose parameter. Having a measure of this pose parameter independent of the estimation obtained by the reduced homography H performed in accordance to the invention would clearly be very advantageous. Specifically, knowing the value of the condition represented by pose parameter $d_z$ independent of our pose recovery procedure would allow us to at least monitor how well our reduced homography H will perform given any deviations observed in the value of offset distance $d_z$.

Advantageously, optical apparatus 602 also has the well-known capability of determining distance from defocus or depth-from-defocus. This algorithmic approach to determining distance has been well-studied and is used in many practical settings. For references on the basics of applying the techniques of depth from defocus the reader is referred to Ovidu Ghita et al., "A Computational Approach for Depth from Defocus", Vision Systems Laboratory, School of Electrical Engineering, Dublin City University, 2005, pp. 1-19 and the many references cited therein.

With the aid of the depth from defocus algorithm, optical apparatus 602 periodically determines offset distance $d_z$ with an optical auxiliary measurement. In case world coordinates are defined to be in the center of screen 622, the auxiliary optical measurement determines the distance to screen 622 based on the blurring of an image 640 displayed on screen 622. Of course, the distance estimate will be along optical axis OA of optical apparatus 602. Due to rotations this distance will not correspond exactly to offset distance d, but it will nonetheless yield a good measurement, since user 612 will generally point at screen 622 most of the time. Also, due to the intrinsic imprecision in depth from defocus measurements, the expected accuracy of distance d, obtained in this manner will be within at least a few percent or more.

Alternatively, optical auxiliary measurement implemented by depth from defocus can be applied to measure the distance to wall 610A if the distance between wall 610A and screen 622 is known. This auxiliary measurement is especially useful when optical apparatus 602 is not pointing at screen 622. Furthermore, when wall 610A exhibits a high degree of texture the auxiliary measurement will be fairly accurate.

The offset distance $d_z$ found through the auxiliary optical measurement performed by optical apparatus 602 and the corresponding algorithm can be used for resetting the value of offset $d_z$ used in the reduced homography H. In fact, when offset distance $d_z$ is reset accurately and frequently reduced homography H can even be practiced in lieu of regular homography A at all times. Thus, structural uncertainty is no impediment to pose recovery at any reasonable offset $d_z$.

Still another auxiliary optical measurement that can be used to measure $d_z$ involves optical range finding. Suitable devices that perform this function are widely implemented in cameras and are well known to those skilled in the art. Some particularly notable methods include projection of IR light into the environment in both unstructured and structured form.

FIG. 16B illustrates the application of pose parameters recovered with reduced homography H to allow user 612 to manipulate image 640 on display screen 622 of smart television 614. The manipulation is performed with corresponding movements of smart phone 604. Specifically, FIG. 16B is a diagram that shows the transformation performed on image 640 from the canonical view (as shown in FIG. 16A) as a result of just the rotations that user 612 performs with phone 604. The rotations are derived from the corresponding homographies computed in accordance with the invention.

A first movement M1 of phone 604 that includes yaw and tilt, produces image 640A. The corresponding homography is designated $H_{r1}$. Another movement M2 of phone 604 that includes tilt and roll is shown in image 640B. The corresponding homography is designated $H_{r2}$. Movement M3 encoded in homography $H_{r3}$ contains only tilt and results in image 640C. Finally, movement M4 is a combination of all three rotation angles (yaw, pitch and roll) and it produces image 640D. The corresponding homography is $H_{r4}$.

It is noted that the mapping of movements M1, M2, M3 and M4 (also sometimes referred to as gestures) need not be one-to-one. In other words, the actual amount of rotation of image 640 from its canonical pose can be magnified (or demagnified). Thus, for any given degrees of rotation executed by user 612 image 640 may be rotated by a larger or smaller rotation angle. For example, for the comfort of user 612 the rotation may be magnified so that 1 degree of actual rotation of phone 604 translates to the rotation of image 640 by 3 degrees. A person skilled in the art of human interface design will be able to adjust the actual amounts of magnification for any rotation angle and/or their combinations to ensure a comfortable manipulating experience to user 612. The reader is further referred to applications and embodiments found in U.S. Patent Application 2012/0038549 to Mandella et al. These additional teachings relate to interfaces derive useful input data from the absolute pose of an item that has an on-board optical unit or camera (sometimes also referred to as an inside-out camera). The 2012/0038549 application addresses various possible mappings of one or more of the recovered pose parameters or degrees of freedom (including all six degrees of freedom) given user gestures and applications.

Figure 17A:
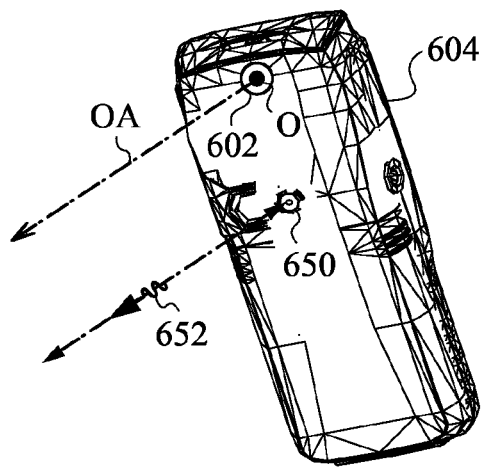

FIG. 17A-D are diagrams illustrating other auxiliary measurement apparatus that can be deployed to obtain an auxiliary measurement of the condition on the motion of the optical apparatus. FIG. 17A shows phone 604 equipped with an time-of-flight measuring unit 650 that measures the time-of-flight of radiation 652 emitted from on-board phone 604 and reflected from an environmental feature, such as the screen of smart television 614 or wall 610A. In many cases, radiation 652 used by unit 650 is coherent (e.g., in the form of a laser beam). This optical method for obtaining an auxiliary measurement of offset distance d is well understood by those skilled in the art. In fact, in some cases even optical apparatus 602, e.g., in a very high-end and highly integrated device, can have the time-of-flight capability integrated with it. Thus, the same optical apparatus 602 that is used to practice reduced homography H can also provide the auxiliary optical measurement based on time-of-flight.

Figure 17B:
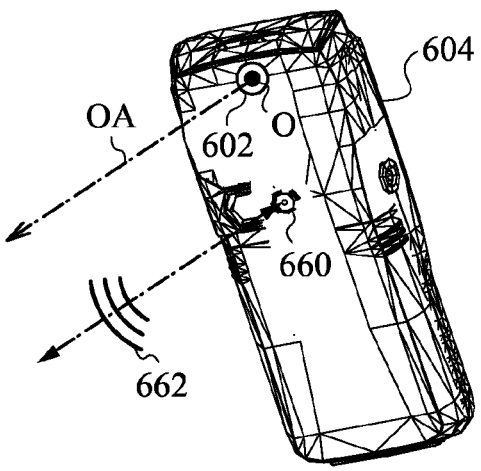

FIG. 17B illustrates phone 604 equipped with an acoustic measurement unit 660. Unit 660 emits sound waves 662 into the environment. Unit 660 measures the time these sound waves 662 take to bounce off an object and return to it. From this measurement, unit 660 can obtain an auxiliary measurement of offset distance d. Moreover, the technology of acoustic distance measurement is well understood by those skilled in the art.

Figure 17C:
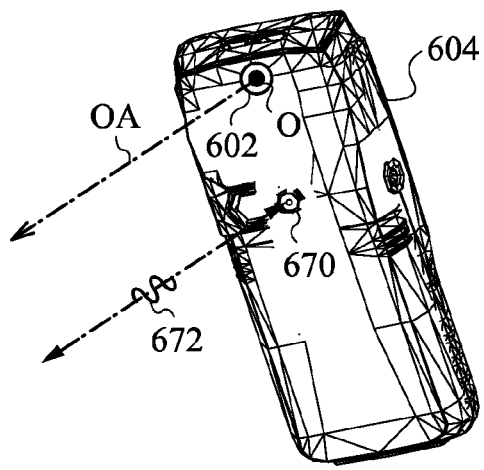

FIG. 17C illustrates phone 604 equipped with an RF measuring unit 670. Unit 670 emits RF radiation 672 into the environment. Unit 670 measures the time the RF radiation 672 takes to bounce off an object and return to it. From this measurement, unit 670 can obtain an auxiliary measurement of offset distance d. Once again, the technology of RF measurements of this type is well known to persons skilled in the art.

Figure 17D:
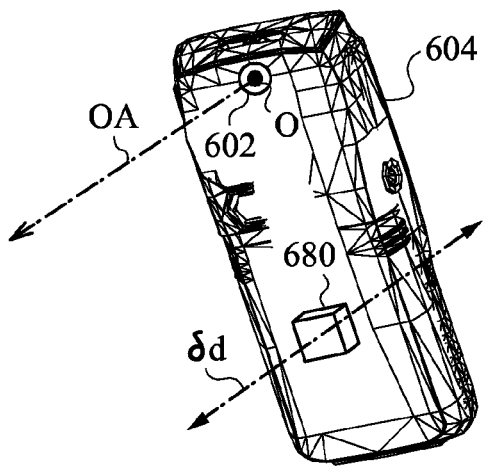

FIG. 17D illustrates phone 604 equipped with an inertial unit 680. Although inertial unit 680 can only make inertial measurements that are relative (i.e., it is not capable of measuring where it is in the environment in absolute or stable world coordinates) it can nevertheless be used for measuring changes δ in offset distance d. In order to accomplish this, it is necessary to first calibrate inertial unit 680 so that it knows where it is in the world coordinates that parameterize the environment. This can be accomplished either from an initial optical pose recovery with optical apparatus 602 or by any other convenient means. In cases where optical apparatus 602 is used to calibrate inertial unit 680, additional sensor fusion algorithms can be deployed to further improve the performance of pose recovery. Such complementary data fusion with on-board inertial unit 680 will allow for further reduction in quality or acquisition rate of optical data necessary to recover the pose of optical apparatus 602 of the item 604 (here embodied by a smart phone). For relevant teachings the reader is referred to U.S. Published Application 2012/0038549 to Mandella et al.

The additional advantage of using inertial unit 680 is that it can detect the gravity vector. Knowledge of this vector in conjunction with the knowledge of how phone 604 must be held by user 612 for optical apparatus 602 to be unobstructed can be used to further help in resolving any point correspondence problems that may be encountered in solving the reduced homography H. Of course, the use of point sources of polarized radiation as the optical features can also be used to help in solving the correspondence problem. As is clear from the prior description, suitable point sources of radiation include optical beacons that can be embodied by LEDs, IR LEDs, pixels of a display screen or other sources. In some cases, such sources can be modulated to aid in resolving the correspondence problem.

A person skilled in the art will realize that many types of sensor fusion can be beneficial in embodiments taught by the invention. In fact, even measurements of magnetic field can be used to help discover aspects of the pose of a camera and thus aid in the determination or bounding of changes in offset distance d. Appropriate environment mapping can in general be achieved with any Simultaneous Localization and Mapping (SLAM) approaches supported by any combination of active and passive sensing and correspondent devices. As already pointed out, some of these devices may use projected IR radiation that is either structured or unstructured. Some additional teachings contextualizing these approaches are addressed in U.S. Pat. No. 7,961,909 to Mandella et al., U.S. Pat. No. 7,023,536 to Zhang et al., U.S. Pat. Nos. 7,088,440 and 7,161,664 both to Buermann et al., U.S. Pat. No. 7,826,641 and Patent Application 2012/0038549 both to Mandella et al. Distance to environmental objects including depth, which is sometimes taken to mean the distance from walls and/or ceilings, can clearly be used in the reduced homography H as taught herein.

FIG. 18 is a block diagram illustrating the components of an optical apparatus 700 that implements the reduced homography H of the invention. Many examples of components have already been provided in the embodiments described above, and the reader may look back to those for specific counterparts to the general block representation used in FIG. 18. Apparatus 700 requires an optical sensor 702 that records the electromagnetic radiation from space points $P_i$ in its image coordinates. The electromagnetic radiation is recorded on optical sensor 702 as measured image coordinates $\hat{x}_i, \hat{y}_i$ of measured image points $\hat{p}_i = (\hat{x}_i, \hat{y}_i)$. As indicated, optical sensor 702 can be any suitable photo-sensing apparatus including, but not limited to CMOS sensors, CCD sensors, PIN photodiode sensors, Position Sensing Detectors (PSDs) and the like. Indeed, any photo sensor capable of recording the requisite image points is acceptable.

The second component of apparatus 700 is a processor 704. Processor typically identifies the structural uncertainty based on the image points $\hat{p}_i = (\hat{x}_i, \hat{y}_i)$. In particular, processor 704 is responsible for typical image processing tasks (see background section). As it performs these tasks and obtains the processed image data, it will be apparent from inspection of these data that a structural uncertainty exists. Alternatively or in addition, a system designer may inspect the output of processor 704 to confirm the existence of the structural uncertainty.

Depending on the computational load, system resources and normal operating limitation, processor 704 may include a central processing unit (CPU) and/or a graphics processing unit (GPU). A person skilled in the art will recognize that performing image processing tasks in the GPU has a number of advantages. Furthermore, processor 704 should not be considered to be limited to being physically proximate optical sensor 702. As shown in with the dashed box, processor 704 may include off-board and remote computational resources 704'. For example, certain difficult to process environments with few optical features and poor contrast can be outsourced to high-speed network resources rather than being processed locally. Of course, precaution should be taken to avoid undue data transfer delays and time-stamping of data is advised whenever remote resources 704' are deployed.

Based on the structural uncertainty detected by examining the measured data, processor 704 selects a reduced representation of the measured image points $\hat{p}_i = (\hat{x}_i, \hat{y}_i)$ by rays $\hat{r}_i$ defined in homogeneous coordinates and contained in a projective plane of optical apparatus 700 based on the structural uncertainty. The manner in which this is done has been taught above.

Referring back to FIG. 18, the third component of apparatus 700 is an estimation module 706 for estimating at least one of the pose parameters with respect to the canonical pose by the reduced homography H using said rays $\hat{r}_i$, as taught above. In fact, estimation module 706 computes the entire estimation matrix $\Theta$ and provides its output to a pose recovery module 710. As shown by the connection between estimation module 706 and off-board and remote computational resources 704' it is again possible to outsource the task of computing estimation matrix ss. For example, if the number of measurements is large and the optimization is too computationally challenging, outsourcing it to resources 704' can be the correct design choice. Again, precaution should be taken to avoid undue data transfer delays and time-stamping of data is advised whenever remote resources 704' are deployed.

Module 710 proceeds to recover the pointer, the anchor point, and/or any of the other pose parameters in accordance with the above teachings. The specific pose data, of course, will depend on the application. Therefore, the designer may further program pose recovery module 710 to only provide some selected data that involves trigonometric combinations of the Euler angles and linear movements of optical apparatus 700 that are relevant to the task at hand.

In addition, when an auxiliary measurement apparatus 708 is present, its data can also be used to find out the value of offset d and to continuously adjust that condition as used in computing the reduced homography H. In addition, any data fusion algorithm that combines the usually frequent measurements performed by the auxiliary unit can be used to improve pose recovery. This may be particularly advantageous when the auxiliary unit is an inertial unit.

In the absence of auxiliary measurement apparatus 708, it is processor 704 that sets the condition on the motion of optical apparatus 700. As described above, the condition, i.e., the value of offset distance d, needs to be consonant with the reduced representation. For example, in the radial case it is the distance $d_z$, in the vertical case it is the distance $d_x$ and in the horizontal case it is the distance $d_y$. Processor 704 may know that value a priori if a mechanism is used to enforce the condition. Otherwise, it may even try to determine the instantaneous value of the offset from any data it has, including the magnification of objects in its field of view. Of course, it is preferable that auxiliary measurement apparatus 708 provide that information in an auxiliary measurement that is made independent of the optical measurements on which the reduced homography H is practiced.

Many systems, devices and items, as well as camera units themselves can benefit from deploying the reduced homography H in accordance with an embodiment of the present invention. For a small subset of just a few specific items that can derive useful information from having on-board optical apparatus deploying the reduced homography H the reader is referred to U.S. Published Application 2012/0038549 to Mandella et al.

Note that in the subsequent teachings, it will be understood that the mathematical formalism employed by this invention utilizes homogenous coordinates to represent space points in the projective plane, and explicit reference to homogenous coordinates and the projective plane will be dropped for convenience, with the implicit understanding of their usage, and any explicit reference given to them as and if needed. Similarly, projective plane may not be explicitly shown in the drawings for clarity, and any explicit drawings of it provided as and if needed.

Structural Redundancy

At this juncture, the reader will be well familiar with the formalism and treatment that this invention teaches in dealing with lens and camera defects due to any number of reasons that ultimately result in radial, vertical linear or horizontal linear unreliability of optical information in the image plane. We have called this unreliability as structural uncertainty and have treated the various cases accordingly. More specifically, when the motion of the optical apparatus is substantially confined to a reference plane parallel to the front wall, we have referred to the resultant structural uncertainty as radial structural uncertainty or simply the radial case.

When the motion of the optical apparatus is substantially confined to a reference plane parallel to the ceiling, we have referred to the resultant structural uncertainty as vertical linear structural uncertainty or simply the vertical linear or still more simply the vertical case. Finally, when the motion of the optical apparatus is substantially confined to a reference plane parallel to the side wall, we have referred to the resultant structural uncertainty as horizontal linear structural uncertainty or simply the horizontal linear case or still more simply the horizontal case. Further note our interchangeable use of the terms structural uncertainty and structural uncertainties in the plural, with any distinction only drawn if and when needed depending.

In the ensuing embodiments, we will now address the converse and equivalent situations. Specifically, instead of defects in the camera or optical apparatus as restrictions imposed upon us, we will voluntarily confine the motion of the optical apparatus in various ways, and then derive our reduced homography. The end result will be our ability to address practical applications where the motion of the camera or optical apparatus is naturally constrained in certain ways and we want to take advantage of those constraints to reduce the size of our required homography. In other words, we will find that due to our elective restraints on camera motion, as normally anticipated in various practical applications, optical information of measured image points in certain directions will be 'redundant' in the image plane and we will discard this redundant information to arrive at our reduced homography. We refer to this redundancy of optical information due to constraints on camera motion as structural redundancy (or redundancies), and as already taught, we refer to such constrained camera motion as conditioned motion.

Recalling FIG. 5E, when the motion of optical apparatus 104 is constrained to a plane parallel to the X-Y plane (with respect to the world coordinates $(X_w, Y_w, Z_w)$ parameterizing environment 100 as shown), the motion is constrained along Z-axis, except possibly within tolerance levels/margins $\epsilon_f, \epsilon_b$ (not shown in FIG. 5E), as taught above. In this case as we have seen, that the pose parameters can be recovered without the optical information of measured image points along Z-axis. Differently put, we can say that the optical information has structural redundancy along the Z-axis when the motion is constrained to the X-Y plane. This structural redundancy results in a reduced representation of measured image points as rays or vectors in projective plane 146 as taught earlier, and ultimately this reduced representation is used in the determination of our reduced homography as also taught earlier. We refer to this conditioned motion of optical apparatus 104 as conforming to the radial case or simply the radial case as already taught.

Referring now to FIG. 12A-B, as explained earlier, when the motion of optical apparatus 402 on robot 404 is constrained to a plane parallel to the Y-Z plane, the structural redundancy is contained along X-axis or oriented vertically and we refer to this conditioned motion of optical apparatus 402 as conforming to the vertical linear case or we simply refer to this embodiment as the vertical linear case, and sometimes even shorten it to just calling it as the vertical case as taught earlier (see also FIGS. 14A-B and the associated explanation). That is obviously because optical apparatus 402 on robot 404 is free to move along Y and Z axes, but not along X-axis and hence information along X-axis is redundant in the image plane. Again this structural redundancy results in a reduced representation of measured image points as rays or vectors in projective plane 146 of optical apparatus 402 as taught earlier, and ultimately this reduced representation is used in the determination of our reduced homography as also taught earlier.

It will be no surprise to the reader that when the motion of the optical apparatus of the instant invention is constrained to a plane parallel to the X-Z plane, the structural redundancy in the image plane is oriented along Y-axis and we refer to this conditioned motion of the optical apparatus as conforming to the horizontal linear case or we simply refer to this embodiment as the horizontal linear case, and sometimes even shorten it to calling it as the horizontal case as taught earlier. Thus, referring to FIG. 15 and the associated explanation, this structural redundancy results in a reduced representation of measured image points as rays or vectors in projective plane 146 of optical apparatus 402 as taught earlier, and ultimately this reduced representation is used in the determination of our reduced homography as also taught earlier.

The reader is instructed to note that both structural uncertainty and structural redundancy are equivalent formulation of the same optical conditions and the associated embodiments—the teachings of this disclosure apply to both, with the semantic distinction that the former is due to optical defects and restrictions imposed upon us while the later are elective constraints on camera motion imposed by the needs of individual applications. These constraints result in a reduced representation of measured image points as rays or vectors in a projective plane of the optical apparatus. This reduced representation of measured image points ultimately obtains our reduced homography as per earlier discussions. Recall that the reduced homography thus obtained results in a more efficient recovery and estimation of the pose parameters of the optical apparatus, as compared to the traditional art. The following teachings further expand our understanding of the properties and characteristics of our reduced homography especially as it applies to conditions of structural redundancies.

After having introduced structural redundancy in detail above, let us treat it formally to arrive at our reduced homography for various practical situations of the ensuing embodiments. We will start with showing an alternate derivation for the transformation as taught earlier for transforming the vertical linear case to the radial case (see Eq. 41 and Eq. 42).

As previously taught, the vertical linear case can be transformed to the radial case by performing a 90° rotation around the Y-axis and a 90° rotation around the Z-axis. These rotations are visualized in FIG. 19A-F for clarity. More specifically, the aforementioned rotations will convert an environment parameterized in (X,Y,Z) coordinates where the motion of the optical apparatus is constrained to X-axis (vertical linear case), to an environment parameterized in (X,Y,Z) coordinates where the motion of the optical apparatus is constrained to Z-axis (radial case). Such a transformation will enable us to apply our reduced homography for the radial case as derived earlier. The required transformation matrix for this conversion is:

$$T = \begin{pmatrix} 0 & 1 & 0 \\ 0 & 0 & 1 \\ 1 & 0 & 0 \end{pmatrix} \quad \text{(Eq. 45)}$$

In other words, the results for the radial case can be applied to the vertical case after the substitutions: x→y, y→z and z→x (i.e. Euler Z-X-Z rotations becoming X-Y-X rotations). The inverse of transformation matrix T, i.e., $T^{-1}$, will take us from the radial case to the vertical case.

We now explicitly use the above transformation to provide an alternate derivation of Eq. 41 and Eq. 42 for the vertical linear case. Starting with the reduced homography equation for the radial case in terms of the estimation matrix $\Theta$, we have:

$$\Theta = \begin{pmatrix} \theta_1 & \theta_2 & \theta_3 \\ \theta_4 & \theta_5 & \theta_6 \end{pmatrix} = (C \; \bar{b}), \text{ where} \quad \text{(Eq. 14)}$$

$$\bar{b} = -C \begin{pmatrix} \delta x/d \\ \delta y/d \end{pmatrix} + \frac{d-\delta z}{d}\begin{pmatrix} \sin\psi \\ \cos\psi \end{pmatrix}\sin\theta. \quad \text{(Eq. 13A)}$$

It follows from Eq. 13 and Eq. 13' of earlier teachings, that using the transformation $(C \; \bar{b})$ of our reduced homography, a space point p represented by an n-vector $\bar{m}$ transforms to a vector or ray $\bar{r}$ in the projective plane as follows:

$$\bar{r} = \kappa(C\bar{b})\bar{m}. \quad \text{(Eq. 13'')}$$

where $\kappa$ is a constant. The above expression assumes that the motion is constrained along Z-axis and structural redundancy is radial (i.e. the radial case). Let us apply the transformation defined by Eq. 45 above to space point p represented by vector $\bar{m}$, or more simply stated just to space point $\bar{m}$, as follows:

$$\bar{m}^{\langle T \rangle} = T\bar{m}. \quad \text{(Eq. 45')}$$

Here superscript $\langle T \rangle$ means that transformation T is being applied to the right hand side or argument space point $\bar{m}$, to obtain the left hand side transformed space point $\overline{\bar{m}\bar{m}^{\langle T \rangle}}$. From the definition of identity matrix I, we have $\bar{m}^{\langle I \rangle} = I\bar{m} = \bar{m}$.

Obviously, we can also employ Eq. 45' to transform a space point in vertical linear case with reference plane parallel to the Y-Z plane and structural redundancy along X-axis, to the radial case with reference plane parallel to the X-Y plane and structural redundancy along Z-axis. As already explained, we refer to this transformation as converting the vertical linear case to the radial case, so we can apply our earlier derivation of reduced homography. Thus, we can trivially rewrite Eq. 13'' in terms of space point $\bar{m}$ $\bar{m}^{\langle T \rangle}$ as simply:

$$\bar{r} = \kappa(C\bar{b})\bar{m}^{\langle T \rangle},$$

which leads us to:

$$\bar{r} = \kappa(C\bar{b})TT^{-1}\bar{m}\bar{m}^{\langle T \rangle} = \kappa(C\bar{b})T\bar{m}.$$

The term $(C\bar{b})T$ becomes:

$$(C \; \bar{b})T = \begin{pmatrix} c_1 & c_2 & b_1 \\ c_3 & c_4 & b_2 \end{pmatrix}\begin{pmatrix} 0 & 1 & 0 \\ 0 & 0 & 1 \\ 1 & 0 & 0 \end{pmatrix} = \begin{pmatrix} b_1 & c_1 & c_2 \\ b_2 & c_3 & c_4 \end{pmatrix} = (\bar{b} \; C).$$

The above is equivalent to Eq. 41, which the reader can verify by expanding the right hand side of Eq. 41. However, the expression for $\bar{b}$ still contains terms specified under the transformed version $\overline{\bar{m}\bar{m}^{\langle T \rangle}}$ of space point $\bar{m}$. We need to express it back in terms of the vertical linear case which we started with by applying Eq. 45' i.e. we need to remove superscript $\langle T \rangle$ from its correspondent terms. That is because, we can then correctly reuse the teachings of the radial case while still ensuring the motion constraint of the vertical linear case i.e. reference plane parallel to the Y-Z plane.

We accomplish the above as follows. By letting $$\bar{\lambda} \equiv \begin{pmatrix} \sin\psi \\ \cos\psi \end{pmatrix}\sin\theta$$

as before, and rearranging $\bar{b}$ from Eq. 13A above yields us:

$$\bar{b} = -C\begin{pmatrix} \frac{\delta x^{(T)}}{d} \\ \frac{\delta y^{(T)}}{d} \end{pmatrix} + \frac{d-\delta z^{(T)}}{d}\begin{pmatrix} \sin\psi \\ \cos\psi \end{pmatrix}\sin\theta = \quad \text{(Eq. 46)}$$

$$-\frac{1}{d}(C \; \bar{\lambda})\begin{pmatrix} \delta x^{(T)} \\ \delta y^{(T)} \\ \delta z^{(T)} \end{pmatrix} + \bar{\lambda}$$

$$\bar{b} = -\frac{1}{d}(C \; \bar{\lambda})T\begin{pmatrix} \delta x \\ \delta y \\ \delta z \end{pmatrix} + \bar{\lambda} = -\frac{1}{d}(C \; \bar{\lambda})\begin{pmatrix} \delta y \\ \delta z \\ \delta x \end{pmatrix} + \bar{\lambda}$$

$$\bar{b} = -C\begin{pmatrix} \frac{\delta y}{d} \\ \frac{\delta z}{d} \end{pmatrix} + \frac{d-\delta x}{d}\begin{pmatrix} \sin\psi \\ \cos\psi \end{pmatrix}\sin\theta \quad \text{(Eq. 46A)}$$

The above equation is the same as Eq. 42. Note that $\psi$ is now a roll about X-axis, $\theta$ is a tilt about Y-axis, and $\phi$ is again a roll about X-axis (i.e. Euler rotations in the X-Y-X convention).

We have thus provided an alternate derivation for the vertical linear case. More precisely, we have provided an alternate way to convert the mathematical expressions of the radial case into the required expressions for estimating our reduced homography for the vertical linear case. It should be noted that there is nothing special about transformation T employed above. The above procedure would apply to any linear transformation. In other words, in the above derivation we used as 'base case' the case when the motion constraint is parallel to the front wall (i.e. the radial case) and transformed the vertical linear case into this base case, to obtain explicit equations for our reduced homography. But we could have easily started with the vertical linear case or the vertical horizontal case as the base case. In other words, we could have transformed any of the three cases (radial, vertical linear, vertical horizontal) from one to another. Still differently put, we could have transformed a first base case of any kind, into a second base case of a different kind. We will further learn below, how to also accomplish this using permutation matrices.

Thus using the above techniques one can linearly transform the equations of structural redundancy consonant to one planar motion constraint, to the equations of structural redundancy consonant to a different planar motion constraint. This linear transformational relationship between different structural redundancies as taught by the instant invention is useful for a number of practical applications where one formulation of the problem would be more conducive for implementation than others, given the mechanical constraints of the environment. Thus it would be desirable to transform the equations to that particular formulation, or base case.

Reduced Homography: Orthogonal Base Cases and Permutation Matrices

As shown above that the reduced homography for the vertical linear case can be derived from the radial case by using the following transformation:

$$T = \begin{pmatrix} 0 & 1 & 0 \\ 0 & 0 & 1 \\ 1 & 0 & 0 \end{pmatrix} \quad \text{(Eq. 45)}$$

The above amounts to substitutions $x \to y$, $y \to z$ and $z \to x$ in the equations of the radial case.

For convenience, let $T_1 \triangleq I$ be the identity transformation which converts (trivially) the radial case to the radial case i.e. no transformation. And let $T_2$ be the transformation that converts the vertical linear case to the radial case:

$$T_2 \triangleq \begin{pmatrix} 0 & 1 & 0 \\ 0 & 0 & 1 \\ 1 & 0 & 0 \end{pmatrix},$$

for which above Eq. 46 and Eq. 46A were derived above.

Similarly, we let $T_3$ be the transformation that converts the horizontal linear case to the radial case. Analogously to the above derivation for transformation T, with obviously $T_2 \triangleq T$, and for which Eq. 46 and Eq. 46A were derived, we will derive the equations for transformation $T_3$ further below. Recall that for $T_1$, no transformation is needed, since $T_1 \triangleq I$.

But first recall that $T_2$ is the composition of a 90° rotation about Y-axis followed by a 90° rotation about Z-axis. A rotation about Y-axis is given by Eq. 2C, which evaluated at 90° yields:

$$R^y(90) = \begin{pmatrix} 0 & 0 & -1 \\ 0 & 1 & 0 \\ 1 & 0 & 0 \end{pmatrix}$$

A rotation about Z-axis is given by Eq. 2A, which evaluated at 90° yields:

$$R^z(90) = \begin{pmatrix} 0 & 1 & 0 \\ -1 & 0 & 0 \\ 0 & 0 & 1 \end{pmatrix}$$

The composition results in $T_2$:

$$R^z(9)R^y(9) = \begin{pmatrix} 0 & 1 & 0 \\ -1 & 0 & 0 \\ 0 & 0 & 1 \end{pmatrix}\begin{pmatrix} 0 & 0 & -1 \\ 0 & 1 & 0 \\ 1 & 0 & 0 \end{pmatrix} = \begin{pmatrix} 0 & 1 & 0 \\ 0 & 0 & 1 \\ 1 & 0 & 0 \end{pmatrix} = T_2$$

These transformations are visualized for clarity in FIG. 19A-C, where our parameterized environment containing the conventional right-handed coordinate system of this invention, contains a reference plane 740, to which the conditioned motion of the optical apparatus is constrained, rotates first about Y-axis by 90° in FIG. 19A, and then about Z-axis by 90° in FIG. 19B, to assume its final position shown in FIG. 19C. Furthermore, the substitutions $(x,y,z) \to (y,z,x)$ in equations for the radial case provide us the equations for the vertical linear case. By the last statement we mean that we will get the same equations for the vertical linear case if derived from first principles using prior teachings.

Recall from Eq. 40 that structural uncertainty (and equivalently structural redundancy) in the vertical linear case is modeled as:

$$\bar{n}' = \pm N(\hat{o} \times \bar{m}') = \kappa(0, -\bar{m}_3', \bar{m}_2'),$$

where unit vector $\hat{o}' = (1,0,0)^T$ which means that $\bar{m}_1'$ has no contribution, hence obtaining our reduced homography as already taught earlier. Further note that full or regular homography A is given by:

$$A^T = \frac{1}{\kappa} R^T (I - \bar{p} \cdot \bar{h}^T)^T,$$

with $\bar{p} = (1,0,0)^T$ and $R^T$ expressed in Euler rotations in the X-Y-X convention. Now let us apply the $(x,y,z)$-$(y,z,x)$ substitution to Eq. 13A and Eq. 30B expressing matrices $\bar{b}$ and C of our instant invention respectively for the radial case. We see that:

$$\bar{b} = -C\begin{pmatrix} \delta y/d \\ \delta z/d \end{pmatrix} + \frac{d - \delta x}{d}\begin{pmatrix} \sin\psi \\ \cos\psi \end{pmatrix}\sin\theta, \quad \text{(Eq. 46A)}$$

while C remains unchanged:

$$C = \begin{pmatrix} \cos\psi & \sin\psi \\ -\sin\psi & \cos\psi \end{pmatrix}\begin{pmatrix} 1 & 0 \\ 0 & \cos\theta \end{pmatrix}\begin{pmatrix} \cos\phi & \sin\phi \\ -\sin\phi & \cos\phi \end{pmatrix}.$$

But now $\psi$ is a roll about X-axis, $\theta$ is a tilt about Y-axis, and $\phi$ is again a roll about X-axis. Finally, the estimation matrix $\Theta$ is the result of the column permutation $(1,2,3) \rightarrow (2,3,1)$ applied to the estimation matrix $\Theta$ for the radial case. In other words, after applying the above column permutations, we have for the vertical linear case:

$$\Theta = (\overline{b}C).$$

Note the contrast to the estimation matrix $\Theta = (C\overline{b})$ for the radial case. Also note that $T_2$ is also the result of right-shifting the columns of the identity matrix:

$$I = \begin{pmatrix} 1 & 0 & 0 \\ 0 & 1 & 0 \\ 0 & 0 & 1 \end{pmatrix} \xrightarrow{\text{column right-shift}} \begin{pmatrix} 0 & 1 & 0 \\ 0 & 0 & 1 \\ 1 & 0 & 0 \end{pmatrix} = T_2$$

In fact, matrix $T_2$ is a permutation matrix performing the substitution $(x,y,z) \rightarrow (y,z,x)$. This can be readily seen by noticing that the first column of identity matrix I denotes the X-axis, which permutes into its second column (thus denoting the Y-axis), and the second column of identity matrix I denoting the Y-axis permutes to its third column (thus denoting the Z-axis), and finally the third column of identity matrix I denoting the Z-axis permutes to its first column (and thus denoting the X-axis).

Now let us continue the above process to arrive at transformation $T_3$. Performing an additional column right-shift to transformation $T_2$ yields the transformation $T_3$:

$$T_2 = \begin{pmatrix} 0 & 1 & 0 \\ 0 & 0 & 1 \\ 1 & 0 & 0 \end{pmatrix} \xrightarrow{\text{column right-shift}} \begin{pmatrix} 0 & 0 & 1 \\ 1 & 0 & 0 \\ 0 & 1 & 0 \end{pmatrix} = T_3$$

The above is equivalent to the composition of a $-90°$ rotation about X-axis followed by a $-90°$ rotation about Z-axis. A rotation about X-axis is given by Eq. 2B, which evaluated at $-90°$ yields:

$$R^x(-90) = \begin{pmatrix} 1 & 0 & 0 \\ 0 & 0 & -1 \\ 0 & 1 & 0 \end{pmatrix}$$

A rotation about Z-axis is given by Eq. 2A, which evaluated at $-90°$ yields:

$$R^z(-90) = \begin{pmatrix} 0 & -1 & 0 \\ 1 & 0 & 0 \\ 0 & 0 & 1 \end{pmatrix}$$

The composition for $T_3$ becomes:

$$R^z(-90)R^x(-90) = \begin{pmatrix} 0 & -1 & 0 \\ 1 & 0 & 0 \\ 0 & 0 & 1 \end{pmatrix}\begin{pmatrix} 1 & 0 & 0 \\ 0 & 0 & -1 \\ 0 & 1 & 0 \end{pmatrix} = \begin{pmatrix} 0 & 0 & 1 \\ 1 & 0 & 0 \\ 0 & 1 & 0 \end{pmatrix} = T_3$$

These transformations are visualized for clarity in FIG. 19D-F, where our parameterized environment containing the conventional right-handed coordinate system of this invention, contains a reference plane 742 to which the conditioned motion of the optical apparatus is constrained, rotates first about X-axis by $-90°$ in FIG. 19D, then about Z-axis by $-90°$ in FIG. 19E, to assume its final position shown in FIG. 19F. Furthermore, the substitutions $(x,y,z) \rightarrow (z,x,y)$ in equations for the radial case provide us the equations for the horizontal linear case. We will verify this below.

Analogously to the derivation of Eq. 46 and Eq. 46A, now let us derive the equations for reduced homography under transformation $T_3$. Let us apply transformation $T_3$ to space point $\overline{m}$, as follows:

$$\overline{m}^{\langle T_3 \rangle} = T_3 \overline{m}.$$

We can employ the above transformation to transform a space point in horizontal linear case with reference plane parallel to the X-Z plane and structural redundancy along Y-axis, to the radial case with reference plane parallel to the X-Y plane and structural redundancy along Z-axis. As already explained, we refer to this transformation as converting the horizontal linear case to the radial case, so we can apply our earlier derivation of reduced homography. Thus, we can trivially rewrite Eq. 13" in terms of space point $\overline{m}^{\langle T_3 \rangle}$ as simply:

$$\overline{r} = \kappa(C\overline{b})\overline{m}^{\langle T_3 \rangle},$$

which leads us to:

$$\overline{r} = \kappa(C\overline{b})T_3 T_3^{-1} \overline{m}^{\langle T_3 \rangle} = \kappa(C\overline{b})T_3 \overline{m}.$$

The term $(C\overline{b})T_3$ becomes:

$$\Theta = (C\ \overline{b})T_3 = \begin{pmatrix} c_1 & c_2 & b_1 \\ c_3 & c_4 & b_2 \end{pmatrix}\begin{pmatrix} 0 & 0 & 1 \\ 1 & 0 & 0 \\ 0 & 1 & 0 \end{pmatrix} = \begin{pmatrix} c_2 & b_1 & c_1 \\ c_4 & b_2 & c_3 \end{pmatrix}$$

A comparison of the above equation to Eq. 14 is instructive for the reader. However, the expression for $\overline{b}$ still contains terms specified under the transformed version $\overline{m}^{\langle T_3 \rangle}$ of space point $\overline{m}$. We need to express it back in terms of the horizontal linear case which we started with by applying transformation $T_3$ above i.e. we need to remove superscript $\langle T_3 \rangle$ from its correspondent terms. That is because, we can then correctly reuse the teachings of the radial case while still ensuring the motion constraint of the horizontal linear case i.e. reference plane parallel to the X-Z plane.

We accomplish the above as follows. By letting $$\overline{\lambda} \equiv \begin{pmatrix} \sin\psi \\ \cos\psi \end{pmatrix} \sin\theta$$

as before, and rearranging $\bar{b}$ from Eq. 13A above yields us:

$$\bar{b} = -C \begin{pmatrix} \frac{\delta x^{(T_3)}}{d} \\ \frac{\delta y^{(T_3)}}{d} \end{pmatrix} + \frac{d - \delta z^{(T_3)}}{d} \begin{pmatrix} \sin\psi \\ \cos\psi \end{pmatrix} \sin\theta = \quad \text{(Eq. 47)}$$

$$-\frac{1}{d}(C \; \bar{\lambda}) \begin{pmatrix} \delta x^{(T_3)} \\ \delta y^{(T_3)} \\ \delta z^{(T_3)} \end{pmatrix} + \bar{\lambda}$$

$$\bar{b} = -\frac{1}{d}(C \; \bar{\lambda}) T_3 \begin{pmatrix} \delta x \\ \delta x \\ \delta x \end{pmatrix} + \bar{\lambda} = -\frac{1}{d}(C \; \bar{\lambda}) \begin{pmatrix} \delta z \\ \delta x \\ \delta y \end{pmatrix} + \bar{\lambda}$$

$$\bar{b} = -C \begin{pmatrix} \frac{\delta z}{d} \\ \frac{\delta x}{d} \end{pmatrix} + \frac{d - \delta y}{d} \begin{pmatrix} \sin\psi \\ \cos\psi \end{pmatrix} \sin\theta \quad \text{(Eq. 47A)}$$

Note the comparison of Eq. 47 and Eq. 47A to Eq. 46 and Eq. 46A respectively. Also, a comparison of Eq. 47A to Eq. 42 is instructive for the reader. We can further verify that indeed the substitutions (x, y, z)→(z, x, y) in the equations for the radial case render us the equations for the horizontal linear case. The common Euler Z-X-Z convention becomes Y-Z-Y convention after the substitution. Therefore, $\psi$ becomes a roll about Y-axis, $\theta$ becomes a tilt about Z-axis, and $\phi$ is again a roll about Y-axis.

Let us further observe a few facts about permutation matrices. The reader may remark that there are six possible permutation matrices of size 3×3:

$$T_1 = \begin{pmatrix} 1 & 0 & 0 \\ 0 & 1 & 0 \\ 0 & 0 & 1 \end{pmatrix}, \; T_2 = \begin{pmatrix} 0 & 1 & 0 \\ 0 & 0 & 1 \\ 1 & 0 & 0 \end{pmatrix}, \; T_3 = \begin{pmatrix} 0 & 0 & 1 \\ 1 & 0 & 0 \\ 0 & 1 & 0 \end{pmatrix},$$

$$T_4 = \begin{pmatrix} 0 & 1 & 0 \\ 1 & 0 & 0 \\ 0 & 0 & 1 \end{pmatrix}, \; T_5 = \begin{pmatrix} 0 & 0 & 1 \\ 0 & 1 & 0 \\ 1 & 0 & 0 \end{pmatrix}, \; T_6 = \begin{pmatrix} 1 & 0 & 0 \\ 0 & 0 & 1 \\ 0 & 1 & 0 \end{pmatrix}.$$

Transformation $T_4$ corresponds to a radial case where x and y are swapped. This is a reflection through the 3D plane $$\left( \frac{1}{\sqrt{2}}, -\frac{1}{\sqrt{2}}, 0 \right) \cdot (x, y, z) = 0,$$

which is given by the following transformation:

$$S^{x \leftrightarrow y} = \begin{pmatrix} 0 & 1 & 0 \\ 1 & 0 & 0 \\ 0 & 0 & 1 \end{pmatrix}$$

Further, transformation $T_5$ corresponds to a vertical linear case followed by the above reflection:

$$S^{x \leftrightarrow y} T_2 = \begin{pmatrix} 0 & 1 & 0 \\ 1 & 0 & 0 \\ 0 & 0 & 1 \end{pmatrix} \begin{pmatrix} 0 & 1 & 0 \\ 0 & 0 & 1 \\ 1 & 0 & 0 \end{pmatrix} = \begin{pmatrix} 0 & 0 & 1 \\ 0 & 1 & 0 \\ 1 & 0 & 0 \end{pmatrix} = T_5.$$

$T_5$ performs the substitution (x,y,z)→(z,y,x) (compare with (x,y,z)→(y,z,x) for $T_2$).

Likewise, transform $T_6$ corresponds to the horizontal linear case followed by the above reflection:

$$S^{x \leftrightarrow y} T_3 = \begin{pmatrix} 0 & 1 & 0 \\ 1 & 0 & 0 \\ 0 & 0 & 1 \end{pmatrix} \begin{pmatrix} 0 & 0 & 1 \\ 1 & 0 & 0 \\ 0 & 1 & 0 \end{pmatrix} = \begin{pmatrix} 1 & 0 & 0 \\ 0 & 0 & 1 \\ 0 & 1 & 0 \end{pmatrix} = T_6.$$

$T_6$ performs the substitution (x,y,z)→(x,z,y) (compare with (x,y,z)→(z,x,y) for $T_3$).

We have thus obtained closed-form solutions when the conditioned motion of the optical sensor/apparatus conforms to the three orthogonal base cases: radial, vertical linear, and horizontal linear. These three cases correspond to permutation matrices $T_1, T_2, T_3$ respectively. The reader can be convinced that close-form solutions can be similarly found for the cases corresponding to permutation matrices $T_4, T_5, T_6$ by performing steps analogous to those shown earlier. In summary, this disclosure teaches closed-form solutions for the following three orthogonal base cases:

Radial Case

Motion is constrained to a plane parallel to the front wall, the camera canonical position is at a distance d from the front wall, and the Euler rotations ($\psi, \theta, \phi$) are with respect to axes (z,x,z), respectively.

Vertical Linear Case:

Motion is constrained to a plane parallel to the ceiling, the camera canonical position is at a distance d from the ceiling, and the Euler rotations ($\psi, \theta, \phi$) are with respect to axes (x,y,x), respectively.

Vertical Horizontal Case:

Motion is constrained to a plane parallel to the (right) side wall, the camera canonical position is at a distance d from the side wall, and the Euler rotations ($\psi, \theta, \phi$) are with respect to axes (y,z,y), respectively.

Now we will derive the equations for the general case when the planar motion constraint is oriented arbitrarily.

Reduced Homography: Motion Constrained to an Arbitrary Plane

In the below embodiments, we will teach how to derive our reduced homography when the conditioned motion of the optical apparatus is confined to any arbitrary plane (within tolerance levels $\epsilon_f, \epsilon_b$ as per above explanation). These teachings can be applied to the tracking embodiments, as well as other applications of the instant invention taught in this disclosure.

It is well understood in the art that using Rodrigues' formula in matrix form, a rotation with angle $\gamma$ about an arbitrary unit axis $\hat{u} = (u_x, u_y, u_z)^T$ is given by:

$$R_{\hat{u}}(\gamma) = \cos\gamma I + \sin\gamma [\hat{u}]_\times + (1 - \cos\gamma)\hat{u}\hat{u}^T,$$

where:

$$\hat{u}\hat{u}^T = \begin{pmatrix} u_x^2 & u_x u_y & u_x u_z \\ u_x u_y & u_y^2 & u_y u_z \\ u_x u_z & u_y u_z & u_z^2 \end{pmatrix}, [\hat{u}]_\times = \begin{pmatrix} 0 & -u_z & u_y \\ u_z & 0 & -u_x \\ -u_y & u_x & 0 \end{pmatrix} \text{ and}$$

$$[\hat{u}]_\times^T = -[\hat{u}]_\times.$$

The matrix $[\hat{u}]_\times$ is the cross-product matrix. That is, $\hat{u} \times \bar{b} = [\hat{u}]_\times \bar{b}$. Note $[\hat{u}]_\times$ is anti-symmetric, therefore $\bar{b}^T [\hat{u}]_\times = -[\hat{u}]_\times \bar{b}^T = -(\hat{u} \times \bar{b})^T$.

Let $\hat{n}$ be a unit vector perpendicular to a plane with arbitrary orientation. Let $\hat{u}$ and $\hat{v}$ be two orthogonal unit vectors in the arbitrary plane, such that:

$$\hat{u} \cdot \hat{v} = \hat{v} \cdot \hat{n} = \hat{n} \cdot \hat{u} = 0, \text{ and}$$

$$\hat{u} \times \hat{v} = \hat{n}, \hat{v} \times \hat{n} = \hat{u}.$$

In other words, the triplet $(\hat{u},\hat{v},\hat{n})$ is a right-handed orthonormal basis aligned with the plane. We define the Euler rotations in n-u-n convention as follows:

$R_{\psi'} = R_{\hat{n}}(\psi)$: Rotation $\psi$ about axis $\hat{n}$, $R_\theta = R_{\hat{u}}(\theta)$: Rotation $\theta$ about axis $\hat{u}$, $R_\phi = R_{\hat{n}}(\phi)$: Rotation $\phi$ about axis $\hat{n}$.

The n-u-n sequence of rotations is carried out with respect to the plane as it is being transformed. That is to say, it is a sequence of intrinsic rotations analogous to the traditional Euler rotations. Regular homography A as known in the art can be expressed as follows:

$$A^T = \kappa R^T (I - (\hat{n}\bar{h}^T)/d)^T = \kappa R_\psi^T R_\theta^T R_\phi^T (I - (\bar{h}\hat{n}^T)/d),$$

where $\kappa$ is a non-zero constant, the vector $\bar{h}$ is the camera translation relative to the canonical position, and d is the distance from the canonical position to a reference plane. The reference plane is an arbitrarily oriented plane to which the motion of the optical apparatus is constrained (within tolerance levels/margins $\epsilon_f$, $\epsilon_b$ per above teachings), but offset at a distance d in the $\hat{n}$ direction. By this point, the reader should be well-versed with the existence of an acceptable tolerance level/margin $\epsilon_f$-$\epsilon_b$ in either directions perpendicular to the plane to which the motion is constrained, as allowed by the invention (see. FIG. 5A and corresponding description), and thus an explicit reference to such a tolerance margin may not be given in the ensuing discussion for ease of explanation. Further note, that like all prior embodiments, components of tolerance margin, $\epsilon_f$, $\epsilon_b$ in the two directions perpendicular to the plane, do not have to be equal.

The vector $\bar{h}$ expressed in terms of the basis $(\hat{u},\hat{v},\hat{n})$ is given by:

$$\bar{h} = \delta_u \hat{u} + \delta_v \hat{v} + \delta_n \hat{n},$$

where $\delta_u$, $\delta_v$, $\delta_n$ are the individual components of the translation of the optical apparatus in $\hat{u}$, $\hat{v}$, $\hat{n}$ directions respectively.

Now we can precisely define our reduced homography consonant to an arbitrary planar constraint as follows: Given an arbitrary plane oriented according to the orthonormal basis $(\hat{u},\hat{v},\hat{n})$ with $\hat{n}$ being perpendicular to the plane, the reduced homography $A_r^T$ consonant to said planar constraint (the consonant plane for short) is defined in the present invention as:

$$A_r^T = \begin{bmatrix} \hat{u}^T \\ \hat{v}^T \end{bmatrix} A^T,$$

where matrix $A^T$ is the traditional/regular homography expressed above. Conversely, we can also say that the planar constraint characterized by the basis $(\hat{u},\hat{v},\hat{n})$ is consonant with the reduced homography $A_r^T$ defined above. The plane characterized by the basis $(\hat{u},\hat{v},\hat{n})$ constitutes a "surface condition" that may arise due to the imaging properties of the optical apparatus, mechanical constraints, or simply as a mathematical construction to aid analysis and facilitate calculations. Now we will show that the above definition is indeed the right generalization of reduced homography $A_r^T$ introduced in the earlier teachings.

It is important to remark that the current teachings of our reduced homography are equally applicable in the presence of structural uncertainty imposed upon us due to the physics of the camera, its lens, manufacturing defects, etc., rather than just in the presence of structural redundancy due to the motion constraint of the camera. In other words, the surface condition of the plane, whether the plane is parallel to the X-Y, Y-Z, X-Z planes or even if it is an arbitrarily oriented plane, may be due to the environment and physics of the optical apparatus, mechanical constraints of the application, computational or mathematical convenience. To avoid undue semantic complexity, we may still refer to such surface condition as consonant planar constraint, or as motion constraint consonant to the plane, or as conditioned motion to the consonant plane, or still as conditioned motion consonant with our reduced homography $A_r^T$, while realizing the wider applicability of the teachings to any combination of structural uncertainties, structural redundancies, computational convenience and mathematical construction to aid in the analysis.

Now consider the following expansion utilizing Rodrigues' formula presented above:

$$\hat{u}^T R_\psi^T = \hat{u}^T (\cos\psi I + \sin\psi [\hat{n}]_\times + (1 - \cos\psi)\hat{n}\hat{n}^T)^T$$
$$= \hat{u}^T (\cos\psi I - \sin\psi [\hat{n}]_\times + (1 - \cos\psi)\hat{n}\hat{n}^T)$$
$$= \cos\psi \hat{u}^T - \sin\psi \hat{u}^T [\hat{n}]_\times + (1 - \cos\psi)\hat{u}^T \hat{n}\hat{n}^T \rightarrow$$
$$\hat{u}^T R_\psi^T$$
$$= \cos\psi \hat{u}^T + \sin\psi \hat{v}^T$$

The above is true because $\hat{u}^T [\hat{n}]_\times = (\hat{n} \times \hat{u})^T = -\hat{v}^T$ and $\hat{u}^T \hat{n} = 0$. Likewise:

$$\hat{u}^T R_\psi^T R_\theta^T = (\cos\psi \hat{u}^T + \sin\psi \hat{v}^T)(\cos\theta I - \sin\theta [\hat{u}]_\times + (1 - \cos\theta)\hat{u}\hat{u}^T)$$
$$= \cos\psi\cos\theta \hat{u}^T - \cos\psi\sin\theta \hat{u}^T [\hat{u}]_\times + \cos\psi(1 - \cos\theta)\hat{u}^T \hat{u}\hat{u}^T +$$
$$\sin\psi\cos\theta \hat{v}^T - \sin\psi\sin\theta \hat{v}^T [\hat{u}]_\times + \sin\psi(1 - \cos\theta)\hat{v}^T \hat{u}\hat{u}^T$$
$$= \cos\psi\cos\theta \hat{u}^T + \cos\psi(1 - \cos\theta)\hat{u}^T + \sin\psi\cos\theta \hat{v}^T + \sin\psi\sin\theta \hat{n} \rightarrow$$
$$\hat{u}^T R_\psi^T R_\theta^T = \cos\psi \hat{u}^T + \sin\psi\cos\theta \hat{v}^T + \sin\psi\sin\theta \hat{n}^T$$

The above exploits the following: $\hat{u}^T[\hat{u}]_x=0$, $\hat{u}^T\hat{u}=I$, $\hat{v}^T[\hat{u}]_x=-\hat{n}^T$ and $\hat{v}^T\hat{u}=0$.

Continuing further:

$$\rightarrow \hat{u}^T R_\psi^T R_\theta^T R_\phi^T = (\cos\psi\cos\phi - \sin\psi\cos\theta\sin\phi)\hat{u}^T +$$
$$(\cos\psi\sin\phi + \sin\psi\cos\theta\cos\phi)\hat{v}^T + \sin\psi\sin\theta\hat{n}^T$$

Through a similar process it can be shown that:

$$\rightarrow \hat{v}^T R_\psi^T R_\theta^T R_\phi^T = (-\sin\psi\cos\phi - \cos\psi\cos\theta\sin\phi)\hat{u}^T +$$
$$(-\sin\psi\sin\phi + \cos\psi\cos\theta\cos\phi)\hat{v}^T + \cos\psi\sin\theta\hat{n}^T$$

As elsewhere in this invention, we group terms into the 2-by-2 matrix C and 2-by-1 vector $\bar{\lambda}$:

$$\bar{\lambda} = \begin{pmatrix} \sin\psi \\ \cos\psi \end{pmatrix} \sin\theta,$$

$$C = \begin{pmatrix} \cos\psi\cos\phi - \sin\psi\cos\theta\sin\phi & \cos\psi\sin\phi + \sin\psi\cos\theta\cos\phi \\ -\sin\psi\cos\phi - \cos\psi\cos\theta\sin\phi & -\sin\psi\sin\phi + \cos\psi\cos\theta\cos\phi \end{pmatrix}$$
$$= \begin{pmatrix} \cos\psi & \sin\psi \\ -\sin\psi & \cos\psi \end{pmatrix} \begin{pmatrix} 1 & 0 \\ 0 & \cos\theta \end{pmatrix} \begin{pmatrix} \cos\phi & \sin\phi \\ -\sin\phi & \cos\phi \end{pmatrix},$$

and arrive at the following expression:

$$\begin{bmatrix} \hat{u}^T \\ \hat{v}^T \end{bmatrix} R_\psi^T R_\theta^T R_\phi^T = C \begin{bmatrix} \hat{u}^T \\ \hat{v}^T \end{bmatrix} + \bar{\lambda}\hat{n}^T.$$

We are now ready to derive the expression for our reduced homography $A_r^T$ consonant to the arbitrarily oriented plane.

$$A_r^T = \begin{bmatrix} \hat{u}^T \\ \hat{v}^T \end{bmatrix} A^T$$
$$= \kappa \begin{bmatrix} \hat{u}^T \\ \hat{v}^T \end{bmatrix} R_\psi^T R_\theta^T R_\phi^T (I - (\bar{h}\hat{n}^T)/d)$$
$$= \kappa \left( C \begin{bmatrix} \hat{u}^T \\ \hat{v}^T \end{bmatrix} + \bar{\lambda}\hat{n}^T \right)(I - (\bar{h}\hat{n}^T)/d)$$
$$= \kappa \left( C \begin{bmatrix} \hat{u}^T \\ \hat{v}^T \end{bmatrix} + \bar{\lambda}\hat{n}^T - \frac{1}{d} C \begin{bmatrix} \hat{u}^T \\ \hat{v}^T \end{bmatrix} \bar{h}\hat{n}^T - \frac{1}{d}\bar{\lambda}\hat{n}^T\bar{h}\hat{n}^T \right).$$

Recall that $\bar{h} = \delta_u \hat{u} + \delta_v \hat{v} + \delta_n \hat{n}$ and $(\hat{u},\hat{v},\hat{n})$ is an orthonormal basis, therefore, $\hat{u}^T\bar{h}=\delta_u$, $\hat{v}^T\bar{h}=\delta_v$, $\hat{n}^T\bar{h}=\delta_n$. We thus have:

$$A_r^T = \kappa \left( C \begin{bmatrix} \hat{u}^T \\ \hat{v}^T \end{bmatrix} + \bar{\lambda}\hat{n}^T - \frac{1}{d} C \begin{bmatrix} \delta_u \\ \delta_v \end{bmatrix} \hat{n}^T - \frac{1}{d}\bar{\lambda}\delta_n\hat{n}^T \right).$$

Let $$\bar{b} = -\frac{1}{d} C \begin{bmatrix} \delta_u \\ \delta_v \end{bmatrix} + (1 - \delta_{n/d})\bar{\lambda},$$

and we finally arrive at the following:

$$A_r^T = \kappa \left( C \begin{bmatrix} \hat{u}^T \\ \hat{v}^T \end{bmatrix} + \bar{b}\hat{n}^T \right), \quad \text{(Eq. 48)}$$

$$\bar{b} = -\frac{1}{d} C \begin{bmatrix} \delta_u \\ \delta_v \end{bmatrix} + (1 - \delta_{n/d})\bar{\lambda} \quad \text{(Eq. 49)}$$

When the motion is constrained to the plane through the origin containing unit vectors $\hat{u}$, $\hat{v}$, then $\delta_n=0$ and $\bar{b}$ reduces to:

$$\bar{b} = -\frac{1}{d} C \begin{bmatrix} \delta_u \\ \delta_v \end{bmatrix} + \bar{\lambda},$$

(Eq. 50)
which the user is advised to compare with Eq. 46 and Eq. 47. The reduced homography $A_r^T$ of the invention, implicitly discards information along the direction perpendicular to the consonant plane. This information is redundant when the camera motion is constrained to the world plane that is coincident to the consonant plane at the camera canonical position $(\delta_u, \delta_v, \delta_n, \psi, \theta, \phi)^T=0$. This arbitrary plane to which the camera motion is constrained results in $\delta_n=0$ and the rest of the pose parameters $(\delta_u, \delta_v, \psi, \theta, \phi)$ can be unambiguously recovered from $A_r^T$ (as previously taught). Moreover, $\theta=0$ and $\bar{\lambda}=0$ when the camera is oriented perpendicular to this arbitrary plane.

It is useful to consider that our reduced homography $A_r^T$ has three components:

$$A_r^T = \kappa(\bar{\theta}_u \hat{u}^T + \bar{\theta}_v \hat{v}^T + \bar{\theta}_n \hat{n}^T)$$

Using the prevailing usage of sub-matrix C and vector $\bar{b}$ of our reduced homography $A_r^T$, it is straightforward to see that $C=[\bar{\theta}_u \bar{\theta}_v]$ and $\bar{b}=\bar{\theta}_n$. Therefore $\bar{\theta}_u$ and $\bar{\theta}_v$ are the columns of C and do not depend on camera translation, whereas $\bar{\theta}_n$ depends on camera translation and orientation. Applying $A_r^T$ to map an arbitrary space point $\bar{m}$ into its image plane representation, we get:

$$A_r^T \bar{m} = \kappa(\bar{\theta}_u \hat{u}^T \bar{m} + \bar{\theta}_v \hat{v}^T \bar{m} + \bar{\theta}_n \hat{n}^T \bar{m}) \quad \text{(Eq. 51)}$$
$$= \kappa(\bar{\theta}_u(\hat{u}\cdot\bar{m}) + \bar{\theta}_v(\hat{v}\cdot\bar{m}) + \bar{\theta}_n(\hat{n}\cdot\bar{m}))$$
$$= \kappa(m_u \bar{\theta}_u + m_v \bar{\theta}_v + m_n \bar{\theta}_n)$$

The scalars $m_u$, $m_v$, $m_n$ are the components of the space point $\bar{m}$ along unit vectors it, $\hat{u}$, $\hat{v}$, $\hat{n}$ respectively, prior to the camera motion (i.e., at the camera canonical position). The image plane representation of $\bar{m}$ thus has three components: 1) one component is proportional to the scalar projection of $\bar{m}$ onto $\hat{u}$, 2) a second component is proportional to the scalar projection of $\bar{m}$ onto $\hat{v}$, and 3) the third component is proportional to the scalar projection of $\bar{m}$ onto $\hat{n}$.

FIG. 20 shows an optical apparatus 752, in this particular case a cell phone, with a camera 754 and its associated lens or optical sensor (not shown), that is imaging space points in environment 756. The figure shows space point $P_i$ that is representative of any number of points present in environment 754 being imaged by camera 754. Of course, optical apparatus 752 can be any other optical device containing the optical apparatus, including but not limited to, a tablet, a computer, goggles, variety of cameras, watches, webcams, etc. Embodiment 750 and environment 756 are conveniently parameterized using (X,Y,Z) coordinate system shown.

The illustration further shows an arbitrary plane 758 to which the conditioned motion of optical apparatus 752, along with camera 754, is confined. This confinement of motion can be obviously within tolerance levels $\epsilon_f$, $\epsilon_b$ (not shown in FIG. 20) as taught above. The figure shows unit vectors $\hat{u}$ and $\hat{v}$ in arbitrary plane 758 (which may also be referred to as the u-v plane), and unit vector $\hat{n}$ perpendicular to it. The consonant plane is coincident with plane 758 at the camera canonical position. By this point the reader should be well familiar with the illustrative rigor of showing the image plane and projective plane explicitly in our drawings, and thus they are omitted from FIG. 20 for clarity.

As would be apparent to the reader by now, that space point $P_i$ represented by n-vector $\overline{m}$, and having a measured image point $\hat{p}_i$, will result in a ray or vector $\bar{r}=A_r^T \overline{m}=\kappa(m_u \overline{\theta}_u + m_v \overline{\theta}_v + m_n \overline{\theta}_n)$ in the projective plane of camera 754 in FIG. 20 using the reduced representation of our invention. From the discussion above, any information along unit vector $\hat{n}$ in the image plane as signified by the zig-zag break line in the direction of unit vector $\hat{n}$ is implicitly discarded by the reduced homography $A_r^T$. Nevertheless, the component of space point $\overline{m}$ perpendicular to the consonant plane at the camera canonical position still contributes to the equation as evidenced by the term $m_n \overline{\theta}_n$ in Eq. 51 above.

Now let us use the above derivation of our reduced homography $A_r^T$ consonant to an arbitrary plane, to revisit the radial, vertical linear and horizontal linear cases of our earlier teachings.

Radial Case

For the radial case, the basis is $\hat{u}^T=[1,0,0]$, $\hat{v}^T=[0,1,0]$, $\hat{n}^T=[0,0,1]$, and the translation from canonical position is given by $\delta_u=\delta x$, $\delta_v=\delta y$, $\delta_n=\delta z$. Using Eq. 48 and Eq. 49 above, our reduced homography becomes:

$$A_r^T = \kappa\left(C\begin{bmatrix}\hat{u}^T\\\hat{v}^T\end{bmatrix}+\bar{b}\hat{n}^T\right) = \kappa\left(C\begin{bmatrix}1 & 0 & 0\\0 & 1 & 0\end{bmatrix}+\bar{b}[0\ 0\ 1]\right) = \kappa[C\ \ \bar{b}]$$

$$\bar{b} = -\frac{1}{d}C\begin{bmatrix}\delta x\\\delta y\end{bmatrix}+\left(1-\frac{\delta z}{d}\right)\bar{\lambda}$$

Indeed, this is the same/equivalent expression for $\bar{b}$ for the radial case as derived by us earlier (see Eq. 13A).

Vertical Linear Case

For the vertical case, the basis is $\hat{u}^T=[0,1,0]$, $\hat{v}^T=[0,0,1]$, $\hat{n}^T=[1,0,0]$ and the translation from canonical position is given by $\delta_u=\delta y$, $\delta_v=\delta z$, $\delta_n=\delta x$. Using Eq. 48 and Eq. 49 above, our reduced homography becomes:

$$A_r^T = \kappa\left(C\begin{bmatrix}\hat{u}^T\\\hat{v}^T\end{bmatrix}+\bar{b}\hat{n}^T\right) = \kappa\left(C\begin{bmatrix}0 & 1 & 0\\0 & 0 & 1\end{bmatrix}+\bar{b}[1\ 0\ 0]\right) = \kappa[\bar{b}\ \ C]$$

$$\bar{b} = -\frac{1}{d}C\begin{bmatrix}\delta y\\\delta z\end{bmatrix}+\left(1-\frac{\delta x}{d}\right)\bar{\lambda}$$

Again, this is the same/equivalent expression for $\bar{b}$ for the vertical linear case as derived by us earlier (see Eq. 42).

Horizontal Linear Example

For the horizontal case, the basis is $\hat{u}^T=[0,0,1]$, $\hat{v}^T=[1,0,0]$, $\hat{n}^T=[0,1,0]$, and the translation from canonical position is given by $\delta_u=\delta z$, $\delta_v=\delta x$, $\delta_n=\delta Y$. Using Eq. 48 and Eq. 49 above, our reduced homography becomes:

$$A_r^T = \kappa\left(C\begin{bmatrix}\hat{u}^T\\\hat{v}^T\end{bmatrix}+\bar{b}\hat{n}^T\right) = \kappa\left(C\begin{bmatrix}0 & 0 & 1\\1 & 0 & 0\end{bmatrix}+\bar{b}[0\ 1\ 0]\right) = \kappa\begin{pmatrix}c_2 & b_1 & c_1\\c_4 & b_2 & c_3\end{pmatrix}$$

$$\bar{b} = -\frac{1}{d}C\begin{bmatrix}\delta z\\\delta x\end{bmatrix}+(1-\delta y/d)\bar{\lambda}$$

Once again, this is the same/equivalent expression for $\bar{b}$ for the horizontal linear case as derived by us earlier (see Eq. 47A).

Measurement Bias

While expanding the formal teachings of our reduced homography, let us also compute the effect of the deviation or bias on our computed estimates when the motion constraint is more than the allowed tolerance levels or tolerance margins $\epsilon_f$, $\epsilon_b$ as taught above. The following derivation applies to the radial case, but analogous analysis to any arbitrarily oriented plane to which the conditioned motion of the optical apparatus or sensor is constrained, should be an obvious application of prior teachings.

Recall from estimation matrix $\Theta$ for the reduced homography that it is possible to estimate the camera orientation ($\psi,\theta,\phi$) (and pointer location ($x_s,y_s$)). Hence, we can estimate the matrix C and the vector $\bar{\lambda}$. Let $\hat{C}$ and $\hat{b}$ denote these estimates.

It follows from Eq. 46 above that:

$$\bar{b} = -\frac{1}{d}C\begin{pmatrix}\delta x\\\delta y\end{pmatrix}+(1-\delta z/d)\bar{\lambda} = -\frac{1}{d}(C\ \ \bar{\lambda})\begin{pmatrix}\delta x\\\delta y\\\delta z\end{pmatrix}+\bar{\lambda}$$

As should be well understood by now, that in general, we cannot recover all three components $\delta x, \delta y$ and $\delta z$ using the reduced homography (because $\Theta$ is a rank-2 matrix). Therefore, in the radial case, either component $\delta z$ has to be measured with other sensors or $\delta z$ has to be zero—although more precisely it has to be within tolerance level or tolerance margin $\epsilon_f$, $\epsilon_b$ to achieve good results as per earlier teachings.

Under the motion constraint $\delta z=0$, the camera translation in the X-Y plane can be estimated as:

$$\begin{pmatrix}\delta x\\\delta y\end{pmatrix} \approx \begin{pmatrix}\hat{\delta x}\\\hat{\delta y}\end{pmatrix} \triangleq d\,\hat{C}^{-1}(\hat{\lambda}-\hat{b})$$

However, if the motion constraint is not obeyed (and instead $\delta z=\epsilon$, where $\epsilon$ is greater than tolerance $\epsilon_f$-$\epsilon_b$) the estimation becomes skewed and hence:

$$\begin{pmatrix} \delta x \\ \delta y \end{pmatrix} \approx d\, \hat{C}^{-1}\left((1-\delta z/d)\hat{\lambda} - \hat{b}\right) = \begin{pmatrix} \hat{\delta} x \\ \hat{\delta} y \end{pmatrix} - \epsilon\, \hat{C}^{-1}\hat{\lambda}$$

That is, our estimates $\delta_x$ and $\delta_y$ are now biased, or alternatively stated, have a measurement bias. Now, given a second (and unbiased) estimate $(\hat{\delta}_x', \hat{\delta}_y')$ of the camera translation in the X-Y plane, using an auxiliary measurement as per above teachings, such as, by using depth-from-defocus or a time-of-flight based measurement using the same optical sensor, or by using another auxiliary optical, acoustic, RF or inertial sensor (e.g. accelerometer, gyro, magnetometer, optical flow sensor or any other sensor for measuring local displacements), we can estimate the bias or deviation $\epsilon$ as:

$$\epsilon \approx (\hat{\lambda}^T \hat{\lambda}) \hat{\lambda}^T \hat{C} \begin{pmatrix} \hat{\delta}_x - \hat{\delta}_x' \\ \hat{\delta}_y - \hat{\delta}_y' \end{pmatrix}, \qquad \text{(Eq. 52)}$$

where the second estimate $(\hat{\delta}_x', \hat{\delta}_y')$ of the camera translation can be obtained by employing traditional or full homography. Thus measuring this bias can be used to filter the pose parameters as computed by our reduced homography in a real world setting, by discarding some measurements while keeping others. Further explained, an application can employ two entirely different optical apparatuses, or even the same apparatus, for computing camera translation using the more efficient reduced homography of this invention, and also the traditional or regular homography of the prevailing art. It can then use the later to filter some estimates of the former. This filtering can be for the purpose of tuning of the apparatus that employs reduced homography, or for determining an overall estimate of the goodness (Quality Assurance) of the pose estimation using the reduced homography. Optionally, this filtering can be turned off as needed based on the parts of the environment where the bias is presumed to be low while turned on where the bias is presumed to be high.

Tracking Applications

For tracking applications the detection of features of interest or fiducials is often a computationally intensive operation. It is thus desirable to predict the location of features of interest within the image given a prior camera pose. In this manner, the detection of the features becomes more efficient because the search is confined to smaller regions in the image.

Based on the teachings of the instant invention, an effective approach is to approximate the homography from prior values and local measurements of camera motion. The key is to compute the homography approximation without requiring a search for workspace features. From such approximation, camera pose and other pose properties (such as pointer cursor position) are estimated. These estimations can be sufficient for some applications, at least until the compound error becomes large as a result of repeating this process for several iterations. Moreover, the camera pose estimation can also be used to estimate the location of the workspace features or fiducials within the image frame (assuming said workspace features or fiducials are stationary). The search for the actual fiducials can be made smarter, such as by reducing the size of the region to be searched, and by other alternative means of imparting the knowledge of estimated location of the fiducials to the search process.

Local measurements of camera motion can be provided by accelerometers, gyros, magnetometers, optical flow sensors, and other sensors for local displacements. Alternatively, the local measurements of camera motion can be the result of a prediction given the past trajectory of the camera motion. Alternatively, both prediction and sensor data can be used to produce an estimator of camera motion (for example, by using a Kalman filter).

Tracking Local Translations

Thus in this section, we will teach useful techniques to locally approximate reduced homography H of the instant invention. Such techniques may be useful for tracking and other applications embodied in this disclosure. As taught above, the best estimation values for the reduced homography $H^T$ are expressed via estimation matrix $\Theta$. To recall, Eq. 14 shows that the estimation values correspond to entries of 2×2 C sub-matrix and the components of two-dimensional $\bar{b}$ vector as follows:

$$\Theta = \begin{pmatrix} \theta_1 & \theta_2 & \theta_3 \\ \theta_4 & \theta_5 & \theta_6 \end{pmatrix} = (C \; \bar{b}). \qquad \text{(Eq. 14)}$$

The matrix C is related to the pose orientation as follows:

$$C = \begin{pmatrix} \cos\psi & \sin\psi \\ -\sin\psi & \cos\psi \end{pmatrix} \begin{pmatrix} 1 & 0 \\ 0 & \cos\theta \end{pmatrix} \begin{pmatrix} \cos\phi & \sin\phi \\ -\sin\phi & \cos\phi \end{pmatrix}. \qquad \text{(Eq. 30B)}$$

Notice that the first and last factors in the right side of Eq. 30B are rotations in two dimensions. Let $R_{2\times 2}(\psi)$ and $R_{2\times 2}(\phi)$ be such rotations. Then:

$$C = R_{2\times 2}(\psi) \begin{pmatrix} 1 & 0 \\ 0 & \cos\theta \end{pmatrix} R_{2\times 2}(\phi)$$

The vector $\bar{b}$ is given by Eq. 34:

$$\bar{b} = -C \begin{pmatrix} \delta x/d \\ \delta y/d \end{pmatrix} + \frac{d-\delta z}{d} \begin{pmatrix} \sin\psi \\ \cos\psi \end{pmatrix} \sin\theta \qquad \text{(Eq. 34)}$$

Here $(\delta x, \delta y, \delta z)$ represent the translation from canonical position. We are going to express these translations in units of offset distance d, and the above equation simplifies to:

$$\bar{b} = -C \begin{pmatrix} x_c \\ y_c \end{pmatrix} + (1 - z_c) \begin{pmatrix} \sin\psi \\ \cos\psi \end{pmatrix} \sin\theta$$

We use subscripted and lower-case $(x_c, y_c, z_c)$ to denote that this is the camera 3-D translation from the canonical position, and to emphasize that this translation is in units relative to the offset distance d.

As a reminder, and referring back to FIG. 10C, the position of pointer 312 on screen 304 satisfies the following equation:

$$\begin{pmatrix} x_s \\ y_s \end{pmatrix} = -dC^{-1}\overline{b}. \qquad \text{(Eq. 29A)}$$

However, if $(x_s, y_s)$ is in units of offset distance d:

$$\begin{pmatrix} x_s \\ y_s \end{pmatrix} = -C^{-1}\overline{b}.$$

Now let us ask the following question: How does reduced homography H change with small translations of the camera while keeping the orientation constant?

If orientation is kept constant it is obvious that C remains constant. But this is not the case for vector $\overline{b}$. Let $$\overline{\lambda} \equiv \begin{pmatrix} \sin\psi \\ \cos\psi \end{pmatrix} \sin\theta.$$

Rearranging above expression of $$\overline{b} = -C\begin{pmatrix} x_c \\ y_c \end{pmatrix} + (1-z_c)\begin{pmatrix} \sin\psi \\ \cos\psi \end{pmatrix}\sin\theta$$

and substituting the value of $\overline{\lambda}$ gives us:

$$\overline{b} = -C\begin{pmatrix} x_c \\ y_c \end{pmatrix} + (1-z_c)\begin{pmatrix} \sin\psi \\ \cos\psi \end{pmatrix}\sin\theta = \qquad \text{(Eq. 53)}$$

$$-C\begin{pmatrix} x_c \\ y_c \end{pmatrix} + (1-z_c)\overline{\lambda} = -C\begin{pmatrix} x_c \\ y_c \end{pmatrix} + \overline{\lambda} - \overline{\lambda}z_c =$$

$$-(C \;\; \overline{\lambda})\begin{pmatrix} x_c \\ y_c \\ z_c \end{pmatrix} + \overline{\lambda} \to \overline{b} = -(C \;\; \overline{\lambda})\begin{pmatrix} x_c \\ y_c \\ z_c \end{pmatrix} + \overline{\lambda}.$$

Given that the Taylor series approximation of a vector multivariate function $f(x)$ at point $x=a$ is given by:

$$f(x) - f(a) \approx \left(\frac{\partial f}{\partial x}\bigg|_{x=a}\right)^T (x-a) = \left(\frac{\partial f}{\partial x}\bigg|_{x=a}\right)^T \Delta x,$$

we can do a multivariable Taylor expansion of Eq. 53 by letting $$x = \begin{pmatrix} x_c \\ y_c \\ z_c \end{pmatrix}$$

and by noting that the second $\overline{\lambda}$ in Eq. 53 will cancel out. Therefore:

$$\overline{b} - \overline{b}_o \approx \left(\frac{\partial \overline{b}}{\partial x}\bigg|_{x=x_o}\right)^T \begin{pmatrix} \Delta x_c \\ \Delta y_c \\ \Delta z_c \end{pmatrix}$$

But $$\frac{\partial \overline{b}}{\partial x} = -(C \;\; \overline{\lambda})^T$$

from Eq. 53 and because the derivative of a vector x post-multiplying a matrix A is given by $$\frac{\partial Ax}{\partial x} = A^T.$$

We thus have:

$$\overline{b} - \overline{b}_o \approx -(C_o \;\; \overline{\lambda}_o)^T)^T \begin{pmatrix} \Delta x_c \\ \Delta y_c \\ \Delta z_c \end{pmatrix},$$

which yields:

$$\overline{b} \approx \overline{b}_o - (C_o \;\; \overline{\lambda}_o)\begin{pmatrix} \Delta x_c \\ \Delta y_c \\ \Delta z_c \end{pmatrix},$$

where the subscript o denotes values at the canonical position. Alternatively:

$$\Delta \overline{b} \approx -(C_o \;\; \overline{\lambda}_o)\begin{pmatrix} \Delta x_c \\ \Delta y_c \\ \Delta z_c \end{pmatrix} \qquad \text{(Eq. 54)}$$

We note that vector $\Delta \overline{b}$ is two-dimensional, and $(C \;\; \overline{\lambda}_o)$ is a 2×3 matrix. In general, we cannot unambiguously recover the vector $(\Delta x_c, \Delta y_c, \Delta z_c)^T$, required to recover camera pose from the two-dimensional vector $\Delta \overline{b}$. Recall that $(x_c, y_c, z_c)$ denote the camera 3-D translation from the canonical position expressed in units relative to the offset distance d. However we note that the local translation can be measured using inertial sensors or other sensors for relative motion. Homography H can then be locally approximated without having to compute estimation matrix Θ from scratch, thus avoiding fiducial measurements and the recovery algorithm described in earlier sections of this disclosure.

Stated differently, if $(\Delta x_c, \Delta y_c, \Delta z_c)^T$ can be locally approximated using auxiliary measurements, the value of $\Delta \overline{b}$ from Eq. 54 above, and hence of $\overline{b}$ can be directly computed to arrive at estimation matrix Θ for determining the full pose. This is useful in situations where local translations are small while orientation stays constant, so that the introduction of auxiliary translational measurements in reduced homography H does not necessitate the computation of the estimation matrix Θ from scratch, as per earlier teachings.

Likewise, we can approximate the position of pointer 312, again referring to FIG. 10C, on screen 304 using relative motion measurements (and again, without having to compute matrix Θ from scratch). Therefore, $$\begin{pmatrix} x_s \\ y_s \end{pmatrix} = -C^{-1}\overline{b} = C^{-1}(C \ \overline{\lambda}) \begin{pmatrix} x_c \\ y_c \\ z_c \end{pmatrix} + \overline{\lambda} = (I \ \ C^{-1} \ \overline{\lambda}) \begin{pmatrix} x_c \\ y_c \\ z_c \end{pmatrix} + \overline{\lambda}$$

Note that I is a 2×2 identify matrix above and $C^{-1}\overline{\lambda}$ is a 2×1 vector with multiplication operation between $C^{-1}$ and $\overline{\lambda}$. We again do a multivariable Taylor expansion of the above by letting $$x = \begin{pmatrix} x_c \\ y_c \\ z_c \end{pmatrix},$$

and noting that the second $\overline{\lambda}$ on the right hand side above will cancel out. Thus:

$$\begin{pmatrix} \Delta x_s \\ \Delta y_s \end{pmatrix} \approx \left( \frac{\partial \begin{pmatrix} x_s \\ y_s \end{pmatrix}}{\partial x} \bigg|_{x=x_0} \right)^T \begin{pmatrix} \Delta x_c \\ \Delta y_c \\ \Delta z_c \end{pmatrix}$$

Again by knowing the rule of the derivative of a vector post-multiplying a matrix:

$$\frac{\partial \begin{pmatrix} x_s \\ y_s \end{pmatrix}}{\partial x} = (I \ \ C^{-1} \ \overline{\lambda})^T.$$

We evaluate the derivative at the canonical position:

$$\left( \frac{\partial \begin{pmatrix} x_s \\ y_s \end{pmatrix}}{\partial x} \bigg|_{x=x_0} \right)^T = (I \ \ C_o^{-1} \ \overline{\lambda}_o),$$

and arrive at:

$$\begin{pmatrix} \Delta x_s \\ \Delta y_s \end{pmatrix} \approx (I \ \ C_o^{-1} \ \overline{\lambda}_o) \begin{pmatrix} \Delta x_c \\ \Delta y_c \\ \Delta z_c \end{pmatrix} = \begin{pmatrix} \Delta x_c \\ \Delta y_c \end{pmatrix} + C_o^{-1}\overline{\lambda}_o \Delta z_c,$$

where again and I is a 2×2 identity matrix. Note again that $C_o^{-1}\overline{\lambda}_o$ is a 2×1 vector term with multiplication operation between $C_o^{-1}$ and $\overline{\lambda}_o$.

Moreover, the quantity $|\overline{b}|^2$ i.e. the square of the norm or magnitude of 2×1 vector $\overline{b}$ varies as follows:

$$\Delta|\overline{b}|^2 = \Delta(\overline{b}^T\overline{b}) \approx -2\overline{b}_o^T (C_o \ \overline{\lambda}_o) \begin{pmatrix} \Delta x_c \\ \Delta y_c \\ \Delta z_c \end{pmatrix},$$

which is the result of applying the chain rule for matrix calculus to $$\frac{d(\overline{b}^T\overline{b})}{d(x_c, y_c, z_c)}.$$

Once again, a multivariable Taylor expansion of the above yields:

$$\Delta(\overline{b}^T\overline{b}) \approx \left( \frac{\partial(\overline{b}^T\overline{b})}{\partial x} \bigg|_{x=x_0} \right)^T \begin{pmatrix} \Delta x_c \\ \Delta y_c \\ \Delta z_c \end{pmatrix},$$

By the chain rule of matrix calculus and the rules of vector differentiation well understood in the art:

$$\frac{\partial(\overline{b}^T\overline{b})}{\partial x} = \left( \frac{\partial \overline{b}}{\partial x} \right) \left( \frac{\partial(\overline{b}^T\overline{b})}{\partial \overline{b}} \right) = \left( \frac{\partial \overline{b}}{\partial x} \right)(2 \ \overline{b}),$$

and as derived above, $$\frac{\partial \overline{b}}{\partial x} = -(C \ \overline{\lambda})^T,$$

thus:

$$\frac{\partial(\overline{b}^T\overline{b})}{\partial x} \bigg|_{x=x_0} = (-(C_o \ \overline{\lambda}_o)^T)(2 \ \overline{b}_o).$$

Replacing the above into $\Delta(\overline{b}^T\overline{b})$ yields:

$$\Delta(\overline{b}^T\overline{b}) \approx ((-[C_o \ \overline{\lambda}_o]^T)(2\overline{b}_o))^T \begin{pmatrix} \Delta x_c \\ \Delta y_c \\ \Delta z_c \end{pmatrix} = -2\overline{b}_o^T(C_o \ \overline{\lambda}_o) \begin{pmatrix} \Delta x_c \\ \Delta y_c \\ \Delta z_c \end{pmatrix} \quad \text{(Eq. 55)}$$

An interesting special case arises when $\overline{\lambda}_o \Delta z_c = 0$, and the approximation for vector $\Delta \overline{b}$ from Eq. 54 reduces to:

$$\Delta \overline{b} \approx -C_o \begin{pmatrix} \Delta x_c \\ \Delta y_c \end{pmatrix}, \quad \text{(Eq. 54')}$$

which is solvable in either direction (that is, knowing $\Delta \overline{b}$ implies knowing $(\Delta x_c, \Delta y_c)$ and vice versa). The condition $\overline{\lambda}_o \Delta z_c = 0$ is true when: 1) the reference plane to which the conditioned motion of the optical apparatus is consonant, is parallel to the front wall or the X-Y plane i.e. the radial case, or 2) the camera orientation remains perpendicular to the reference plane, or both.

In the above scenario, where $\overline{\lambda}_o \Delta z_c = 0$, the magnitude of $\Delta \overline{b}$ is related to the magnitude of the consonant translation as follows:

$$(\Delta \overline{b})^T (\Delta \overline{b}) \approx (\Delta x_c \Delta y_c) C_o^T C_o \begin{pmatrix} \Delta x_c \\ \Delta y_c \end{pmatrix}$$

From above, since $$C = R_{2\times 2}(\psi)\begin{pmatrix} 1 & 0 \\ 0 & \cos\theta \end{pmatrix}R_{2\times 2}(\phi),$$

and exploiting the fact that $R_{2\times 2}(\psi)$ and $R_{2\times 2}(\phi)$ are rotation matrices, yields:

$$(\Delta b_1)^2 + (\Delta b_2)^2 \approx \qquad \text{(Eq. 56)}$$
$$(\Delta x_c \quad \Delta y_c)R_{2\times 2}(-\phi_o)\begin{pmatrix} 1 & 0 \\ 0 & (\cos\theta_o)^2 \end{pmatrix}R_{2\times 2}(\phi_o)\begin{pmatrix} \Delta x_c \\ \Delta y_c \end{pmatrix},$$

where $\Delta b_1$ and $\Delta b_1$ are the components of vector $\Delta\bar{b}$ and hence $(\Delta b_1)^2 + (\Delta b_2)^2$ above is a scalar and represents the square of the norm/magnitude of vector $\Delta\bar{b}$.

Likewise:

$$(\Delta x_c \quad \Delta y_c)\begin{pmatrix} \Delta x_c \\ \Delta y_c \end{pmatrix} \approx (\Delta\bar{b})^T C_o^{-1T} C_o^{-1} \Delta\bar{b}$$

Taking the inverse of $$C = R_{2\times 2}(\psi)\begin{pmatrix} 1 & 0 \\ 0 & \cos\theta \end{pmatrix}R_{2\times 2}(\phi),$$

and again exploiting the fact that $R_{2\times 2}(\psi)$ and $R_{2\times 2}(\phi)$ are rotation matrices, yields:

$$(\Delta x_c)^2 + (\Delta y_c)^2 \approx \qquad \text{(Eq. 57)}$$
$$(\Delta b_1 \quad \Delta b_2)R_{2\times 2}(\psi_o)\begin{pmatrix} 1 & 0 \\ 0 & \frac{1}{(\cos\theta_o)^2} \end{pmatrix}R_{2\times 2}(-\psi_o)\begin{pmatrix} \Delta b_1 \\ \Delta b_2 \end{pmatrix},$$

where once again $\Delta x_c$ and $\Delta y_c$ are the components of vector $$\begin{pmatrix} \Delta x_c \\ \Delta y_c \end{pmatrix}$$

and hence $(\Delta x_c)^2 + (\Delta y_c)^2$ above is a scalar and represents the square of the norm/magnitude of vector $$\begin{pmatrix} \Delta x_c \\ \Delta y_c \end{pmatrix}.$$

It should be noted that the above discussion and findings remain true even when the plane to which the conditioned motion is consonant, is not parallel to the X-Y plane.

Other Applications

We now turn our attention to some applications of the above techniques in embodiments of the present invention that may be concerned with generating and using a virtual environment employing constrained motion as taught according to this disclosure. Such a virtual environment can be employed for a number of purposes, including training of human users.

Before proceeding, let us consider another example embodiment of the present invention will be best understood by initially referring to FIG. 21. FIG. 21 illustrates in a perspective view a stable three-dimensional environment 800 in which an item 802 equipped with an on-board optical apparatus 804 is deployed in accordance with the invention. A workspace 806 of the optical apparatus 804 is indicated by a dashed box. It should be noted, that the present invention relates to checking conformance of a pose recovered by optical apparatus 804 itself. Thus, the invention is not limited to any particular item that has optical apparatus 804 installed on-board. However, for clarity of explanation and a better understanding of the fields of use, it is convenient to base the teachings on concrete examples. In one embodiment, a pair of virtual display glasses or virtual reality goggles embodies item 802 and a CMOS camera embodies on-board optical apparatus 804. In another embodiment (e.g., illustrated below in connection with FIG. 23), an object similar to motorcycle handlebars embodies item 802 and a pair of CMOS cameras embody on-board optical apparatus 804. In one example, the CMOS camera(s) embodying the optical apparatus 804 may be referred to as an inside-out camera.

The CMOS camera 804 has a viewpoint O from which it views environment 800. The CMOS camera 804 views stationary locations in the environment 800 (e.g., on a wall, on a fireplace, on a computer monitor, etc.). In general, item 802 is understood herein to be any object that is equipped with an on-board optical unit and is manipulated by a user (e.g., while worn or held by the user). For some additional examples of suitable items the reader is referred to U.S. Published Application 2012/0038549 to Mandella et al.

Environment 800 is not only stable, but it is also known. This means that the locations of exemplary stationary objects 808, 810, 812, and 814 present in environment 800 and embodied by a window, a corner between two walls and a ceiling, a fireplace, and a cabinet, respectively, are known prior to practicing a reduced homography H according to the invention. Cabinet 814 represents a side table, accent table, coffee table, or other piece of furniture that remains stationary. Cabinet 814 provides another source of optical features. More precisely still, the locations of non-collinear optical features designated here by space points $P_1, P_2, \ldots, P_i$ and belonging to window 808, corner 810, fireplace 812, and cabinet 814 are known prior to practicing reduced homography H of the invention.

A person skilled in the art will recognize that working in known environment 800 is a fundamentally different problem from working in an unknown environment. In the latter case, optical features are also available, but the locations of the optical features in the environment are not known a priori. Thus, a major part of the challenge is to construct a model of the unknown environment before being able to recover extrinsic parameters (position and orientation in the environment, together defining the pose) of the camera 804. The present invention applies to known environment 800 in which the positions of objects 808, 810, 812, and 814 and hence of the non-collinear optical features designated by space points $P_1, P_2, \ldots, P_{26}$, are known a priori (e.g., either from prior measurements, surveys or calibration procedures that may include non-optical measurements, as discussed in more detail above). The position and orientation of the camera 804 in the environment 800 may be expressed with respect to world coordinates (X,Y,Z) using the techniques described above in connection with FIG. 5E.

The actual non-collinear optical features designated by space points $P_1, P_2, \ldots, P_{26}$ can be any suitable, preferably high optical contrast parts, markings or aspects of objects 808, 810, 812, and 814. The optical features can be passive, active (i.e., emitting electromagnetic radiation) or reflective (even retro-reflective if illumination from on-board item 802 is deployed (e.g., in the form of a flash or continuous illumination with structured light that may, for example, span the infrared (IR) range of the electromagnetic spectrum). In the present embodiment, window 808 has three optical features designated by space points $P_1$, $P_2$ and $P_3$, which correspond to a vertical edge. The corner 810 designated by space point $P_4$ also has high optical contrast. The fireplace 812 offers high contrast features denoted by space points $P_6, P_7, P_{11}, P_{12}, P_{13}, P_{16}, P_{17}, P_{20}, P_{21}, P_{22}, P_{23}, P_{24}, P_{25},$ and $P_{26}$ corresponding to various edges and features.

It should be noted that any physical features, as long as their optical image is easy to discern, can serve the role of optical features. For example, features denoted by space points $P_5, P_8, P_9, P_{10}, P_{14}, P_{15}, P_{18},$ and $P_{19}$ corresponding to various corners, edges, and high contrast features of a wall behind fireplace 812 may also be employed. Preferably, more than just four optical features are selected in order to ensure better performance in checking pose conformance and to ensure that a sufficient number of the optical features, preferably at least four, remain in the field of view of CMOS camera 804, even when some are obstructed, occluded or unusable for any other reasons. In the subsequent description, the space points $P_1, P_2, \ldots, P_{26}$ are referred to interchangeably as space points $P_i$ or non-collinear optical features. It will also be understood by those skilled in the art that the choice of space points $P_i$ can be changed at any time, e.g., when image analysis reveals space points that offer higher optical contrast than those used at the time or when other space points offer optically advantageous characteristics. For example, the space points may change when the distribution of the space points along with additional new space points presents a better geometrical distribution (e.g., a larger convex hull) and is hence preferable for checking conformance of a recovered pose with a predefined conditioned motion.

FIG. 22 illustrates glasses 802 manipulated in an arbitrary plane 850 to which motion of camera 804 is confined, as visualized in the figure. As already taught, camera 804 of glasses 802 sees environment 840 from point of view O. Point of view O is defined by the design of camera 804 and, in particular, by the type of optics camera 804 deploys. Glasses 802 and camera 804 can of course employ stereo vision and the associated algorithms. The glasses 802 are shown in three different poses (e.g., at times $t=t_{-i}$, $t=t_o$ and $t=t_1$ with the corresponding locations of point of view O, not labeled). At time $t=t_o$ glasses 802 are held by a user such that viewpoint O of camera 804 is in a canonical pose. The canonical pose is used as a reference for computing the reduced homography $A_r^T$ according to the invention.

In employing reduced homography $A_r^T$ of the instant invention taught above, a certain condition has to be placed on the motion of glasses 802 and hence of camera 804. The condition is satisfied in the present embodiment by bounding the motion of glasses 802 to arbitrary plane 850. This confinement does not need to be exact and it can be periodically reevaluated or changed, as will be explained further below. Additionally, a certain forward displacement $\epsilon_f$ (not shown) and a certain back displacement $\epsilon_b$ (not shown) away from reference plane 850 are permitted (similar to the displacement described above in connection with FIG. 5A). Note that the magnitudes of displacements $\epsilon_f$, $\epsilon_b$ do not have to be equal.

FIG. 23 is a diagram illustrates the use of an optical sensor to use and control a virtual 3-D environment explained above. In an example embodiment, the glasses 802 may be used by a user 807 to view a virtual reality environment 800'. Action within the virtual reality environment 800' may be controlled using an object 842 with an optical sensor 844. In one example, a motorcycle handlebar embodies the object 842 and a pair of CMOS cameras (e.g., camera 1 and camera 2) embodies the optical sensor 844. In the example provided in FIG. 24A-D, the virtual reality environment 800' portrays a virtual motorcycle 860' traveling along a road with a curve approaching. The handlebars 842 with the optical sensor 844 correspond to the handlebars of the virtual motorcycle 860' in the virtual environment 800'. The forearms of the user 807 grasping the handlebars 842 are also represented (shown by dotted lines) on the handlebars of the virtual motorcycle 860' in the virtual environment 800'. By manipulating the handlebars 842 in the environment 800, the user 807 effects motion changes within the virtual environment 800'. In one example, the optical sensor 844 may be monitored for motion within a plane 846. In one example, the virtual environment 800', the object 842, and the optical sensor 844 may be used to teach the user 807 the technique of counter steering the motorcycle.

Referring to FIG. 24A-24D, a sequence of views are shown illustrating various attitudes of a real motorcycle 880 during a counter steering maneuver. The virtual motorcycle 860' of FIG. 23 may be illustrated having attitudes similar to those of the real motorcycle 880 shown in FIG. 24A-D during execution of a counter steering operation of the virtual motorcycle 860' within the virtual environment 800'. Counter steering is generally used by single track vehicle operators, such as cyclists and motorists, to initiate a turn toward any direction by momentarily steering counter to (opposite) the desired direction of the turn. For example, in order to turn right, the operator would first steer left. To negotiate a turn successfully, the combined center of mass of the rider in a single track vehicle must first be leaned in a direction of the turn, and steering briefly in the opposite direction results in such a lean.

Referring back to FIG. 23, the road in the virtual environment 800' turns to the right. With reference to FIG. 23A-23D, the method of counter steering the motorcycle 880 may be explained. In order to turn the motorcycle 860' to follow the right turn shown in the virtual environment 800', the user 807 must first push the handlebars 842 in the direction of the turn (i.e., pushing on the right side of the handlebars 842 because the turn is to the right). If the turn were heading to the left, the user 807 would push on the left side of the handlebars 842. As the motorcycle 860' approaches the turn in the virtual environment 800', at least 100 feet prior to the turn, the user 807 would move to the outside corner of the lane, the corner opposite the direction of the turn as far as possible. Cornering on a motorcycle is dependent on the speed the motorcycle is traveling. It is important to apply the brakes on approach to a turn and then accelerate upon exiting the turn. The present invention may be used to monitor the application of force by the user 807 to the handlebars 842 in order to determine whether user 807 is moving the handlebars 842 correctly for counter steering. As the user 807 pushes the right side of the handlebars 842, the motorcycle 860' in the virtual environment 800' would move to the left like the real motorcycle 880 illustrated in FIG. 24A. As the handlebars 842 are brought back toward the direction of the turn, the motorcycle 860' shown in the virtual environment 800' would start to come back towards the turn like the real motorcycle 880 illustrated in FIG. 24B. The motorcycle 860' shown in the virtual environment 800' would then start to lean in the direction of the turn similarly to the motorcycle 880 shown in FIGS. 24C and 24D.

Figures 24A, 24B, 24C, 24D:
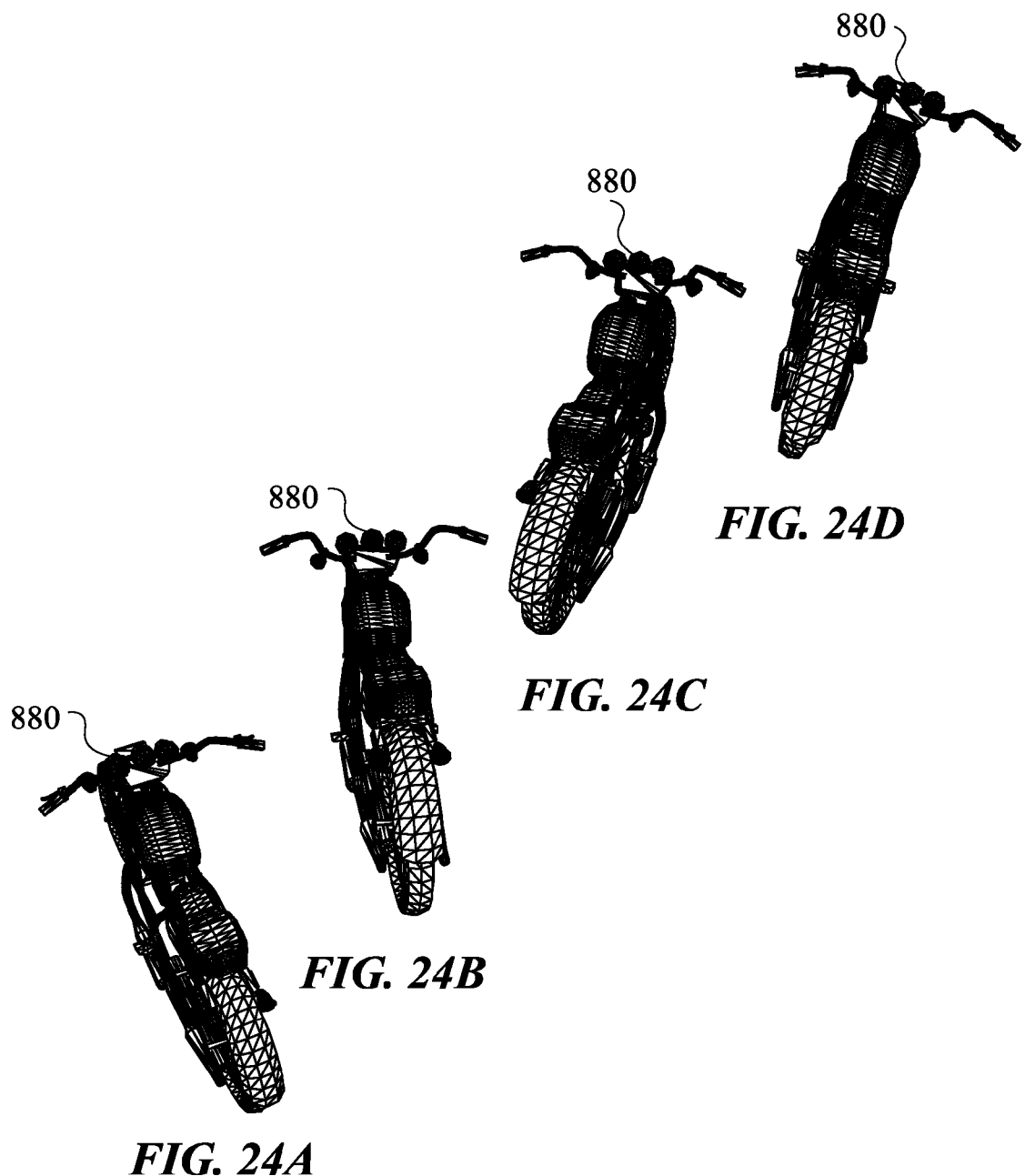

In practicing the technique of counter steering in the virtual environment 800', the user 807 would first move the handlebars 842 and, consequently, the optical sensor 844 to the left, and then back to the right. The simulated arms of the user 807 on the handlebars of the simulated motorcycle in the virtual environment 800' presented to the user 807 via the glasses 802 would then reflect the proper use of handlebars 842 and optical sensor 844. In particular, when counter steering to the right, the following steps would be performed. A torque on the handlebar 842 to the left would be applied. The front wheel would then rotate about the steering axis to the left and motorcycle as a whole would steer to the right simulating forces of the contact patch at ground level. The wheels would be pulled out from under the bike to the right and cause the bike to lean to the right. In the real world, the rider, or in most cases, the inherent stability of the bike provides the steering torque needed to rotate the back to the right and in the direction of the desired turn. The bike then begins a turn to the right. In counter steering, leaning occurs after handlebars 842 are brought back toward the direction of the turn, as depicted in FIG. 24B. Thus, the user 807 should turn the handlebars 842 without leaning at first, and at the beginning of the maneuver the handlebars 842 should move in a plane parallel to the Y-Z plane. The present invention can be applied to determine whether the user 807 is leaning prematurely, for example, by detecting whether motion of the handlebars 842 is consonant with the plane parallel to the Y-Z plane.

While the above appears to be a complex sequence of motions, such motions are performed by every child who rides a bicycle. The entire sequence goes largely unnoticed by most riders, which is why some assert that they cannot do it. Deliberately counter steering is essential for safe motorcycle riding and is generally a part of safety riding courses put on by many motorcycle training foundations. Deliberately counter steering a motorcycle is a much more efficient way to steer than to just lean at higher speeds. At higher speeds, the self-balancing property of the motorcycle gets stronger and more force must be applied to the handlebars. According to research, most motorcycle riders would over brake and skid the rear wheel and under brake the front wheel when trying hard to avoid a collision. The ability to counter steer and swerve is essentially absent with many motorcycle operators. The small amount of initial counter steering required to get the motorcycle to lean, which may be as little as an eighth of a second, keeps many riders unaware of the concept. By providing a virtual environment in which to learn the technique, motorcycle safety may be improved.

The system and methods of this invention teach the estimation of a reduced homography that will be less computationally expensive to determine than the full or regular homography known in the art. They may also be more efficient to compute based on the onboard electronics of the optical apparatus employed than the full homography. It may also be useful for the practitioner to compare the values of the homography estimates as determined by the instant invention and those based on the full homography.

It will be evident to a person skilled in the art that the present invention admits of various other embodiments. Therefore, its scope should be judged by the claims and their legal equivalents.

The invention claimed is:

1. A method of recovering pose parameters of an optical apparatus, said method comprising the steps of:
    a) imaging a plurality of space points as measured imaged points on an optical sensor of said optical apparatus;
    b) determining a structural redundancy in said measured image points due to a conditioned motion of said optical sensor;
    c) employing a reduced representation of said measured image points as a plurality of rays in homogeneous coordinates in a projective plane of said optical sensor, said reduced representation being consonant with said conditioned motion; and
    d) estimating at least one pose parameter with respect to a canonical pose of said optical apparatus by employing said reduced representation.

2. The method according to claim 1, wherein said optical apparatus also experiences said conditioned motion of said optical sensor.

3. The method according to claim 1, wherein said conditioned motion is constrained to a predetermined plane.

4. The method according to claim 3, wherein said conditioned motion is allowed to vary within a tolerance margin perpendicular to said arbitrary plane.

5. The method according to claim 1, further employing a reduced homography based on said reduced representation in said step of estimating of said at least one pose parameter.

6. The method according to claim 5, wherein said conditioned motion is consonant with said reduced homography.

7. The method according to claim 5, wherein said conditioned motion conforms to an orthogonal base case.

8. The method according to claim 7, wherein a mathematical formulation of said orthogonal base case is transformed to another orthogonal base case.

9. The method according to claim 5, wherein said reduced homography employs a permutation matrix of a transformation from a first orthogonal base case to a second orthogonal base case.

10. The method according to claim 5, wherein said conditioned motion is constrained to a predetermined plane.

11. The method according to claim 10, wherein said conditioned motion is allowed to vary within a tolerance margin in a direction perpendicular to said arbitrary plane.

12. The method according to claim 5, wherein said at least one pose parameter is a translation of said optical apparatus, and a measurement bias in said step of estimating is determined with respect to an auxiliary measurement of said translation.

13. The method according to claim 12, wherein said auxiliary measurement is performed utilizing at least one item selected from the group consisting of a second said optical apparatus and an auxiliary sensor.

14. The method according to claim 13, wherein said auxiliary sensor is selected from the group consisting of an optical sensor, an accelerometer, a gyro, a magnetometer, an optical flow sensor, a displacement sensor, an acoustic sensor, a Radio Frequency (RF) sensor and an inertial sensor.

15. The method according to claim 12, further filtering said at least one pose parameter based on said measurement bias.

16. The method according to claim 15, further using said filtering to determine a goodness of said step of estimating of said at least one pose parameter.

17. A system for recovering a pose parameter of an optical apparatus comprising:
   a) an optical sensor on which a plurality of space points are imaged as measured imaged points, said optical sensor connected to said optical apparatus;
   b) a structural redundancy in said measured image points due to a conditioned motion of said optical sensor;
   c) a reduced representation of said measured image points as a plurality of rays in homogeneous coordinates in a projective plane of said optical sensor, said reduced representation consonant with said conditioned motion;
   wherein said pose parameter is estimated with respect to a canonical pose of said optical apparatus, by employing said reduced representation.

18. The system of claim 17, wherein said conditioned motion is confined to a predetermined plane.

19. The system of claim 18, wherein said confinement is within a tolerance margin.

20. The system of claim 17, wherein said reduced representation is used in the formulation of a reduced homography consonant with said conditioned motion.

21. The system of claim 20, wherein said reduced homography is employed in said estimation of said pose parameter.

* * * * *